United States Patent
Kim et al.

(10) Patent No.: US 12,114,374 B2
(45) Date of Patent: Oct. 8, 2024

(54) METHOD AND DEVICE FOR TRANSMITTING FRAME THROUGH EXTENDED CHANNEL IN BROADBAND WIRELESS COMMUNICATION NETWORK

(71) Applicants: Hyundai Motor Company, Seoul (KR); Kia Corporation, Seoul (KR); Korea National University of Transportation Industry-Academic Cooperation Foundation, Chungju-Si (KR)

(72) Inventors: Yong Ho Kim, Incheon (KR); Han Seul Hong, Seoul (KR)

(73) Assignees: Hyundai Motor Company, Seoul (KR); Kia Corporation, Seoul (KR); Korea National University of Transportation Industry-Academic Cooperation Foundation, Chungju-si (KR)

( * ) Notice: Subject to any disclaimer, the term of this patent is extended or adjusted under 35 U.S.C. 154(b) by 442 days.

(21) Appl. No.: 17/608,736

(22) PCT Filed: Apr. 29, 2020

(86) PCT No.: PCT/KR2020/005814
§ 371 (c)(1),
(2) Date: Nov. 3, 2021

(87) PCT Pub. No.: WO2020/222583
PCT Pub. Date: Nov. 5, 2020

(65) Prior Publication Data
US 2022/0295546 A1    Sep. 15, 2022

(30) Foreign Application Priority Data

Apr. 30, 2019  (KR) .................. 10-2019-0051002
May 21, 2019  (KR) .................. 10-2019-0059615
(Continued)

(51) Int. Cl.
*H04W 72/04* (2023.01)
*H04W 24/08* (2009.01)
(Continued)

(52) U.S. Cl.
CPC ......... *H04W 74/085* (2013.01); *H04W 24/08* (2013.01); *H04W 72/0446* (2013.01); *H04W 72/0453* (2013.01); *H04W 74/0866* (2013.01)

(58) Field of Classification Search
CPC ............... H04W 74/085; H04W 24/08; H04W 72/0446; H04W 72/0453; H04W 74/0866;
(Continued)

(56) References Cited

U.S. PATENT DOCUMENTS 10,154,517 B2   12/2018   Seok
10,542,526 B2    1/2020   Seok
(Continued)

FOREIGN PATENT DOCUMENTS

| KR | 20160008537 A | * | 1/2016 | ............ H04W 74/08 |
| WO | WO-2016087917 A1 | * | 6/2016 | ............ H04W 74/00 |
| WO | 2017-116137 A1 | | 7/2017 | |

OTHER PUBLICATIONS

Wang et al. (A New MAC Scheme Supporting Voice/Data Traffic in Wireless Ad Hoc Networks. In: IEEE Transactions on Mobile Computing. vol. 7, Issue 12, May 12, 2018,pp. 1491-1503, E-ISSN: 1558-0660).*

(Continued)

*Primary Examiner* — Lakeram Jangbahadur
(74) *Attorney, Agent, or Firm* — Fox Rothschild LLP

(57) ABSTRACT

An operating method of a first communication node in a wireless communication network may include steps of: performing a monitoring operation on a first channel and a second channel; when states of the first channel and the second channel are idle states during a first section as a result of the monitoring operation, performing a random back-off operation in the first channel and the second channel; and when the state of the first channel and the state of the second channel are the idle states as a result of the random back-off (Continued)

operation, transmitting a first frame from the first channel and the second channel.

18 Claims, 39 Drawing Sheets

(30) Foreign Application Priority Data

| | | |
|---|---|---|
| Jul. 5, 2019 | (KR) | 10-2019-0081248 |
| Jul. 29, 2019 | (KR) | 10-2019-0091882 |
| Aug. 23, 2019 | (KR) | 10-2019-0103603 |
| Oct. 10, 2019 | (KR) | 10-2019-0125599 |

(51) Int. Cl.
*H04W 72/0446* (2023.01)
*H04W 72/0453* (2023.01)
*H04W 74/08* (2009.01)
*H04W 74/0833* (2024.01)

(58) Field of Classification Search
CPC ... H04W 4/40; H04W 74/0808; H04W 84/12; H04W 72/02; H04W 72/535
See application file for complete search history.

(56) References Cited

U.S. PATENT DOCUMENTS

| | | | |
|---|---|---|---|
| 10,701,728 B2 | 6/2020 | Park et al. | |
| 2014/0328265 A1* | 11/2014 | Sampath | H04W 74/085 370/329 |
| 2016/0007379 A1* | 1/2016 | Seok | H04W 74/085 370/338 |

OTHER PUBLICATIONS

Jang (20MHz Channel Access in 11bd. IEEE 802.11I-19/0366r2. Mar. 26, 2019).*

Insun Jang, 20MHz channel Access in 11bd, IEEE 802.11-19/0366r2 (Mar. 26, 2019).

P. Wang et al., "A New MAC Scheme Supporting Voice/Data traffic in Wireless Ad Hoc Networks", In: IEEE Transactions on Mobile Computer, 7:12, pp. 1491-1503 (May 12, 2018).

* cited by examiner

METHOD AND DEVICE FOR TRANSMITTING FRAME THROUGH EXTENDED CHANNEL IN BROADBAND WIRELESS COMMUNICATION NETWORK

CROSS-REFERENCE TO RELATED APPLICATIONS

This application is a National Phase application filed under 35 USC 371 of PCT International Application No. PCT/KR2020/005814 with an International Filing Date of Apr. 29, 2020, which claims priority from Korean Application 10-2019-0125599 filed on Oct. 10, 2019; Korean Application 10-2019-0103603 filed on Aug. 23, 2019; Korean Application 10-2019-0091882 filed on Jul. 29, 2019; Korean Application 10-2019-0081248 filed on Jul. 5, 2019; Korean Application 10-2019-0059615 filed on May 21, 2019 and Korean Application 10-2019-0051002 filed on Apr. 30, 2019. The entire contents of these applications are incorporated herein by reference in their entirety.

BACKGROUND

(a) Technical Field

The present disclosure relates to a communication method in a broadband wireless communication network, more particularly, to a method, an apparatus, and a system for frame transmission through an extended channel in a vehicle wireless local access network (LAN).

(b) Description of the Related Art

Recently, with the spread of mobile devices, wireless LAN technology that can provide fast wireless Internet services to the mobile devices has been in the spotlight. The standards for the wireless LAN technology are being developed mainly as the IEEE 802.11 standards by the Institute of Electrical and Electronics Engineers (IEEE). The IEEE 802.11 standards were developed and standardized in such a way that, starting with the initial version supporting 1 to 2 Mbps, they were revised through subsequent versions. Standardized technologies for specific operations such as fast handoff (i.e., fast BSS transition), fast initial link setup, technology for low-power terminals operating in a band of 1 GHz or below, wireless LAN technology for vehicle terminals, and the like were developed, and reflected in the respective standard revisions. In particular, the wireless LAN technology for vehicle terminals is reflected in the IEEE 802.11p, which is based on a signal form in the IEEE 802.11a and an enhanced distributed channel access (EDCA) in the IEEE 802.11e, and operates in a band of 5.9 GHz. Further, it is based on a 10 MHz bandwidth to be suitable for a terminal having high mobility, and supports 'outside context of BSS (OCB)' communication so that the terminal can directly perform inter-vehicle communications without going through authentication and association procedures with a wireless access point.

Meanwhile, as more sensors and operations are developed for vehicle communication operations, applications for the corresponding operations are diversified, and in order to achieve a higher data throughput and improve a transmission distance compared to the IEEE 802.11p, the IEEE 802.11bd is being developed and standardized to establish a wireless LAN standard for next-generation vehicle communication (i.e., next generation V2X (NGV)).

However, since concept of a wireless access point does not exist in the vehicle communication network such as the IEEE 802.11p, a concept and configuration method for a primary channel may not be clear. Therefore, it is necessary to define a primary channel and a method of configuring the primary channel in the vehicle communication network, and it is necessary to clearly define a channel access method for the defined primary channel.

SUMMARY

The present disclosure is directed to configuring a primary channel and performing channel access by extending a bandwidth of the primary channel in a communication environment, and is directed to providing a method, an apparatus, and a system for a multi-user packet transmission operation using a wireless LAN.

An operation method of a communication node in a wireless communication network, according to an exemplary embodiment of the present disclosure, may comprise: performing a monitoring operation on a first channel and a second channel; in response to determining that states of the first channel and the second channel are idle states during a first period as a result of the monitoring operation, performing a random backoff operation on the first channel and the second channel; and in response to determining that the states of the first channel and the second channel are the idle states as a result of the random backoff operation, transmitting a first frame through the first channel and the second channel.

The first channel may be a primary channel of 10 MHz bandwidth for transmitting the first frame, and the second channel may be a secondary channel of 10 MHz bandwidth for extending the first channel, which is contiguous with the first channel.

The first frame may be a 20 MHz physical layer convergence procedure (PLCP) protocol data unit (PPDU).

In the performing of the monitoring operation, whether a packet is decoded may be determined in at least one of the first channel or the second channel, or an energy may be detected in at least one of the first channel or the second channel.

The first period may be a period corresponding to an arbitration inter-frame space (AIFS).

The performing of the random backoff operation may comprise: sensing states of the first channel and the second channel; in response to determining that at least one channel of the first channel and the second channel is busy, freezing the random backoff operation; and in response to determining that the states of the first channel and the second channel are idle states during a preset period from a time when the busy state of the at least one channel ends, resuming the random backoff operation.

In the sensing of the states, whether a packet is decoded may be determined in at least one of the first channel or the second channel, or an energy may be detected in at least one of the first channel or the second channel.

When the at least one channel is the first channel, the preset period may be a period corresponding to an AIFS.

When the at least one channel is the second channel, the preset period may be a period corresponding to an extended inter-frame space (EIFS).

When a time length of the busy state of the at least one channel is identifiable, the preset period may be a first waiting time, and when the time length of the busy state of the at least one channel is not identifiable, the preset period may be a second waiting time longer than the first waiting time.

An operation method of a communication node in a wireless communication network, according to another exemplary embodiment of the present disclosure, may comprise: performing a monitoring operation on a first channel and a second channel; in response to determining that states of the first channel and the second channel are idle states during a first period as a result of the monitoring operation, determining a random backoff count value; starting a random backoff operation on the first channel and the second channel based on the determined random backoff count value, and performing a channel sensing operation on the first channel and the second channel; in response to determining that both the states of the first channel and the second channel are idle states as a result of the channel sensing operation, decreasing the random backoff count value, and in response to determining that a state of at least one channel of the first channel and the second channel is not an idle state as the result of the channel sensing operation, not decreasing the random backoff count value; and in response to determining that the random backoff value is 0, transmitting a first frame through the first channel and the second channel.

The first channel may be a primary channel of 10 MHz bandwidth for transmitting the first frame, and the second channel may be a secondary channel of 10 MHz bandwidth for extending the first channel, which is contiguous with the first channel.

The first frame may be a 20 MHz physical layer convergence procedure (PLCP) protocol data unit (PPDU).

In the performing of the monitoring operation, whether a packet is decoded may be determined in at least one of the first channel or the second channel, or an energy may be detected in at least one of the first channel or the second channel.

The first period may be a period corresponding to an arbitration inter-frame space (AIFS).

The performing of the random backoff operation may comprise: in response to detecting a second frame as the result of the channel sensing operation, freezing the random backoff operation; and in response to determining that states of the first channel and the second channel are idle states during a preset period from a time when transmission of the second frame is completed, resuming the random backoff operation on the first channel.

In the performing of the channel sensing operation on the first channel and the second channel, whether a packet is decoded may be determined in at least one of the first channel or the second channel, or an energy may be detected in at least one of the first channel or the second channel.

When the second frame is transmitted through the first channel, the preset period may be a period corresponding to an arbitration inter-frame space (AIFS).

When the second frame is transmitted through the first channel, the preset period may be a period corresponding to an extended inter-frame space (EIFS).

When a time length of a busy state of the at least one channel is identifiable, the preset period may be a first waiting time, and when the time length of the busy state of the at least one channel is not identifiable, the preset period may be a second waiting time longer than the first waiting time.

A communication node in a wireless communication network, according to yet another exemplary embodiment of the present disclosure, may comprise a processor; a memory storing at least one instruction executable by the processor; and transmit antennas transmitting signals generated by the processor, wherein the at least one instruction causes the processor to: perform a monitoring operation on a first channel and a second channel; in response to determining that states of the first channel and the second channel are idle states during a first period as a result of the monitoring operation, perform a random backoff operation on the first channel and the second channel; and in response to determining that the states of the first channel and the second channel are the idle states as a result of the random backoff operation, transmit a first frame through the first channel and the second channel.

The first channel may be a primary channel of 10 MHz bandwidth for transmitting the first frame, the second channel may be a secondary channel of 10 MHz bandwidth for extending the first channel, which is contiguous with the first channel, and the first frame may be a 20 MHz physical layer convergence procedure (PLCP) protocol data unit (PPDU).

In the performing of the monitoring operation, the at least one instruction may further cause the processor to determine whether a packet is decoded in at least one of the first channel or the second channel, or detect an energy in at least one of the first channel or the second channel.

In the performing of the random backoff operation, the at least one instruction may further cause the processor to: sense states of the first channel and the second channel; in response to determining that at least one channel of the first channel and the second channel is busy, freeze the random backoff operation; and in response to determining that the states of the first channel and the second channel are idle states during a preset period from a time when the busy state of the at least one channel ends, resume the random backoff operation.

When the at least one channel is the first channel, the preset period may be a period corresponding to an AIFS, and when the at least one channel is the second channel, the preset period may be a period corresponding to an extended inter-frame space (EIFS).

According to the present disclosure, by introducing a method of defining a primary channel in an outside context of BSS (OCB) communication network in which communication is performed without association with a wireless access point (AP), efficient channel access may be performed to transmit a frame.

In the case where a communication node extends the existing bandwidth and transmits a frame through a band having 20 MHz bandwidth, by defining a primary channel based on channel occupancy ratios of channels, fairness with legacy terminals can be satisfied according to a purpose of frame transmission, and channel access can be performed by using the channels efficiently.

The present disclosure may be applied to various communication devices such as a communication node, wireless access point, access management apparatus, station and base station using cellular communications, and the like.

DETAILED DESCRIPTION

Figure 1:
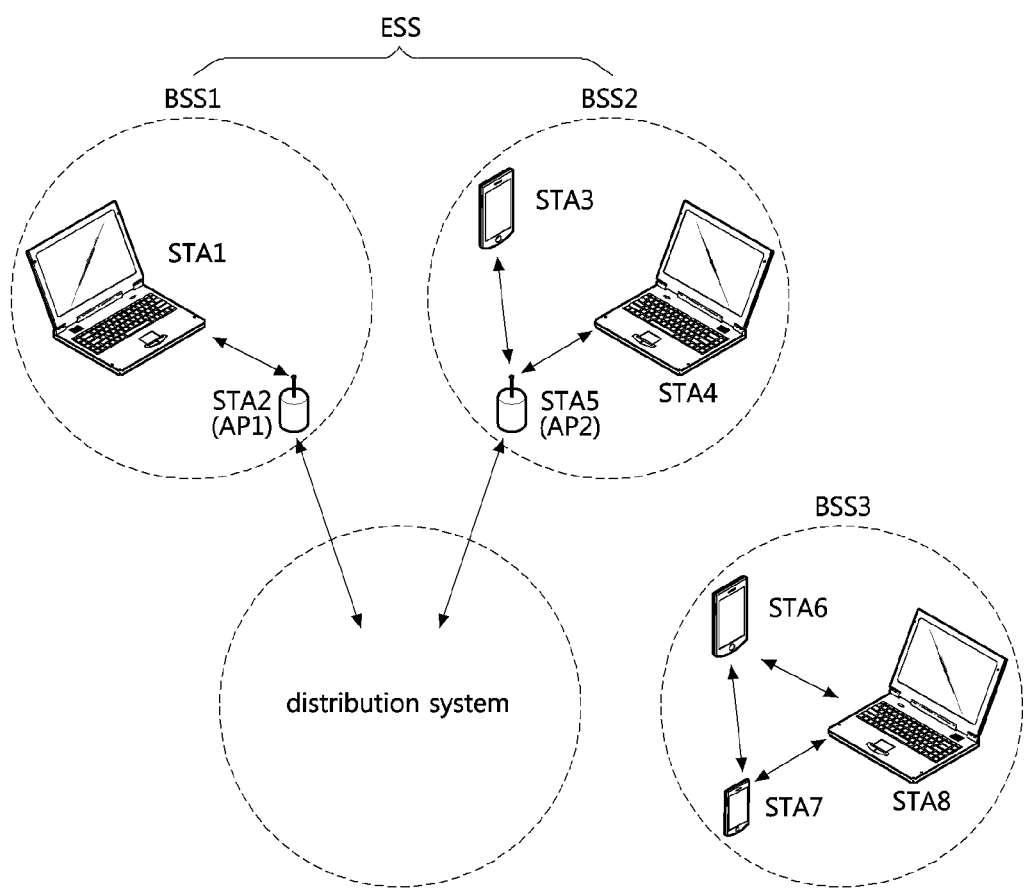
FIG. 1 is a diagram illustrating a first exemplary embodiment of a WLAN system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

A wireless communication network to which exemplary embodiments according to the present disclosure are applied will be described. The wireless communication network to which the exemplary embodiments according to the present disclosure are applied is not limited to the contents described below, and the exemplary embodiments according to the present disclosure may be applied to various wireless communication networks.

FIG. 1 is a diagram illustrating a first exemplary embodiment of a wireless LAN system.

As shown in FIG. 1, a wireless LAN system may include at least one basic service set (BSS). The BSS denotes a set of stations (STAs) (e.g., STA1, STA2 (i.e., AP1), STA3, STA4, and STA5 (i.e., AP2), STA6, STA7, and STA8) configured to communicate with each other through successful synchronization. The BSS does not necessarily denote a specific area. In exemplary embodiments below, a station that performs a function of an access point may be referred to as an "access point (AP)", and a station that does not perform the function of an access point may be referred to as a "non-AP station" or "station".

The BSSs may be classified as infrastructure BSSs and independent BSSs (IBSSs). In particular, a BSS1 and a BSS2 may be infrastructure BSSs, and a BSS3 may be an IBSS.

The BSS3 may be an IBSS operating in an ad-hoc mode. In the BSS3, there is not an AP that is a centralized management entity performing management functions at a center. In other words, in the BSS3, the stations STA6, STA7, and STA8 may be managed in a distributed manner. In the BSS3, all the stations STA6, STA7, and STA8 may be mobile stations and may be not permitted to connect to the DS, thus forming a self-contained network.

A plurality of infrastructure BSSs may be interconnected via a DS. A plurality of BSSs connected via a DS is referred to as an extended service set (ESS). The stations (e.g., STA1, STA2 (i.e., AP1), STA3, STA4, and STA5 (i.e., AP2)) included in an ESS may be configured to communicate with each other, and a station (e.g., STA1, STA3, or STA4) in the ESS may move from one BSS to another BSS while performing seamless communication.

Stations (i.e., communication nodes) of a wireless LAN vehicle-to-everything (V2X) network may not perform operations of configuring a BSS by synchronizing with an access point. The stations (i.e., communication nodes) of the wireless LAN vehicle communication network may perform 'Outside the Context of BSS (OCB)' communication for direct communication between the station(s). Each of the stations performing OCB communication may transmit a frame to other station(s) while omitting a procedure for synchronization with the access point.

Each of the communication nodes (e.g., STA1, STA2 (AP1), STA3, STA4, STA5 (AP2), STA6, STAT, and STA8) included in the wireless LAN system may be configured as follows.

Figure 2:
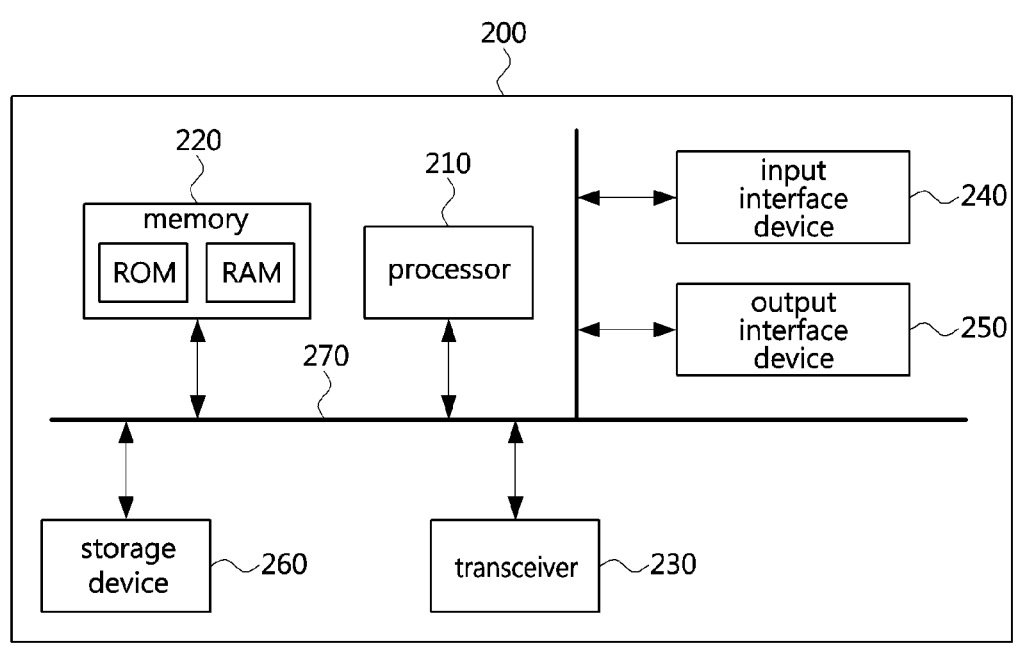
FIG. 2 is a block diagram illustrating an exemplary embodiment of a communication node constituting a WLAN system.

FIG. 2 is a block diagram illustrating an exemplary embodiment of a communication node configured as a WLAN system.

As shown in FIG. 2, a communication node 200 may include at least one processor 210, a memory 220, and a transceiver 230 connected to a network for performing communications. The transceiver 230 may also be referred to as a "radio frequency (RF) unit", "RF module", or the like. Additionally, the communication node 200 may further include an input interface device 240, an output interface device 250, a storage device 260, and the like. Each component included in the communication node 200 may be configured to communicate with each other as connected via a common bus 270.

However, each of the components included in the communication node 200 may be connected to the processor 210 via a separate interface or a separate bus rather than the common bus 270. For example, the processor 210 may be connected to at least one of the memory 220, the transceiver 230, the input interface device 240, the output interface device 250, or the storage device 260 via a dedicated interface.

The processor 210 may be configured to execute at least one instruction stored in at least one of the memory 220 or the storage device 260. The processor 210 may refer to a central processing unit (CPU), a graphics processing unit (GPU), or a dedicated processor. Methods in accordance with exemplary embodiments of the present disclosure may be performed by the processor 210. Each of the memory 220 and the storage device 260 may include at least one of a volatile storage medium it a non-volatile storage medium. For example, the memory 220 may include at least one of read-only memory (ROM) or random access memory (RAM).

Meanwhile, in the WLAN system, an association procedure may be performed as follows.

Figure 3:
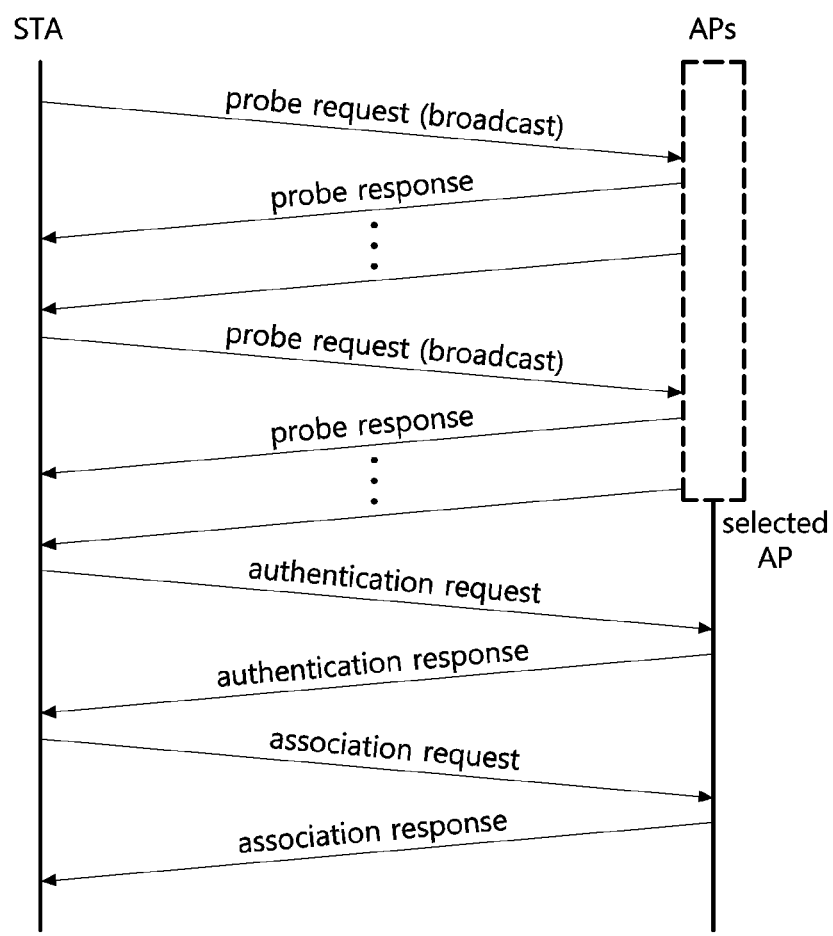
FIG. 3 is a sequence chart illustrating an association procedure of a station in a WLAN system according to an exemplary embodiment.

FIG. 3 is a sequence chart illustrating an association procedure of a station in a WLAN system.

As shown in FIG. 3, an association procedure of a station STA in an infrastructure BSS may generally be divided into a probe step of probing an AP, an authentication step for authentication with the probed AP, and an association step of associating with the authenticated AP.

When neighboring APs are detected, a STA may perform an authentication step with the detected AP.

The STA may transmit an authentication request frame based on an authentication algorithm according to the IEEE 802.11 standard, and may complete the authentication with the AP by receiving an authentication response frame that is a response to the authentication request frame from the AP.

When the authentication with the AP is completed, the STA may be configured to perform an association step with the AP. In particular, the STA may be configured to select one AP among authenticated APs, and perform the association step with the selected AP.

In the case of wireless LAN V2X communication, the stations (i.e., communication nodes) may not need to perform operations of configuring a BSS by synchronizing with an AP, and may perform OCB communication for direct communication between the station(s). Each of the stations performing OCB communication may transmit a frame to other station(s) while omitting a beacon reception procedure for discovering an AP and synchronizing with the AP, probe request/response procedure, association request/response procedure, authentication procedure, and the like.

Meanwhile, a communication node (e.g., access point, station, etc.) belonging to the WLAN system may be configured to perform transmission and reception of a frame based on a point coordination function (PCF), a hybrid coordination function (HCF), an HCF controlled channel access (HCCA), a distributed coordination function (DCF), and/or an enhanced distributed channel access (EDCA).

The frame in the WLAN system may be classified into a management frame, a control frame, and a data frame. The management frame may be classified into an association request frame, an association response frame, a reassociation request frame, a reassociation response frame, a probe request frame, a probe response frame, a beacon frame, and an association. Additionally, the management frame may include a disassociation frame, an authentication frame, a deauthentication frame, an action frame, and the like.

The control frame may be classified into an acknowledgment (ACK) frame, a block ACK request (BAR) frame, a block ACK (BA) frame, a power saving (PS)-Poll frame, a request-to-send (RTS) frame, a clear-to-send (CTS) frame, and the like. The data frame may be classified into a quality of service (QoS) data frame and a non-QoS data frame. The QoS data frame may refer to a data frame for transmission based on the QoS, and the non-QoS data frame may refer to a data frame for transmission not based on the QoS.

Meanwhile, in the WLAN system, a communication node (e.g., access point or station) may be configured to operate based on the EDCA.

Figure 4:
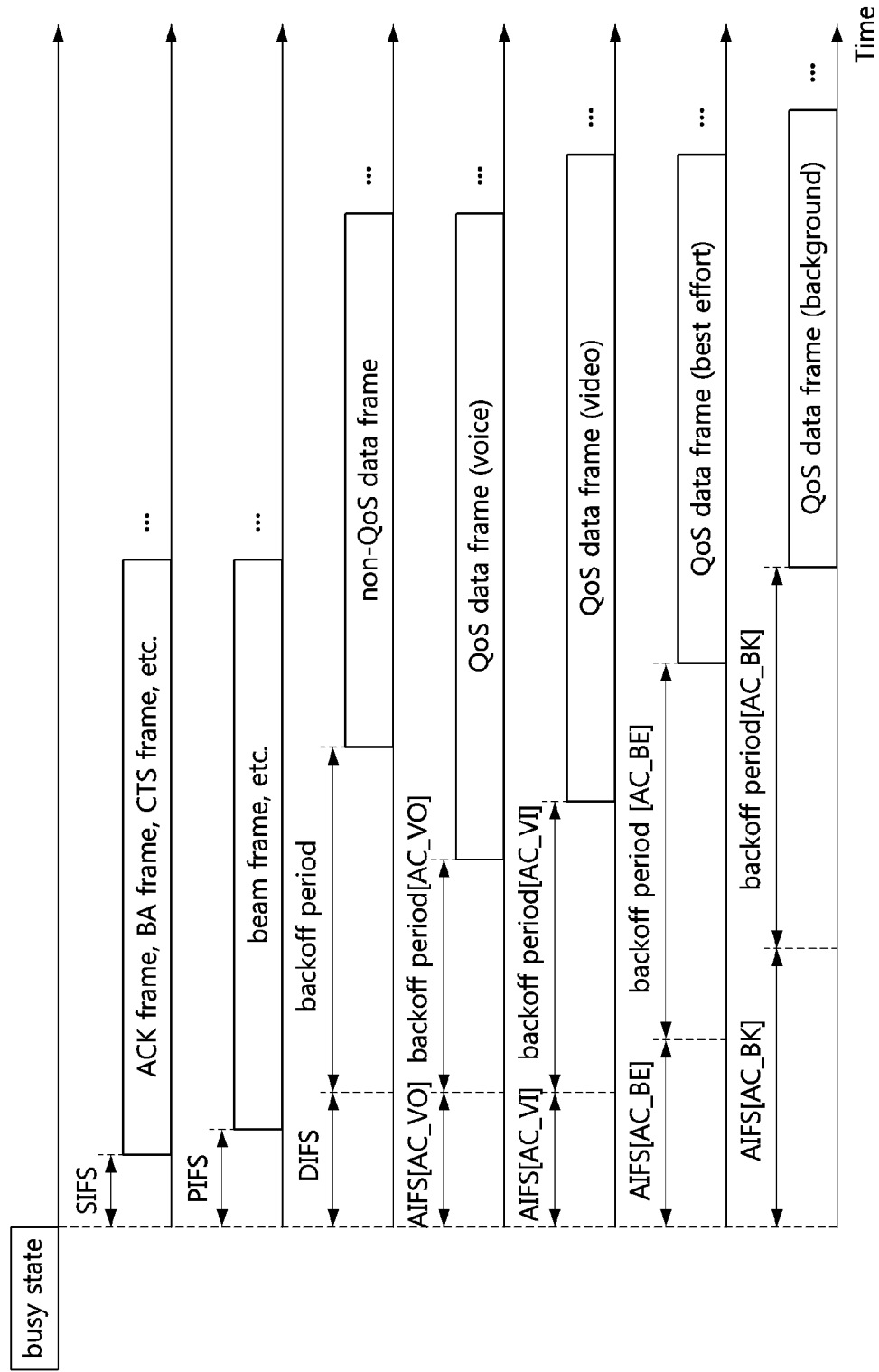
FIG. 4 is a timing diagram illustrating a first exemplary embodiment of an operation method of a communication node based on an EDCA.

FIG. 4 is a timing diagram illustrating a first exemplary embodiment of an operation method of a communication node based on an EDCA.

As shown in FIG. 4, a communication node intending to transmit a control frame (or management frame) may be configured to perform a monitoring operation (e.g., carrier sensing operation) on a channel state during a predetermined period (e.g., short interframe space (SIFS) or PCF IFS (PIFS)). When the channel state is determined to be idle during the predetermined period (e.g., SIFS or PIFS), the communication node may be configured to transmit a control frame (or management frame). For example, the communication node may be configured to transmit an ACK frame, a BA frame, a CTS frame, or the like when the channel state is determined to be idle during an SIFS. Additionally, the communication node may be configured to transmit a beacon frame or the like when the channel state is determined to be idle during a PIFS. When the channel state is determined to be busy during the predetermined period (e.g., SIFS or PIFS), the communication node may be configured not to transmit a control frame (or management frame). In particular, the carrier sensing operation may be referred to as a clear channel assessment (CCA) operation.

A communication node intending to transmit a non-QoS data frame may be configured to perform a monitoring operation (e.g., carrier sensing operation) on a channel state during a DCF IFS (DIFS). When the channel state is determined to be idle during a DIFS, the communication node may be configured to perform a random backoff procedure. For example, the communication node may be configured to select a backoff value (e.g., backoff counter) within a contention window based on the random backoff procedure, and perform the monitoring operation (e.g., carrier sensing operation) during a period corresponding to the selected backoff value. The communication node may be configured to transmit a non-QoS data frame when the channel state is determined to be idle during the backoff period.

A communication node intending to transmit a QoS data frame may be configured to perform a monitoring operation (e.g., carrier sensing operation) on a channel state during an arbitration IFS (AIFS). When the channel state is determined to be idle during an AIFS, the communication node may be configured to perform a random backoff procedure. The AIFS may be set based on an access category (AC) of a data unit (e.g., protocol data unit (PDU)) included in the QoS data frame. The AC of the data unit may be as shown in Table 1 below.

TABLE 1

| Priority | AC | Description |
|---|---|---|
| Lowest | AC_BK | Background |
| . | AC_BE | Best effort |
| . | | |
| . | AC_VI | Video |
| Highest | AC_VO | Voice |

AC_BK may indicate background data, AC_BE may indicate data transmitted in a best effort manner, AC_VI may indicate video data, and AC_VO may indicate voice data. For example, the length of the AIFS for the QoS data frame of each of AC_VO and AC_VI may be set equal to the length of the DIFS. The length of the AIFS for the QoS data frame of AC_BE and AC_BK may be set longer than the length of the DIFS. The length of the AIFS for the QoS data frame of AC_BK may be set longer than the length of the AIFS for the QoS data frame of AC_BE.

In the random backoff procedure, the communication node may be configured to select a backoff value (e.g., backoff counter) within a contention window based on the AC of the QoS data frame. The contention window based on the AC may be as shown in Table 2 below. As shown below, $CW_{min}$ may indicate the minimum value of the contention window, $CW_{max}$ may indicate the maximum value of the contention window, and each of the minimum and maximum values of the contention window may be expressed by the number of slots.

TABLE 2

| AC | $CW_{min}$ | $CW_{max}$ |
|---|---|---|
| AC_BK | 31 | 1023 |
| AC_BE | 31 | 1023 |
| AC_VI | 15 | 31 |
| AC_VO | 7 | 15 |

The communication node may be configured to perform a monitoring operation (e.g., carrier sensing operation) on the channel state during a backoff period, and transmit the QoS data frame when the channel state is determined to be idle during the backoff period.

Hereinafter, wireless LAN multi-channel operation methods in a communication system will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a non-AP station is described, the corresponding AP may be configured to perform an operation that corresponds to the operation of the non-AP station. Conversely, when an operation of the AP is described, the corresponding non-AP station may be configured to perform an operation that corresponds to the operation of the AP.

Figure 5:
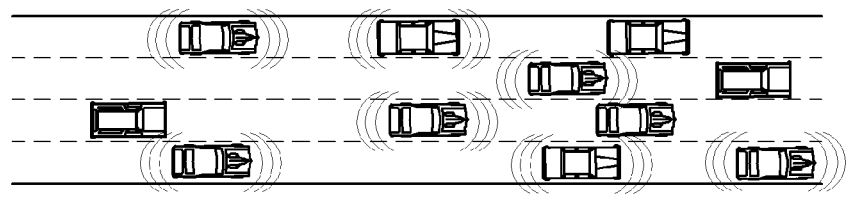
FIG. 5 is a conceptual diagram illustrating an exemplary embodiment of a communication network including communication nodes performing vehicle-to-vehicle communication.

FIG. 5 is a conceptual diagram illustrating an exemplary embodiment of a communication network including communication nodes performing vehicle-to-vehicle communication.

As shown in FIG. 5, when a vehicle communication node including a communication device detects a specific situation through a sensor or performs a specific operation, the vehicle communication node may transmit and receive data including a position, speed, acceleration, and measurement result of the sensor of a vehicle in form of a broadcast frame. In addition, the vehicle communication node may receive a map of the surrounding situation and information on a specific event (e.g., accident and congestion information in the direction of road travel, etc.) from a roadside device such as a street light, traffic light, or the like on the road. The communication node in the vehicle communication network environment may not perform scanning, authentication, and association operations performed in the conventional WLAN operation, and may transmit and receive OCB data without belonging to a specific BSS. Accordingly, a periodic beacon frame transmission operation or the like from a wireless access point may not be performed.

Figure 6:
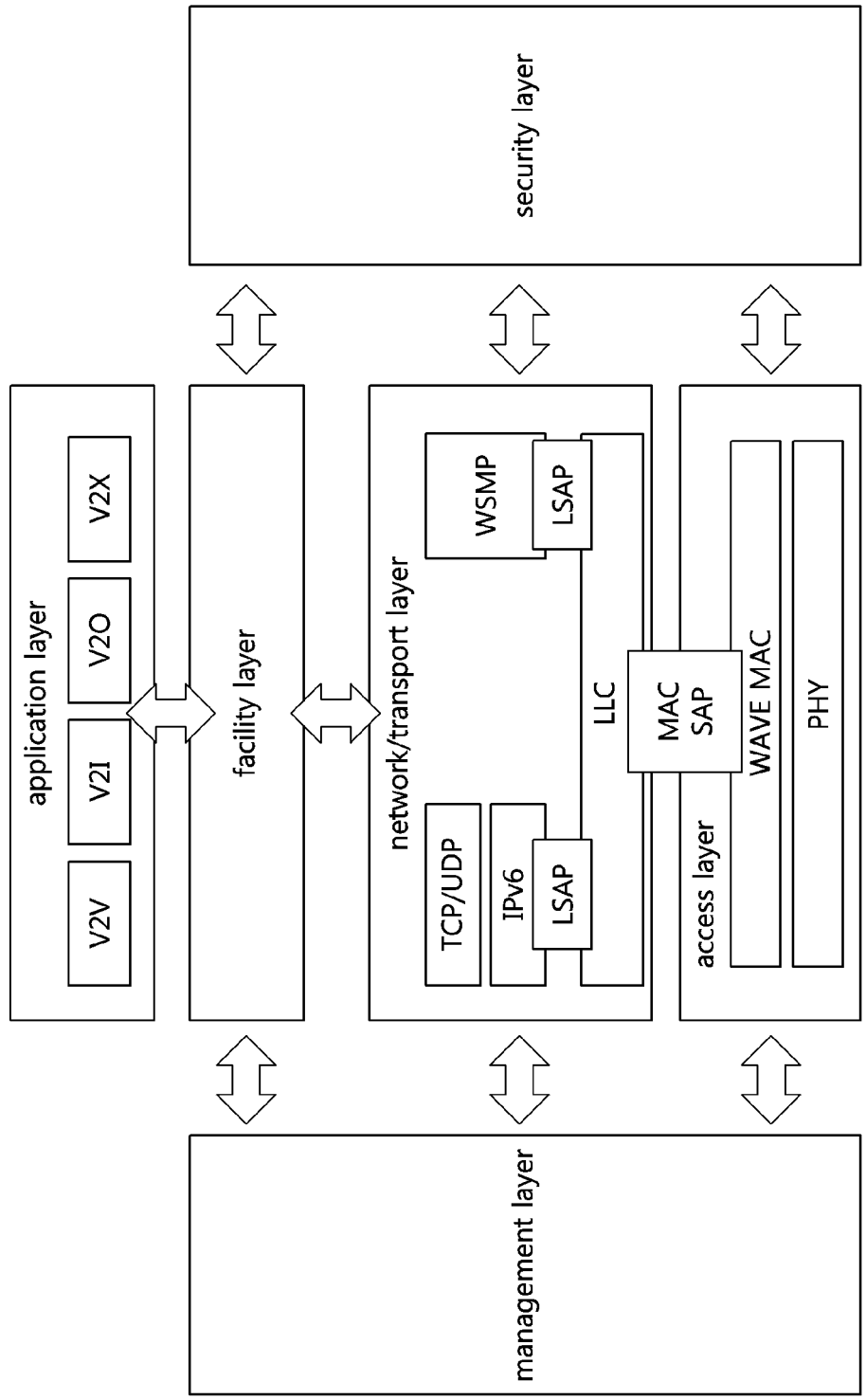
FIG. 6 is a conceptual diagram illustrating an exemplary embodiment of a layer structure of a communication node performing vehicle-to-vehicle communication.

FIG. 6 is a conceptual diagram illustrating an exemplary embodiment of a layer structure of a communication node performing vehicle-to-vehicle communication.

As shown in FIG. 6, a communication node performing vehicle-to-vehicle communication may include an application layer, which is an uppermost layer, a UDP/TCP performing an operation of a transport layer for ensuring reliability of end-to-end data transmission, an IPv6 performing an operation of a network layer for finding a transmission path between multiple nodes, a logical link control (LLC) sublayer and a medium access control (MAC) layer belonging to a data link layer for point-to-point transmission, and a physical (PHY) layer transmitting an actual signal.

The application layer may implement and support various use cases or applications. For example, the application layer may provide various applications in a communication system, including vehicle-to-vehicle (V2V) applications, vehicle-to-infrastructure (V2I) applications, and vehicle-to-others (V2O) applications.

A facility layer may be a layer for effectively implementing various use cases defined by the application layer. For example, the facility layer may be a layer that generates a message (or message set) based on information to be transmitted by the application layer, which is an upper layer.

The network/transport layer may be a layer constituting the network for V2X communication by supporting various network protocols and transport protocols. The network for V2X communication may include a homogenous network and/or a heterogenous network. For example, the network and transport layers may provide Internet connectivity and routing to communication nodes via Internet protocols such as TCP/UDP+IPv6.

Alternatively, in the case of V2V communication, since a transmitting terminal may directly transmit data to a receiving terminal, an operation of transmitting data to the receiving terminal through another terminal may be unnecessary. Thus, the communication node may not require the existing network/transport layers and data link layer. Accordingly, in order to simplify the functions of the network/transport layer, some functions of the network/transport layer and the data link layer may be replaced with a wireless access in vehicular environments (WAVE) short message protocol (WSMP).

An access layer may be a layer that transmits messages/data received from upper layers through physical channels. For example, the access layer may support the IEEE 802.11 and/or 802.11p standard-based communication technology, the IEEE 1609 and/or IEEE 1609.4 standard-based communication technology, and the like to transmit messages and/or data through physical channels. The access layer may include the MAC layer and the PHY layer. The MAC layer of the communication node constituting the V2X communication system may refer to a WSMP MAC layer. Each of the layers may deliver data and/or signals to a lower layer as described below.

Each of the layers constituting the communication node may transmit data and additional information through a service access point (SAP). For example, the LLC layer may obtain data and parameters such as a source address and a destination address from the WSMP or IPv6 through a link service access point (LSAP). In particular, the LLC layer may obtain channel load information measured by the communication node from the WSMP through the LSAP. Alternatively, the LLC layer may deliver channel load information measured by the communication node to the WSMP. The channel load information may indicate a channel occupancy ratio (%) for a predetermined time and the number of communication nodes having performed transmission for a predetermined time. The LSAP used in WAVE may be the same as SAP parameters used in the conventional WLAN except for DL-UNITDATA.request, which is a parameter received from an upper layer, and DL-UNITDATA.request may further include parameters for WAVE-related operations, and may be delivered in form of UNITDATAX.request. DL-UNITDATAX.request may include one or more of the following elements. Each parameter included in DL-UNITDATAX.request may be as defined in Table 3.

eter of a DL-UNITDATAX.request primitive through the LSAP, and may be delivered to the MAC layer in form of adding a channel load parameter to MA-UNITDATA.request of the MAC SAP of the existing wireless LAN.

The transmission bandwidth may indicate transmission of a frame on a channel having a 20 MHz bandwidth when the amount of data to be transmitted exceeds a preset range. When the transmission bandwidth indicates frame transmission on a channel having a 20 MHz bandwidth, the channel having a 20 MHz bandwidth may be specified in the channel information, and the primary channel parameter may indicate a primary channel for performing channel access. Additionally, when an upper layer indicates transmission of a 20 MHz bandwidth, DL-UNITDATAX.request may selectively include whether transmission on a 10 MHz channel is possible according to the channel occupancy ratio. The delivered channel load information, transmission bandwidth, primary channel, and parameter on whether 10 MHz transmission is allowed may be delivered to the MAC layer in form of adding the corresponding parameters to MA-UNITDATA.request of the MAC SAP of the existing wireless LAN or MAUNITDATAX.request of the WSMP.

In addition, the MAC layer may receive from the PHY layer whether a specific channel is busy or the like through a PHY SAP. For example, when performing channel sensing in an energy detection (ED) scheme while performing chan-

TABLE 3

| Parameter | Description |
| --- | --- |
| source_address | Source address |
| destination-address | Destination address |
| data | Same as in the existing wireless LAN |
| priority | Priority between communication nodes |
| Channel identifier | indicates a channel for transmitting a WSM |
| Time slot | indicates a time slot in which a corresponding message is to be transmitted (i.e., time slot 0 or 1) in association with channel switching of WAVE |
| Data rate | indicates a data rate used for transmitting a WSM |
| TxPwr_Level | indicates a transmit power used for transmitting a WSM |
| Channel Load | indicates a channel load measured (or recognized) by the communication node<br>-channel occupancy ratio (%) for a predetermined time, or the number of communication nodes having performed transmission for a predetermined time |
| WsmExpiryTime | optionally included when transmitted through a WSMP. A frame is not transmitted when the corresponding time expires. |
| Transmit Bandwidth | Bandwidth (10 MHz or 20 MHz) of a channel in which a WSM is transmitted |
| Primary channel | indicates a primary channel when Transmit Bandwidth = 20 MHz |
| Fallback allowed | indicates whether fallback transmission through a 10 MHz channel when Transmit Bandwidth = 20 MHz (optional field) |

According to Table 3, among the parameters received through the LSAP, the channel load may indicate a congestion level of a channel, and it may be transmitted to another terminal as being included in a WSMP message, or may be delivered to the MAC layer through a MAC SAP, thereby being utilized to perform an operation according to a channel state. Alternatively, the channel load may indicate the congestion level of the channel, and may refer to a channel occupancy ratio (%) measured by the communication node for a predetermined time and the number of terminals having performed transmission for a predetermined time. It may also be used when the communication node informs to an upper layer. The channel load may be measured periodically and delivered to the upper layer. The channel load information may be information obtained as a channel load paramnel access, the MAC layer may receive information on whether a channel is busy and information on a channel that is busy through PHY-CCA.indication from the PHY layer. In this case, by including an IPI-REPORT parameter in CCA.indication or adding a parameter corresponding to a degree (low, medium, high) of a received signal strength, information on a strength of a signal received when a channel busy state is recognized through the CCA may be received from the PHY layer.

The management layer may be a layer managing operations of the layers included in the communication node. The management layer may provide services and information for management and operation of the facility layer through an interface between a management entity and the facility layer (MF) (or MF-SAP). In addition, the management layer may provide services and information for management and operation of the network/transport layer and the access layer through interfaces with the network/transport layer and the access layer.

A security layer may be a layer managing security-related information of the layers included in the communication node. The security layer may provide services and information for security of the facility layer through an interface between a security entity and the facility layer (SF) (or SF-SAP). In addition, the security layer may provide services and information for security of the network/transport layer and the access layer through interfaces with the network/transport layer and the access layer.

Figure 7:
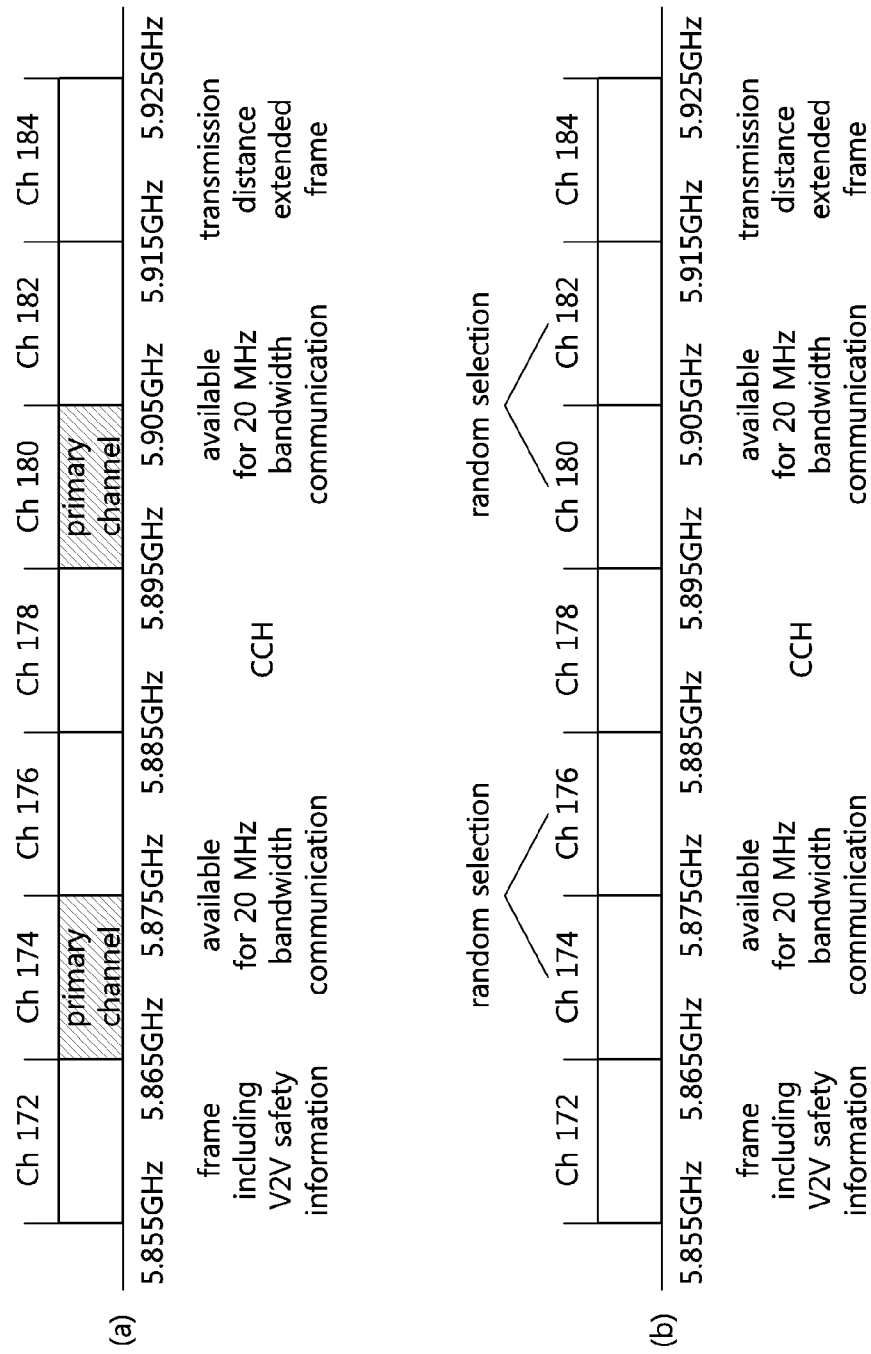
FIG. 7 is a conceptual diagram illustrating a first exemplary embodiment of a method for allocating a channel and defining a primary channel for a communication node performing vehicle-to-vehicle communication.

FIG. 7 is a conceptual diagram illustrating a first exemplary embodiment of a method for allocating a channel and defining a primary channel for a communication node performing vehicle-to-vehicle communication.

As shown in (a) of FIG. 7, in case of the United States, a channel of a 5.9 GHz band for vehicle communication is defined as a band of 5.850 GHz to 5.925 GHz band, of which a channel 178 (5.885 GHz to 5.895 GHz) may be used for a control channel for transmitting control information or broadcasting use of another channel. Among the channels, a channel 172 may be a channel only for transmission of a safety message between vehicle communication nodes, and a channel 184 may be a channel allocated to extend a transmission distance of a frame. Accordingly, channels that can be used for 20 MHz bandwidth transmission may belong to a band of 5.865 GHz to 5.885 GHz or a band of 5.895 GHz to 5.915 GHz.

In order to transmit data at a high data rate using a 20 MHz bandwidth, as utilized in the existing WLAN standard (IEEE 802.11n or IEEE 802.11ac), the communication node may transmit a frame by extending a bandwidth based on a primary channel. When the communication node extends a bandwidth based on the primary channel, the communication node may preconfigure the primary channel.

According to an exemplary embodiment, a communication node may fixedly configure a part of a band used for 20 MHz bandwidth communication as a primary channel. For example, if the communication node uses a band of 5.865 GHz to 5.885 GHz to transmit a signal having 20 MHz bandwidth, the communication node may fix a channel 174 (i.e., 5.865 GHz-5.875 GHz) as the primary channel to perform control channel access and frame transmission operations. When all vehicle communication nodes use the same primary channel, the communication node may basically recognize one channel (e.g., channel 174) among radio resources of 20 MHz bandwidth as the primary channel, and may sense the primary channel. In addition, the communication node performing the channel access operation may decode a frame by detecting the frame received through the 20 MHz channel as a result of sensing the primary channel or by detecting the frame received through the primary channel.

When intending to transmit a 20 MHz bandwidth signal by changing the primary channel of the corresponding band, the communication node may broadcast information on whether the primary channel is changed to the other communication nodes by a method utilizing a protocol in the upper layer (e.g., the method of indicating a primary channel together when a CCH indicates a channel to be used in a next period as in the existing IEEE 1609.4).

As shown in (b) of FIG. 7, in order to minimize the disadvantage that a communication node of one channel continuously suffers losses due to the fixed primary channel configuration as in (a) of FIG. 7, the communication node may not fixedly designate one primary channel, and may configure the primary channel randomly. The communication node may randomly configure one primary channel whenever channel access is performed by extending a bandwidth to 20 MHz, and may transmit a frame through the configured primary channel. Alternatively, the communication node may change configuration of the primary channel whenever performing channel access for transmitting a 20 MHz bandwidth signal. For example, when transmitting a frame through channels 174 and 176, the communication node may configure the channel 174 as the primary channel when transmitting the first frame, and may configure the channel 176 as the primary channel when transmitting the next frame. Even when the communication node transmits frames through the channels 180 and 182, the communication node may change the channel configuration by applying the same scheme. When communication nodes configure the primary channels randomly or alternately, the communication node receiving the frame from other communication nodes cannot identify the primary channel among the two channels in advance, so that the communication node may sense each 10 MHz channel constituting the 20 MHz bandwidth channel.

Figure 8:
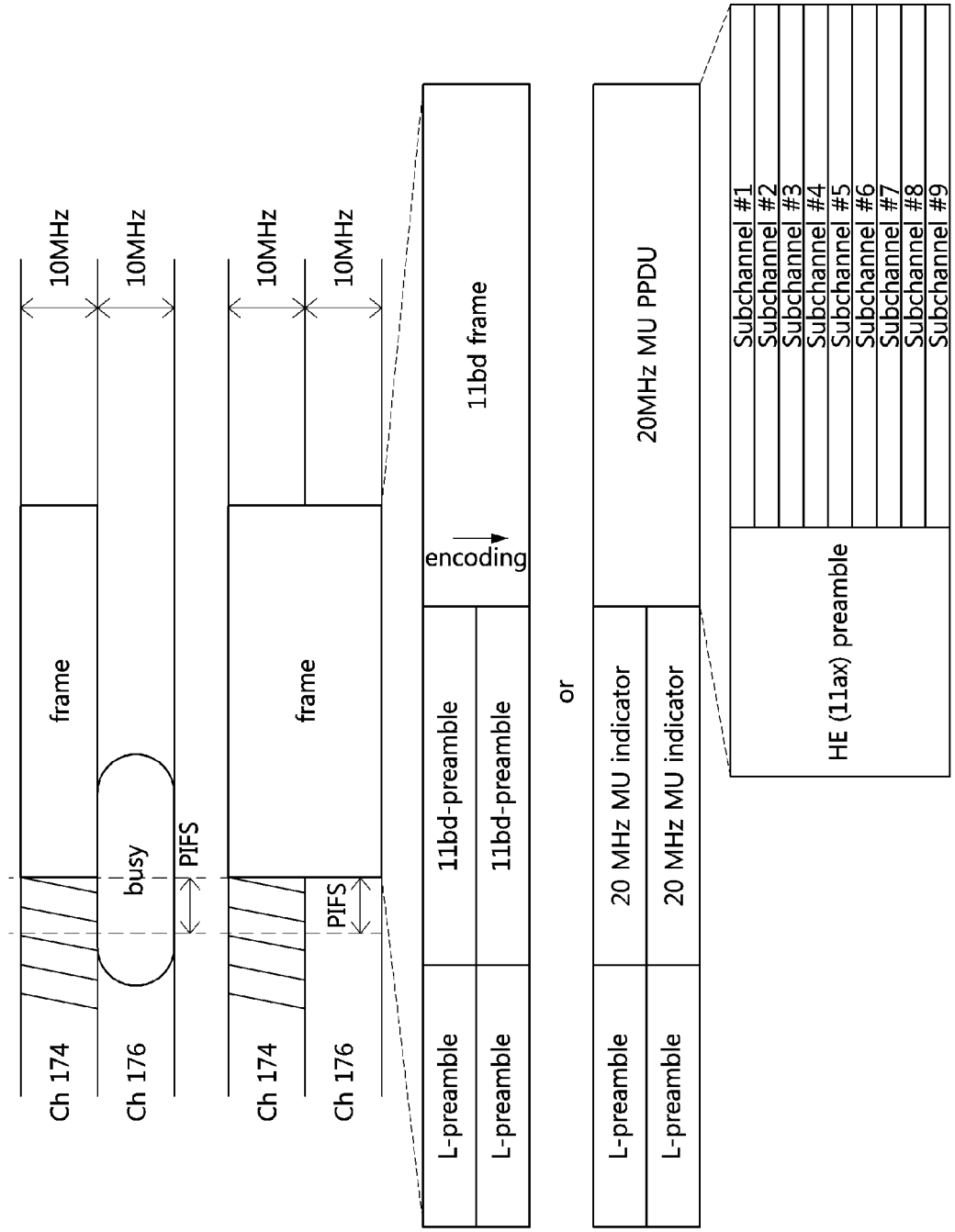
FIG. 8 is a conceptual diagram illustrating an exemplary embodiment of frame transmission through a 20 MHz channel extended based on a primary channel.

FIG. 8 is a conceptual diagram illustrating an exemplary embodiment of frame transmission through a 20 MHz channel extended based on a primary channel.

As shown in FIG. 8, a communication node may transmit a frame through a radio resource having a bandwidth extended to 20 MHz. The radio resource having a bandwidth extended to 20 MHz may include two channels (e.g., channel 174 or channel 176), and the two channels for frame transmission may include a primary channel and a secondary channel arranged adjacent to the primary channel. For example, the primary channel of the communication node may be the channel 174 among the two channels for frame transmission, and the secondary channel may be the channel 176 among the two channels. In order to transmit a frame through the radio resource having 20 MHz bandwidth, the communication node may perform a channel access procedure on the primary channel.

The communication node may perform a random backoff operation for the channel access on the primary channel, and may perform a channel monitoring operation on the secondary channel during a preset time period. The length of the preset time period may be a PIFS, and an ending time of the PIFS may be the same as a completion time of the random backoff operation on the primary channel. As a result of the channel monitoring on the secondary channel, if the secondary channel is determined to be busy during a PIFS time period, the communication node may not transmit a frame through the secondary channel, and may transmit the frame only through the primary channel. The communication node may transmit the frame to be transmitted on a 20 MHz bandwidth channel through the primary channel, which is a 10 MHz bandwidth channel, and the frame transmission operation through the 10 MHz bandwidth channel may be referred to as a fallback transmission.

On the other hand, as the result of the channel monitoring on the secondary channel, if the secondary channel is determined to be idle during the PIFS time period, the communication node may transmit the frame through the primary channel and the secondary channel. The frame transmitted through the 20 MHz bandwidth channel including the primary channel and the secondary channel may be a frame according to the IEEE 802.11bd protocol. The frame according to the IEEE 802.11bd protocol may include L-preambles, 11bd-preambles, and data. Alternatively, the frame transmitted through the 20 MHz bandwidth channel including the primary channel and the secondary channel may be a frame including a 20 MHz multi user (MU) PPDU. The frame including the 20 MHz MU PPDU may further include L-preambles, and indicators indicating support of communication with multiple users through the 20 MHz channel. The communication node may transmit the frame including the 20 MHz MU PPDU to a plurality of communication nodes through the primary channel and the secondary channel. A structure of the frame transmitted through the 20 MHz bandwidth channel including the primary channel and the secondary channel may be as described below.

Figure 9:
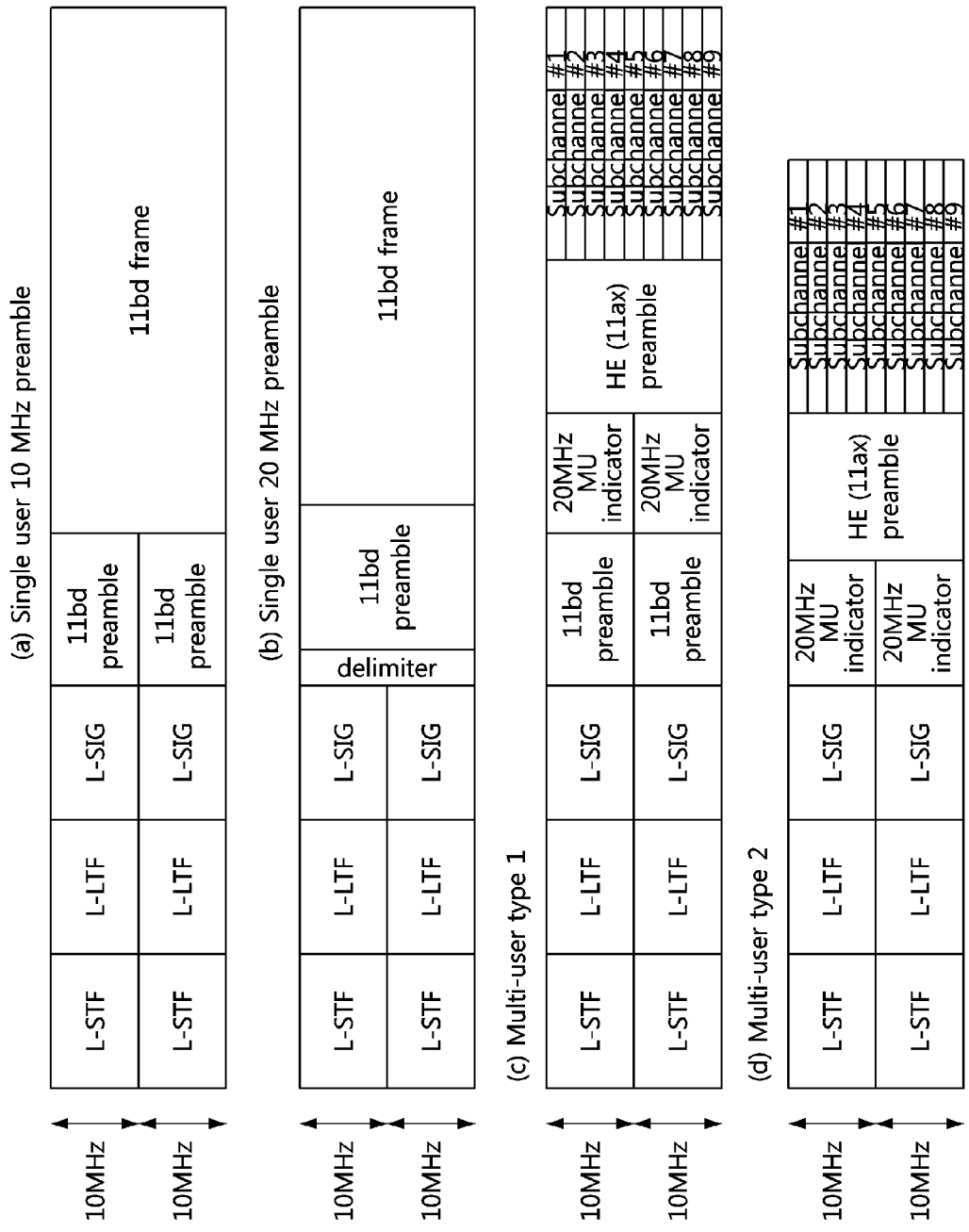
FIG. 9 is a conceptual diagram illustrating an exemplary embodiment of a structure of a frame transmitted through a 20 MHz channel extended based on a primary channel.

FIG. 9 is a conceptual diagram illustrating an exemplary embodiment of a structure of a frame transmitted through a 20 MHz channel extended based on a primary channel.

As shown in FIG. 9, a communication node may basically transmit a frame through a channel having 10 MHz bandwidth (i.e., 10 MHz channel), and may transmit a frame through a channel having 20 MHz bandwidth (i.e., 20 MHz channel) by additionally using a secondary channel based on a result of channel monitoring on the secondary channel. A structure of the frame transmitted through the 20 MHz channel including the primary channel and the secondary channel may be one of structures of (a) to (d) of FIG. 9.

The structure according to (a) of FIG. 9 may be a structure of a frame transmitted to a single user. The frame may include a preamble part and a data part, and the preamble part may further include L-STF, L-LTF, L-SIG and 11bd preamble. The communication node may transmit the same preamble part as a preamble part of a frame having 10 MHz bandwidth through the secondary channel. In addition, the communication node may transmit data through the channel having 20 MHz bandwidth.

The structure according to (b) of FIG. 9 may be a structure of a frame transmitted to a single user. At least part of a preamble part of (b) of FIG. 9 may be transmitted through a 20 MHz channel. The communication node may transmit L-STF, L-LTF, and L-SIG among preambles through the primary channel, and may transmit the duplicated L-STF, L-LTF, and L-SIG through the secondary channel. In addition, the communication node may transmit the IEEE 802.11bd preamble through the 20 MHz channel. In order to distinguish the part of the preambles transmitted through the 10 MHz channel and the part of the preambles transmitted through the 20 MHz channel, the communication node may further transmit a delimiter indicating that the bandwidth of the channel for transmitting the preambles is changed.

The communication node may receive the L-STF, L-LTF, and L-SIG among the preambles of the frame through the 10 MHz primary channel from another communication node, and may further receive the delimiter through the 10 MHz primary channel. The delimiter may include pattern information according to a preconfigured OFDM modulation symbol. In addition, the communication node that transmits and receives the delimiter may obtain information on a channel extension direction for the channel extended as the 20 MHz channel based on information of the OFDM modulation symbol, and the like. For example, based on a combination of patterns included in the delimiter, the frame may indicate whether the channel is extended from the upper 10 MHz channel to the lower 10 MHz channel or extended from the lower 10 MHz channel to the upper 10 MHz channel.

(c) and (d) of FIG. 9 may be structures of a frame transmitted to a plurality of communication nodes (i.e., multi-users, MU). According to the structures of (c) and (d) of FIG. 9, the communication node may receive the L-STF, L-LTF, L-SIG (and/or 11bd preamble) among the preambles of the frame from another communication node through the 10 MHz primary channel, and may further receive a indicator through the 10 MHz primary channel. The indicator of the frame transmitted to a plurality of communication nodes may be an indicator (i.e., 20 MHz MU indicator) indicating support of communication with multiple users through the 20 MHz channel. The communication nodes receiving the indicator may confirm that reception of a data part having an OFDMA structure is scheduled. A transmission period of the indicator may be a period for switching a channel mode of the terminal.

The structure of the data part of the frame may be the same as an OFDMA channel structure defined in the IEEE 802.11ax. Accordingly, a front part of the data part may further include an IEEE 802.11ax preamble for high efficiency (HE) communication. The communication nodes receiving the IEEE 802.11ax preamble of the frame may communicate with other communication nodes through respective subchannels.

Figure 10:
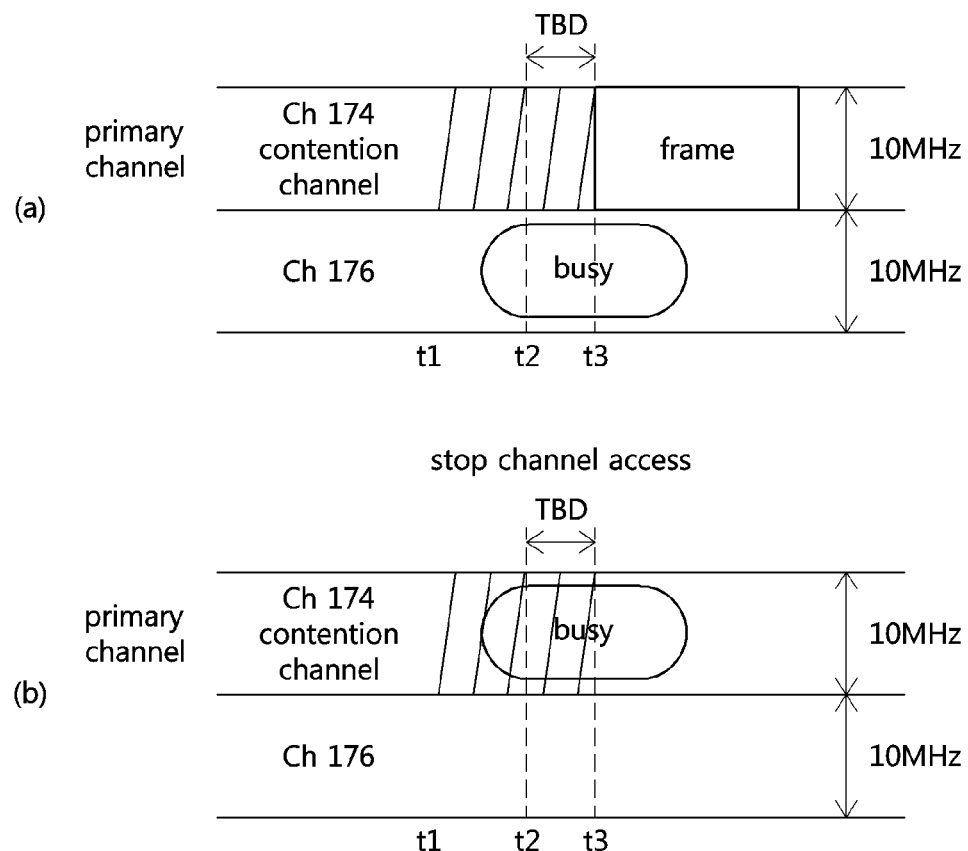
FIG. 10 is a conceptual diagram illustrating a first exemplary embodiment of an operation of a communication node that dynamically extends a channel by dividing the channel into a contention channel and a service channel.

FIG. 10 is a conceptual diagram illustrating a first exemplary embodiment of an operation of a communication node that dynamically extends a channel by dividing the channel into a contention channel and a service channel.

As shown in FIG. 10, a communication node may transmit a frame through two channels (e.g., channel 174 and channel 176). One channel of the two channels may be a service primary channel, which is a channel to be used if an original frame is transmitted on a 10 MHz channel, and the other channel may be a service secondary channel for extension of the service primary channel. The communication node may configure one of the two channels as a channel for contention (hereinafter referred to as a 'contention channel') independently of the configuration of the service primary channel and the service secondary channel. That is, the communication node may configure one of the service primary channel and the service secondary channel as the contention channel, and may perform contention to acquire a frame transmission opportunity in the contention channel. A channel other than the channel configured as the contention channel among the service primary channel or the service secondary channel may be configured as a channel for extending the contention channel (hereinafter, referred to as a 'contention extension channel').

According to the exemplary embodiment of FIG. 10, the communication node may configure the service primary channel as the contention channel and the service secondary channel as the contention extension channel. The communication node may perform contention to acquire a frame transmission opportunity in the contention channel. For example, the communication node may perform a random backoff operation on the contention channel (i.e., t1 to t3). In addition, the communication node may perform a channel monitoring operation on the contention extension channel during a preset time period (e.g., PIFS, etc.) (i.e., t2 to t3). An ending time of the preset time period may be the same as a completion time of the random backoff operation on the contention channel.

The communication node may determine whether to transmit a frame and whether to extend the channel based on a result of the random backoff operation on the contention channel and a result of the channel monitoring operation on the contention extension channel. For example, if the contention extension channel is occupied by another communication node during the preset time period t2 to t3, the communication node may not extend the channel. Accordingly, the communication node may perform fallback transmission of the frame through the service primary channel. On the other hand, if the service primary channel is occupied by another communication node (i.e., t2 to t3), the communication node may stop the channel access procedure on the service primary channel that is the contention channel. That is, the communication node may transmit the frame only when a frame transmission opportunity is acquired as a result of the contention in the contention channel.

Figure 11:
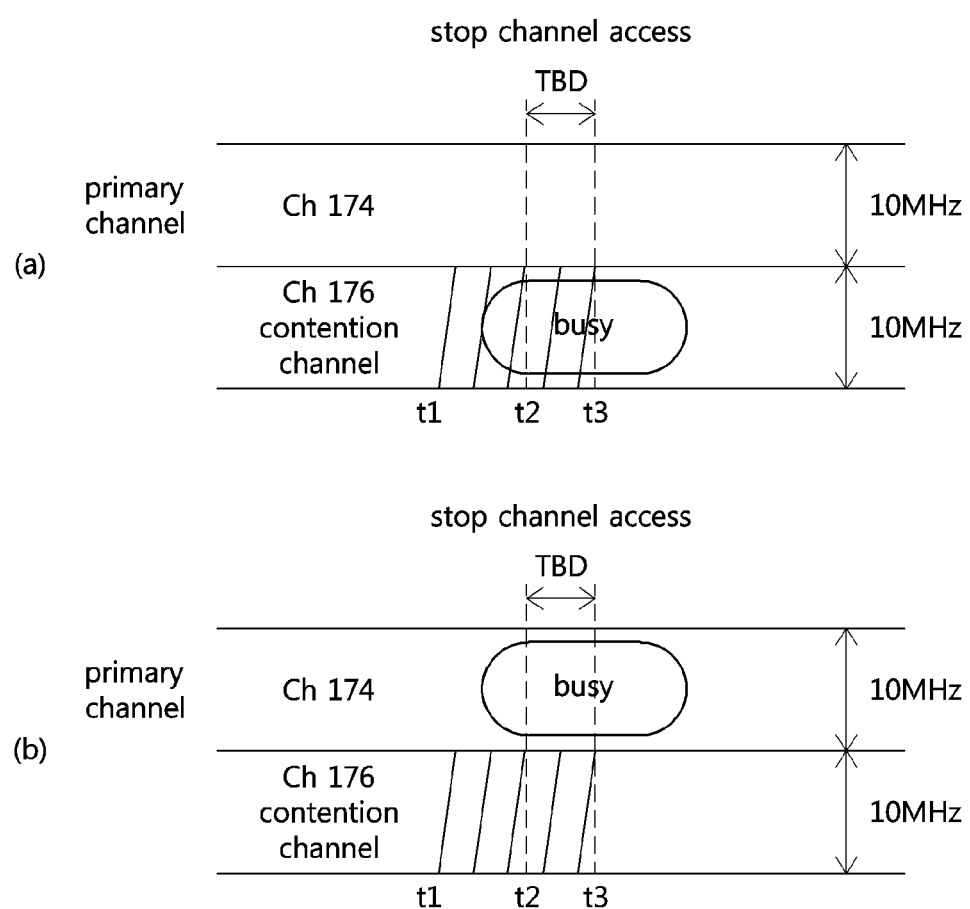
FIG. 11 is a conceptual diagram illustrating a secondary exemplary embodiment of an operation of a communication node that dynamically extends a channel by dividing the channel into a contention channel and a service channel.

FIG. 11 is a conceptual diagram illustrating a secondary exemplary embodiment of an operation of a communication node that dynamically extends a channel by dividing the channel into a contention channel and a service channel.

As shown in FIG. 11, a communication node may transmit a frame through two channels (e.g., channel 174 and channel 176). One channel of the two channels may be a service primary channel, which is a channel to be used if an original frame is transmitted on a 10 MHz channel, and the other channel may be a service secondary channel for extension of the service primary channel. The communication node may configure one of the two channels as a channel for contention (hereinafter referred to as a 'contention channel') independently of the configuration of the service primary channel and the service secondary channel. That is, the communication node may configure one of the service primary channel and the service secondary channel as the contention channel, and may perform contention to acquire a frame transmission opportunity in the contention channel. A channel other than the channel configured as the contention channel among the service primary channel or the service secondary channel may be configured as a channel for extending the contention channel (hereinafter, referred to as a 'contention extension channel').

According to the exemplary embodiment of FIG. 11, the communication node may configure the service primary channel as the contention channel and the service secondary channel as the contention extension channel. The communication node may perform contention to acquire a frame transmission opportunity in the contention channel. For example, the communication node may perform a random backoff operation in the contention channel (i.e., t1 to t3). In addition, the communication node may perform a channel monitoring operation on the contention extension channel during a preset time period (e.g., PIFS, etc.) (i.e., t2 to t3). An ending time of the preset time period may be the same as a completion time of the random backoff operation in the contention channel.

The communication node may determine whether to transmit a frame and whether to extend the channel based on a result of the random backoff operation on the contention channel and a result of the channel monitoring operation on the contention extension channel. For example, if the contention channel is occupied by another communication node (i.e., t2 to t3), the communication node may stop the access procedure to the contention channel. In addition, when the contention channel is configured differently from the service primary channel, if the contention extension channel is occupied by another communication node for a preset time period (e.g., PIFS, etc.) (i.e., t2 to t3), the communication node may stop the channel access procedure. That is, when the contention channel is configured differently from the service primary channel, the communication node may not perform fallback transmission.

The communication nodes of FIGS. 10 and 11 may configure the service primary channel, service secondary channel, contention channel, and contention extension channel by an upper layer including the data link layer. The communication node may configure one of the two channels as the contention channel based on a congestion level of data communication. Alternatively, the communication node may randomly (or alternately) configure one of the two channels as the contention channel.

Figure 12:
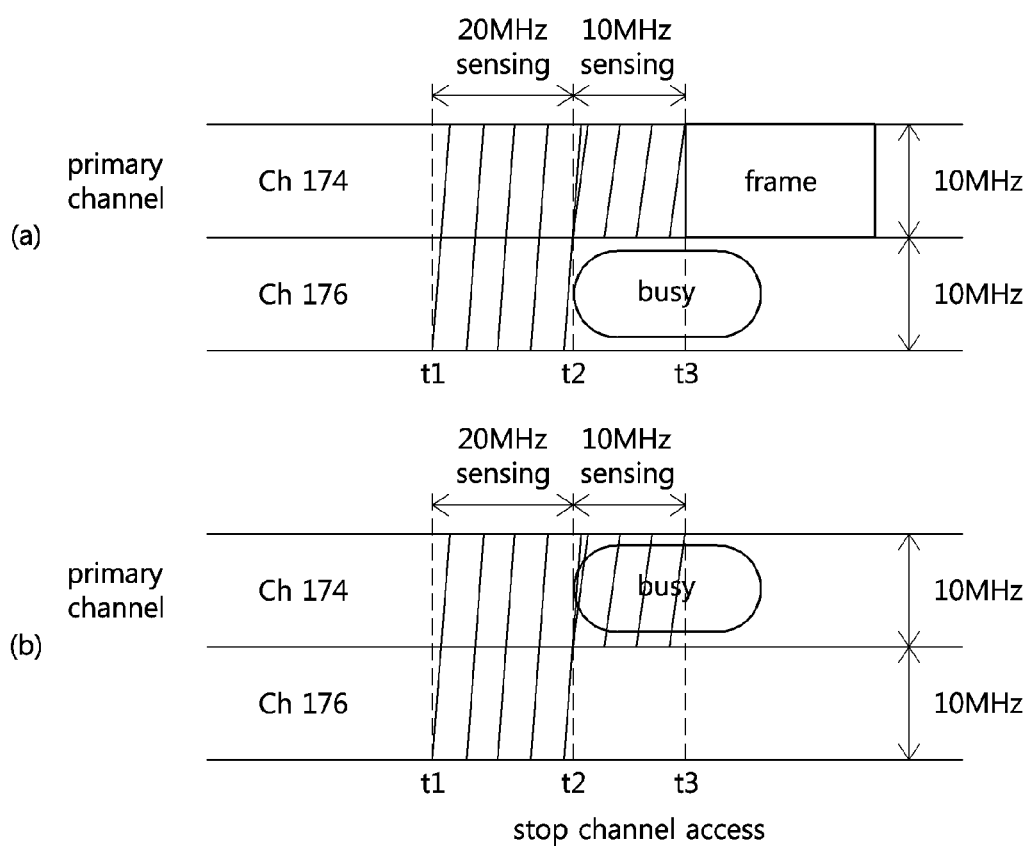
FIG. 12 is a conceptual diagram illustrating a first exemplary embodiment of fallback transmission of a frame through a primary channel as a result of a channel access operation on the primary channel and a secondary channel.

FIG. 12 is a conceptual diagram illustrating a first exemplary embodiment of fallback transmission of a frame through a primary channel as a result of a channel access operation on the primary channel and a secondary channel.

As shown in FIG. 12, a communication node may transmit a frame through two channels (e.g., channel 174 and channel 176). One channel of the two channels may be a primary channel, which is a channel to be used if an original frame is transmitted on a 10 MHz channel, and the other channel may be a secondary channel for extension of the service primary channel, which is contiguous to the primary channel. According to the exemplary embodiment of FIG. 12, the primary channel may be the channel 174, and the secondary channel may be the channel 176. However, it may be obvious that the result of configuring the primary channel is not limited to the exemplary embodiment of FIG. 12. For example, according to another exemplary embodiment, the primary channel may be the channel 176 and the secondary channel may be the channel 174.

A communication node transmitting a frame through a 20 MHz channel may perform channel access on the 20 MHz channel. For example, the communication node may perform a random backoff operation on the primary channel and the secondary channel. A communication node transmitting a frame through an extended channel may perform channel access on a 20 MHz band. That is, the communication node may perform a channel sensing operation on the 20 MHz band during a random backoff time period, and may detect an energy of a frame transmitted by another communication node during the channel sensing operation. The frame transmitted by another communication node may be a 10 MHz frame, so that the communication node may not be able to identify which channel among the primary 10 MHz channel and the secondary 10 MHz channel the frame transmitted by another communication belongs to. Accordingly, the communication node may change the channel on which channel access is performed to the primary channel of the 10 MHz band, and may perform channel sensing on the primary channel during the random backoff time.

According to another exemplary embodiment, the communication node may generate a random backoff count value, and may perform channel sensing operations on the primary channel and the secondary channel during a period (i.e., t1 to t3) corresponding to the generated random backoff count value. The communication node performing the random backoff operation may decrease the random backoff count value only when both the primary channel and the secondary channel are idle. When the communication node completes the random backoff operation on the primary channel and the secondary channel (i.e., t3) (that is, when the random backoff count value becomes zero), the communication node may transmit a frame through the primary channel and the secondary channel. As shown in (a) of FIG. 12, the communication node may detect a busy state while performing the random backoff operation on the 20 MHz channel. The communication node detecting the busy state may change the channel sensing target channel from the 20 MHz band channel to the 10 MHz band primary channel. The communication node may perform channel sensing during the remaining random backoff time period. As a result of performing the channel sensing operation on the primary channel having 10 MHz bandwidth, if the primary channel is idle during the remaining random backoff time period, the communication node may transmit a frame through the 10 MHz primary channel.

In order to satisfy fairness among communication nodes performing the random backoff operations, the communication node may set the backoff count value on the 10 MHz channel and the backoff count value on the 20 MHz channel differently. For example, the backoff count value set by the communication node may be a backoff count value in the existing 10 MHz channel. Accordingly, the communication node may perform the random backoff operation by doubling the backoff count value (i.e., t1 to t2) in order to perform the random backoff operation on the channels having 20 MHz bandwidth.

In addition, if one channel (e.g., secondary channel) having 10 MHz bandwidth is busy during the random backoff operation on the 20 MHz band channel including two channels each having 10 MHz bandwidth, the communication may continue to perform the random backoff operation performed on the 20 MHz band subsequently on the other channel (e.g., primary channel) having 10 MHz bandwidth (i.e., t2 to t3). The backoff count value on the 10 MHz channel (e.g., primary channel) may be a value reduced to half of the remaining backoff count value that is the result of the random backoff operation on the 20 MHz channel. When the time period corresponding to the half-reduced backoff count value is smaller than a PIFS, the communication node may monitor the 10 MHz channel (e.g., primary channel) during at least a time corresponding to the PIFS to determine whether the channel is idle.

In addition, if the secondary channel is determined to be busy during the random backoff operation on the channel(s) having 20 MHz bandwidth, the communication node may continuously perform the random backoff operation on the unoccupied 10 MHz primary channel (i.e., t2 to t3). Since a backoff count value randomly selected for the initial 10 MHz band channel is doubled and the doubled value is used for the 20 MHz band channel, the backoff count value on the 10 MHz primary channel may be a value obtained by subtracting the backoff count value decreased during the backoff operation on the 20 MHz channel from the backoff value selected for the initial 10 MHz band channel. Since the doubled value is used for the 20 MHz channel, the backoff count value may be decreased much. Therefore, when the remaining backoff count value to be performed on the 10 MHz channel is zero, the communication node may monitor the primary channel during at least a time corresponding to the PIFS in order to determine whether the primary channel is idle.

Referring to (b) of FIG. 12, the communication node may detect whether the primary channel is idle while performing the random backoff operation. The communication node, which recognizes that the primary channel is busy, may stop the channel access operation on the primary channel and the secondary channel.

Figure 13:
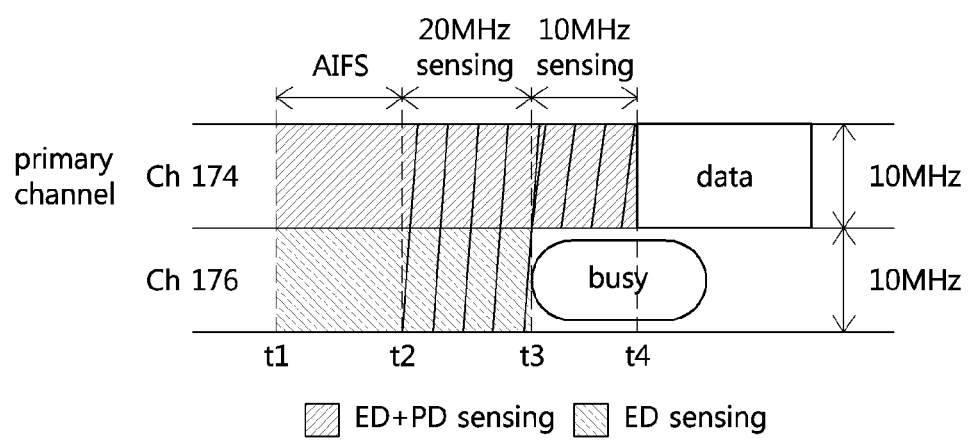
FIG. 13 is a conceptual diagram illustrating a first exemplary embodiment of an operation of a communication node performing channel sensing by dividing a 20 MHz channel into two channels, a 10 MHz primary channel and a 10 MHz secondary channel.

FIG. 13 is a conceptual diagram illustrating a first exemplary embodiment of an operation of a communication node performing channel sensing by dividing a 20 MHz channel into two channels, a 10 MHz primary channel and a 10 MHz secondary channel.

As shown in FIG. 13, a communication node may transmit a frame through a 20 MHz channel composed of two 10 MHz channels (e.g., channel 174 and channel 176). One of the two channels for frame transmission may be a primary channel (i.e., OCB primary channel), and the other channel may be an OCB secondary channel for extension of the primary channel.

The communication node transmitting a frame through the 20 MHz channel composed of two 10 MHz channels may perform a channel access operation on the 20 MHz channel composed of two 10 MHz channels. When the communication node has data to transmit on an extended channel, if a channel occupancy by another communication node is identified on the primary channel or the secondary channel, the communication node may identify channel states for the two channels by performing sensing on the primary and secondary channels until a time after a lapse of a time corresponding to AIFS from a completion time of transmission of the another communication node, and then may perform a random backoff procedure when both of the two channels are idle. For example, the communication node may monitor each of the 10 MHz primary channel and the 10 MHz secondary channel for a preset AIFS (i.e., t1 to t2). When both the primary channel and the secondary channel are idle during the AIFS as a result of monitoring each channel, the communication node may perform a random backoff operation using the same random backoff count value in each of the primary channel and the secondary channel (i.e., t2 to t3). During the AIFS or the random backoff operation on the 20 Hz channel, the communication node may detect presence or absence of a frame transmitted from another communication node in each of the channels. The scheme of identifying a channel occupancy in the 20 MHz band may include, as a carrier sensing (CS) operation, a physical CS operation through energy detection (ED) for each 10 MHz channel, a virtual CS operation through a preamble of a frame or a physical protocol data unit (PPDU) transmitted by another terminal, and an operation of identifying a network allocation vector (NAV) set according to a duration value of a MAC frame header (HDR) of a frame transmitted by another terminal. The communication node may not be able to identify a transmission time (i.e., transmission opportunity (TXOP)) of the frame through the ED operation, and may only determine whether the channel is busy or not. On the other hand, a case in which the TXOP of the frame can be identified by the duration value of the MAC frame header of the frame may be referred to as 'packet detection or preamble detection (PD)'.

The communication node may detect frame transmission from another communication node in each of the primary channel and/or the secondary channel through the sensing scheme such as ED, PD, or a scheme of simultaneously performing ED and PD (i.e., t2 to t3). That is, the communication node may identify the occupancy state of the primary channel and/or the secondary channel while performing the random backoff operation.

The communication node may perform the random backoff operation with one common random backoff count on the 20 MHz band channel including the primary channel and the secondary channel. The communication node may perform a contention operation for channel access to the primary channel. Alternatively, the communication node may perform a packet detection (PD) operation, a virtual detection operation through a preamble of a frame or PPDU transmitted from another terminal, and/or an operation of identifying a NAV set by a frame from another communication node in the primary channel. In addition, the communication node may monitor whether the channel is busy by the ED scheme during a specific period in the secondary channel. The scheme of decreasing the backoff counter on the 20 MHz channel including the primary channel and the secondary channel may be a scheme of performing the PD sensing or simultaneous ED and PD sensing on the primary channel and the ED sensing on the secondary channel, and decreasing the backoff counter by one when both the two channels are idle.

The communication node may detect the occupancy state of the secondary channel during the AIFS or during the random backoff operation on the 20 MHz channel. When a 10 MHz frame transmission operation using only the primary channel is allowed, the communication node recognizing that the secondary channel is busy may continue the random backoff operation on the 10 MHz primary channel of the 20 MHz channel (i.e., t3 to t4), and may stop the random backoff operation on the secondary channel. The communication node completing the random backoff operation on the primary channel may transmit a frame through the primary channel (i.e., t4). The random backoff operation on the primary channel may use a scheme of performing PD sensing or simultaneous ED and PD sensing on the primary channel in each slot during the remaining backoff count performed on the 20 MHz channel, and decreasing the backoff count by one when the primary channel is idle.

Figure 14:
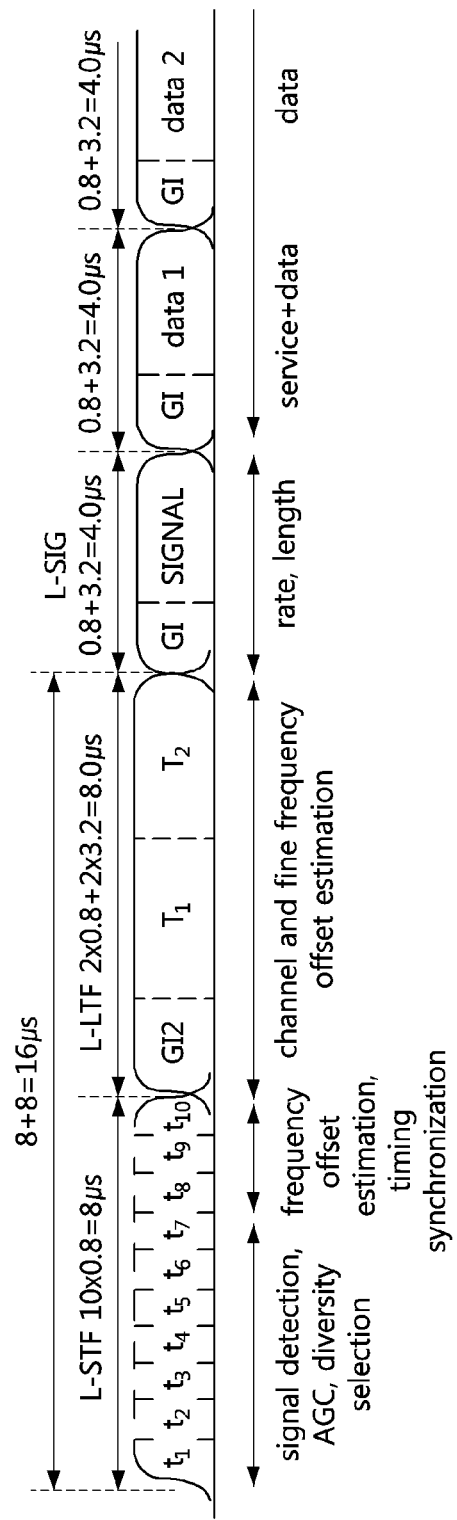
FIG. 14 is a conceptual diagram illustrating an exemplary embodiment of a structure of a wireless LAN frame including wireless LAN preambles.

FIG. 14 is a conceptual diagram illustrating an exemplary embodiment of a structure of a wireless LAN frame including wireless LAN preambles.

As shown in FIG. 14, a frame may include an 8 μs L-STF for signal detection, coarse frequency offset estimation, and timing synchronization. The wireless LAN frame including preambles may include an 8 μs L-LTF for channel and fine frequency offset estimation. In addition, the WLAN frame including the preambles may include a 4 μs L-SIG field including rate and length information of the frame. The above values are values for 20 MHz transmission. According to an exemplary embodiment of the present disclosure, since the entire frame or a part of the frame including the preambles may be transmitted through a 10 MHz band, each of the fields included in the wireless LAN frame including the preambles may be configured to have a length twice the value described in FIG. 14.

Figure 15:
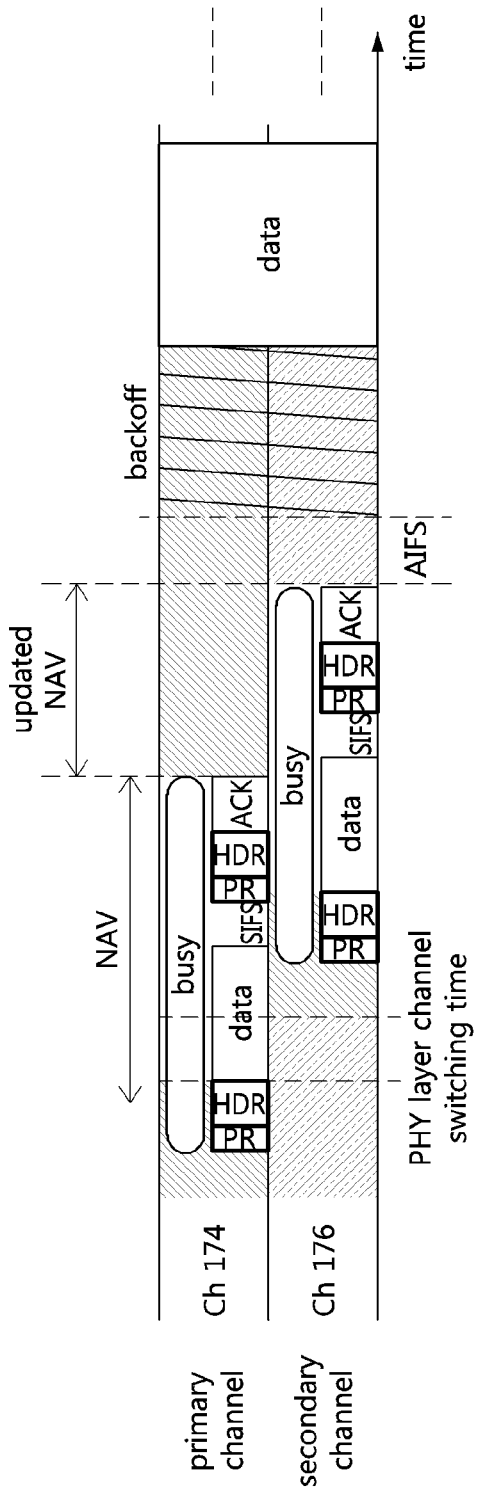
FIG. 15 is a conceptual diagram illustrating a second exemplary embodiment of an operation of a communication node performing channel sensing by dividing a channel into a primary channel and a secondary channel.

FIG. 15 is a conceptual diagram illustrating a second exemplary embodiment of an operation of a communication node performing channel sensing by dividing a channel into a primary channel and a secondary channel.

As shown in FIG. 15, a communication node may transmit a frame through a 20 MHz channel composed of two 10 MHz channels (e.g., channel 174 and channel 176). One of the two channels for frame transmission may be a primary channel (i.e., OCB primary channel), and the other channel may be an OCB secondary channel for extension of the primary channel.

The communication node may perform channel sensing operations on the primary channel and the secondary channel, respectively. For example, the communication node may sense the primary channel by performing a PD sensing operation on the primary channel, and may receive a frame through the primary channel. The communication node performing the PD sensing operation may decode the frame received through the PD sensing to obtain information on a transmission time of the frame. In case of a broadcast frame, the frame may include only the information on the transmission time of the frame. In case of a unicast frame, the frame may include information on the transmission time of the frame, and may further include information on a preset time period (e.g., SIFS, etc.) and information on a transmission time of an ACK packet. In addition, the communication node may sense the secondary channel by performing an ED operation on the secondary channel. Accordingly, the communication node may not be able to decode a frame received through the secondary channel, and thus may not be able to obtain information on a transmission time of the frame.

The communication node may receive a frame from another communication node through the primary channel. The communication node may obtain information on a transmission time of the frame by decoding a part (e.g., L-SIG of the preamble, MAC frame header (HDR), etc.) of the frame received by the PD sensing on the primary channel. If the communication node obtains the information on the transmission time of the frame and a destination address of the received frame does not indicate itself, the communication node may set a NAV on the primary channel during the transmission time of the frame, thereby not transmitting a frame through the primary channel.

In addition, at the time of obtaining the information on the transmission time of the frame (e.g., at the time of completing decoding of the MAC frame header), the communication node may switch a module for performing the PD operation to a frequency of the secondary channel or connect only a decoding module to a signal of the secondary channel to perform a PD operation on the secondary channel. That is, after a physical layer channel switching time, which is a time for preparing the PD operation on the signal of the secondary channel, from the time at which the communication node completes decoding of the MAC frame header of the frame, the communication node may perform the PD operation on the secondary channel. In addition, the communication node may switch the module for performing the PD operation to the primary channel again or connect only the decoding module to the signal of the primary channel after a lapse of the NAV set for the primary channel, in order to perform the PD operation on the primary channel.

The communication node receiving a frame from another communication node while performing the PD operation on the secondary channel may receive and decode the frame through the secondary channel. The communication node may decode a part (e.g., MAC frame header (HDR), etc.) of the frame to obtain information on a transmission time of the frame. When the communication node obtains the information on the transmission time of the frame, the communication node may update the NAV set for the primary channel by reflecting the information on the transmission time of the frame, which is currently obtained from the secondary channel. The communication node may not transmit a frame during the NAV. At the time of obtaining the information on the transmission time of the frame received through the secondary channel (e.g., at the time of completing decoding of the MAC frame header), the communication node may switch the module for performing the PD operation to the frequency of the primary channel or connect only the decoding module to the signal of the primary channel to perform the PD operation on the primary channel again. That is, after a physical layer channel switching time, which is a time for preparing the PD operation on the signal of the primary channel, from the time at which the communication node completes decoding of the MAC frame header of the frame, the communication node may perform the PD operation on the primary channel.

After a lapse of the NAV, the communication node may identify whether the channels (e.g., primary channel and/or secondary channel) are busy during a preset AIFS time period before transmitting a frame. According to the exemplary embodiment of FIG. 15, the communication node may determine whether each of the channels (e.g., primary channel and secondary channel) is busy during the preset AIFS time period.

If the primary channel and the secondary channel are not occupied as a result of sensing each of the channels (e.g., primary channel and secondary channel) for the preset AIFS time period, the communication node may perform a random backoff operation on the channels. When the communication node completes the random backoff operation on the channels, the communication node may transmit a frame through the primary channel and the secondary channel.

Figure 16:
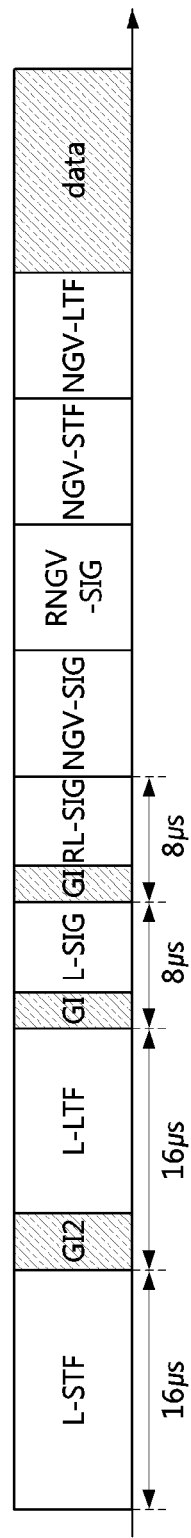
FIG. 16 is a conceptual diagram illustrating an exemplary embodiment of a method of detecting a frame through a guard interval(s) included in a frame.

FIG. 16 is a conceptual diagram illustrating an exemplary embodiment of a method of detecting a frame through a guard interval(s) included in a frame.

As shown in FIG. 16, a wireless LAN frame including wireless LAN preambles may include a legacy-short training field (L-STF), a legacy-long training field (L-LTF), a legacy-signal (L-SIG) field, a repeated legacy-signal (RL-SIG) field, an NGV-signal (NGV-SIG) field, a repeated NGV-SIG (RNGV-SIG) field, an NGV-short training field (NGV-STF), an NGV-long training field (NGV-LTF), and a data field. In addition, the wireless LAN frame including the wireless LAN preambles may further include a guard interval(s) (GI(s)) for preventing interference between fields of the frame. For example, a front part of the L-LTF of the frame may include a guard interval 2 (GI2), and a front part of the L-SIG may further include a GI. In addition, a front part of the RL-SIG may further include a GI.

An ED sensing operation of a communication node, which is for determining whether there is wireless LAN signal transmission, may detect whether there is an energy transmitted during an 8 μs time period. As shown in FIG. 16, a wireless LAN signal may be detected by using a pattern for detecting an energy after a lapse of a GI or GI2 time from a continuous 16 μs time period or 8 μs time period. The ED sensing operation may be performed by using a pattern for detecting an energy in the secondary channel. If more energy is detected after detecting the GI2 (or GI) in the secondary channel, the communication node may determine that the GI and some fields of the frame (e.g., at least one of L-LTF, L-SIG or RL-SIG) are detected, and may detect presence or absence of wireless LAN frame transmission in the secondary channel. When the GI (or GI2) pattern is not detected in the wireless LAN frame detection using the GI (or GI2) pattern in the wireless LAN frame, the communication node may determine that there is no wireless LAN frame transmission. In order to determine that there is no wireless LAN frame transmission, when an energy level at which the GI (or GI2) pattern is not detected is detected in the wireless LAN frame detection using the GI (or GI2) pattern, a reception level at which an occupied signal is determined to be a valid signal may be set higher so that a signal that is not a wireless LAN signal is not determined as a wireless LAN frame.

The communication node detecting frame transmission in the secondary channel may change the PD sensing target channel. That is, the communication node may indicate to the PD sensing module performing the PD sensing on the primary channel to perform the PD sensing on the secondary channel. Accordingly, the communication node may decode a frame by performing the PD operation on the secondary channel. The communication node may obtain information on a transmission time of the frame by decoding the frame. Accordingly, after the frame transmission is completed, the communication node may perform an accurate AIFS operation, in which the communication node waits only during an AIFS, which is a shorter time than EIFS, and then performs channel access.

Figure 17:
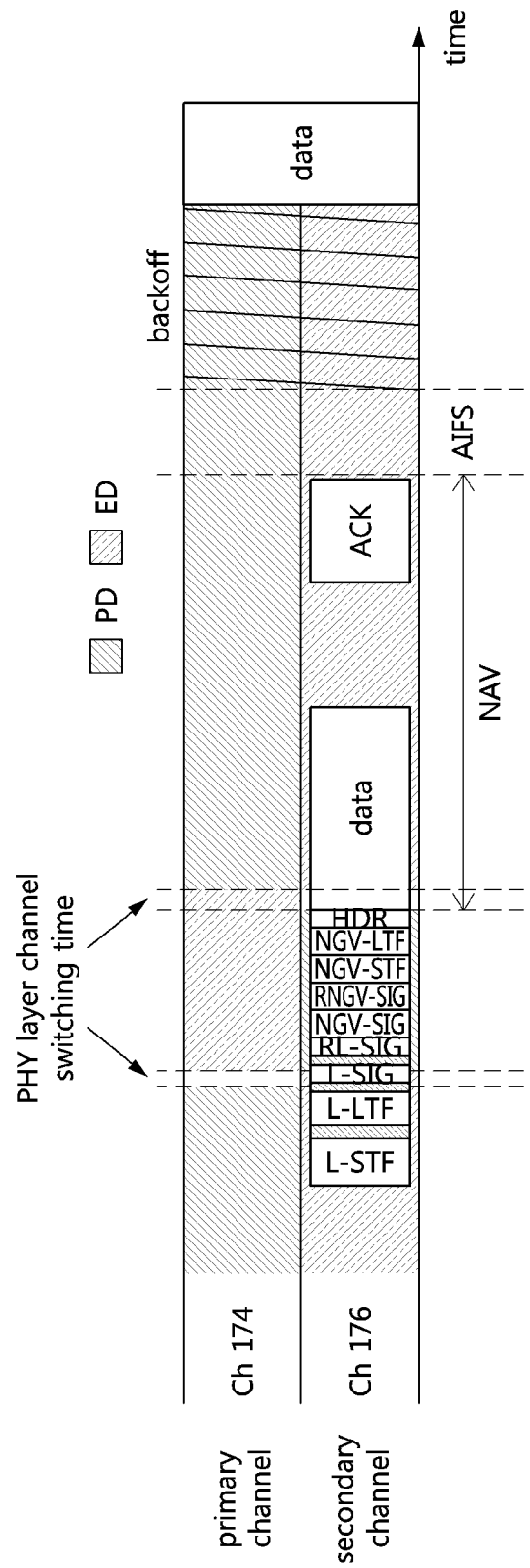
FIG. 17 is a conceptual diagram illustrating a first exemplary embodiment of a method of changing a frame detection scheme when a frame is detected through a secondary channel.

FIG. 17 is a conceptual diagram illustrating a first exemplary embodiment of a method of changing a frame detection scheme when a frame is detected through a secondary channel.

A communication node may transmit a frame through two channels (e.g., channel 174 and channel 176). One of the two channels for frame transmission may be a primary channel (i.e., OCB primary channel), and the other channel may be an OCB secondary channel for extension of the primary channel.

The communication node may perform channel sensing operations on the primary channel and the secondary channel, respectively. For example, the communication node may sense the primary channel by performing a PD sensing operation on the primary channel, and may sense the secondary channel by performing an ED operation on the secondary channel.

As shown in FIG. 17, the communication node may perform the ED sensing on the secondary channel. When the communication node detects a GI of an L-SIG and a GI of an RL-SIG while performing the ED sensing, the communication node may detect a wireless LAN frame from another communication node in the secondary channel. Alternatively, the communication node may detect a wireless LAN frame from another communication node by detecting guard intervals in the order of the GI2 and GI of the frame. Alternatively, the communication node may detect a frame from another communication node by detecting the GIs at a regular interval. Alternatively, the communication node may detect a frame by detecting an L-STF or L-LTF of the frame using a physical layer module.

The communication node detecting a wireless LAN frame from another communication node in the secondary channel may change the PD sensing target channel from the primary channel to the secondary channel. That is, the communication node may perform the PD sensing operation on the secondary channel and the ED sensing operation on the primary channel. The communication node performing the PD sensing operation on the secondary channel may decode a wireless LAN frame in the secondary channel. The communication node may obtain information on a transmission time of the frame by decoding a MAC frame header (HDR) of the frame. The communication node may set a NAV based on the obtained information on the transmission time of the frame, and may reconfigure the PD sensing target channel from the secondary channel to the primary channel. That is, the communication node having decoded the frame may perform the PD sensing operation on the primary channel, and may perform the ED sensing operation on the secondary channel. The communication node may wait during the NAV without performing a frame transmission operation. The communication node that does not detect a wireless LAN frame because it does not detect a GI pattern in the ED sensing may not change the target channel for the PD sensing, and thus may not detect transmission of a wireless LAN frame in the secondary channel. Accordingly, the communication node may not set a NAV.

After a lapse of the NAV set by detecting the wireless LAN frame through the GI pattern detection in the ED sensing, changing the PD sensing target channel, performing the PD sensing, and decoding the MAC frame header, the communication node may identify whether the channels (e.g., primary channel and/or secondary channel) are busy during a preset AIFS time period before transmitting a frame. According to the exemplary embodiment of FIG. 17, the communication node may identify whether the channels (e.g., primary channel and secondary channel) are busy during the preset AIFS time period. The communication node, which detected a wireless LAN frame through GI pattern detection as a result of the ED sensing but could not change the PD sensing target channel, may not be able to decode a MAC frame header, and thus may not obtain information on a transmission time of the frame. Therefore, after the communication node waits until a completion time of occupation of the detected WLAN signal, the communication node may monitor whether channels (e.g., primary channel and secondary channel) are occupied during an EIFS time period, which is longer than the preset AIFS.

When the channels (e.g., primary channel and secondary channel) are not occupied during the preset AIFS or EIFS time period, the communication node may perform a random backoff operation on the channels. When the communication node completes the random backoff operation on the channels, the communication node may transmit a frame through the primary channel and the secondary channel.

Figure 18:
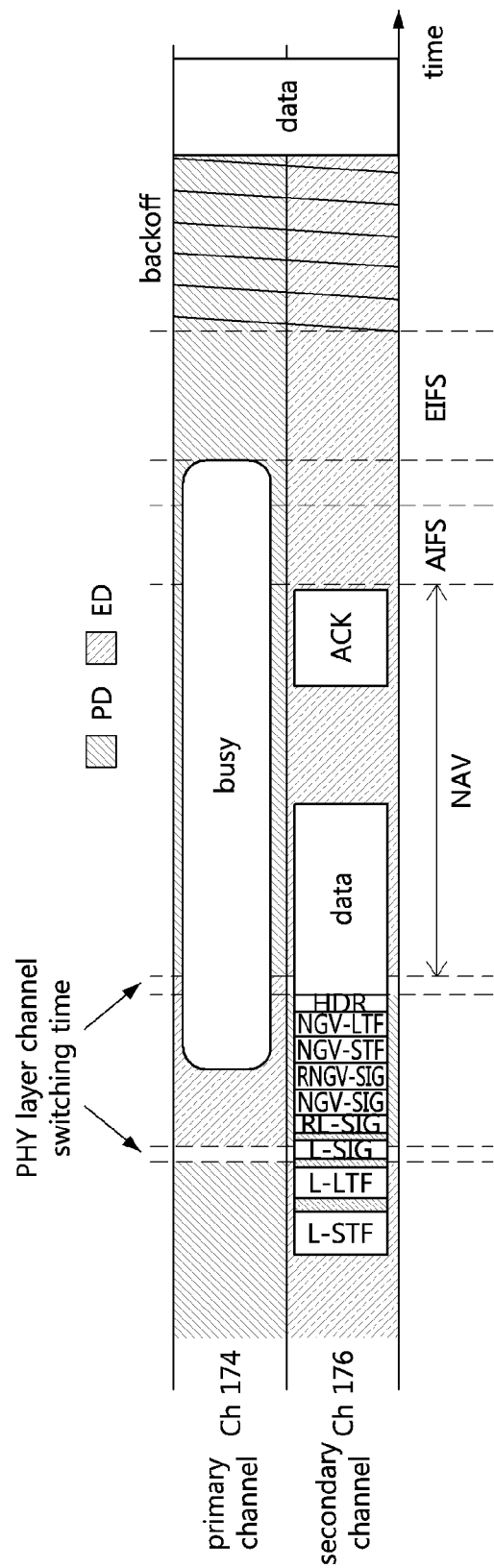
FIG. 18 is a conceptual diagram illustrating a second exemplary embodiment of a method of changing a frame detection scheme when a frame is detected through a secondary channel.

FIG. 18 is a conceptual diagram illustrating a second exemplary embodiment of a method of changing a frame detection scheme when a frame is detected through a secondary channel.

A communication node may transmit a frame through two channels (e.g., channel 174 and channel 176). One of the two channels for frame transmission may be a primary channel (i.e., OCB primary channel), and the other channel may be an OCB secondary channel for extension of the primary channel.

The communication node may perform channel sensing operations on each of the primary channel and the secondary channel. For example, the communication node may sense the primary channel by performing a PD sensing operation on the primary channel, and may sense the secondary channel by performing an ED operation on the secondary channel.

As shown in FIG. 18, the communication node may perform the ED sensing on the secondary channel. When the communication node detects a GI of an L-SIG and a GI of an RL-SIG while performing the ED sensing, the communication node may detect a wireless LAN frame from another communication node in the secondary channel. Alternatively, the communication node may detect a wireless LAN frame from another communication node by detecting a GI pattern according to the order of the GI2 and GI in the frame. Alternatively, the communication node may detect a frame from another communication node by detecting a GI pattern in which the GIs are arranged at a regular interval. Alternatively, the communication node may detect a frame by detecting an L-STF or L-LTF of the frame using a physical layer module.

The communication node detecting a wireless LAN frame from another communication node in the secondary channel may change the PD sensing target channel from the primary channel to the secondary channel. That is, the communication node may perform the PD sensing operation on the secondary channel and the ED sensing operation on the primary channel. The communication node performing the PD sensing operation on the secondary channel may decode the wireless LAN frame in the secondary channel. The communication node may obtain information on a transmission time of the frame by decoding a MAC frame header (HDR) of the frame. The communication node may set a NAV based on the obtained information on the transmission time of the frame, and may reconfigure the PD sensing target channel from the secondary channel to the primary channel. That is, the communication node having decoded the frame may perform the PD sensing operation on the primary channel, and may perform the ED sensing operation on the secondary channel. The communication node may wait during the NAV without performing a frame transmission operation.

In a period in which the PD sensing target channel is configured as the secondary channel, the primary channel may be occupied by another communication node. That is, another communication node may transmit a wireless LAN frame through the primary channel. The communication node may detect the busy state and frame of the primary channel, but may not be able to decode the frame through the primary channel because it performs the ED sensing operation. Therefore, the communication node may not be able to obtain information on a transmission time of the frame through the primary channel.

After a lapse of the NAV, the communication node may identify whether the channels (e.g., primary channel and/or secondary channel) are busy during a preset AIFS time period before transmitting a frame. According to the exemplary embodiment of FIG. 18, the communication node may determine whether the channels (e.g., primary channel and secondary channel) are busy during the preset AIFS time period.

If the channels (e.g., primary channel) are busy during the preset AIFS time period, the communication node may wait without transmitting a frame until the busy state of the channel ends. When the busy state of the primary channel is changed to the idle state, the communication node may determine whether the channels (e.g., primary channel and secondary channel) are busy during a preset EIFS time period.

If the channels (e.g., primary channel and secondary channel) are not busy during the preset EIFS time period, the communication node may perform a random backoff operation for identifying whether each channel is idle during a period corresponding to a randomly-selected random backoff count value while performing the PD sensing and the ED sensing on the two channels including the primary channel and the secondary channel, respectively. When the communication node completes the random backoff operation on the channels, the communication node may transmit a frame through the primary channel and the secondary channel.

Figure 19:
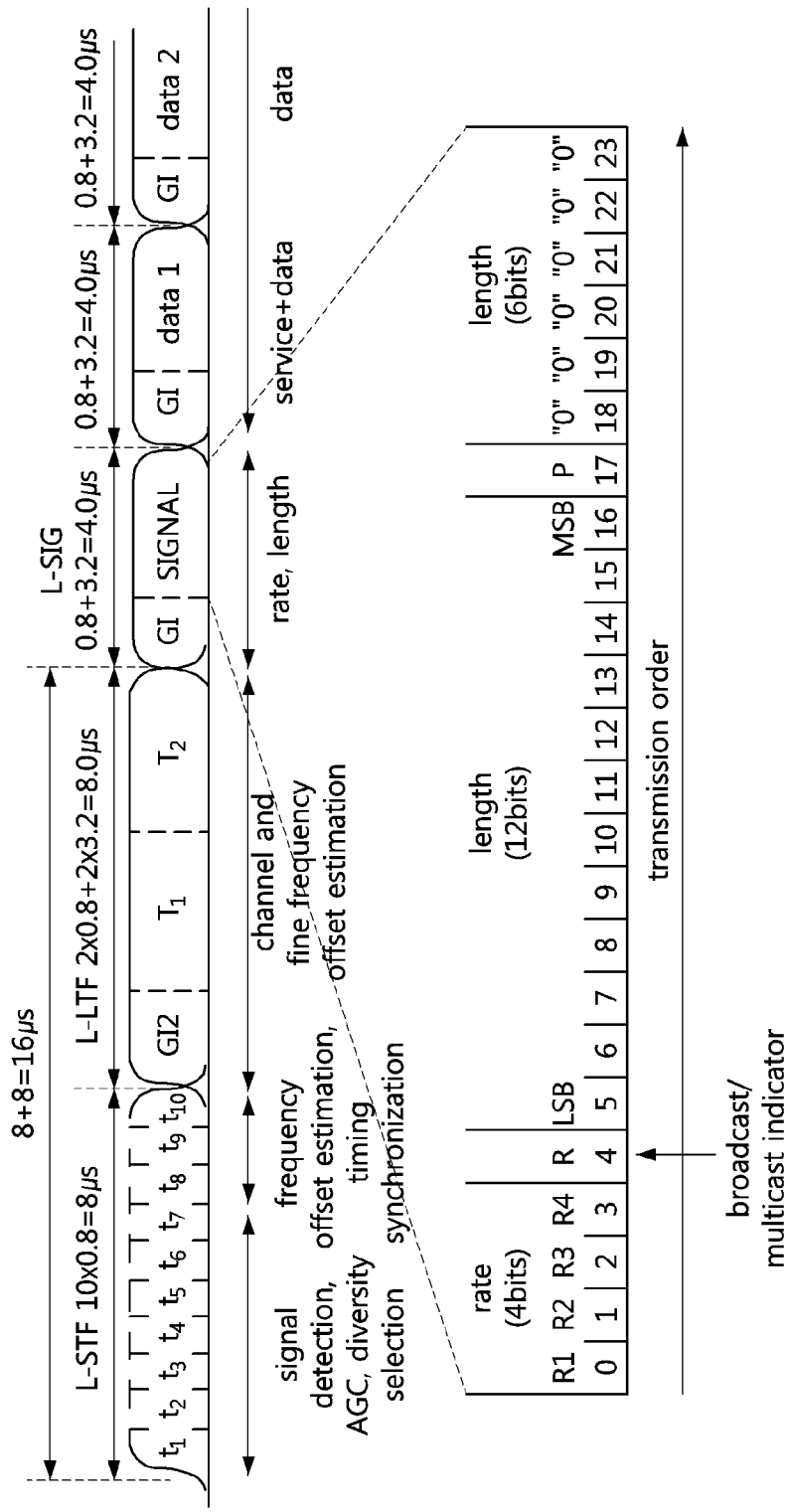
FIG. 19 is a conceptual diagram illustrating a first exemplary embodiment of a frame structure indicating whether ACK is required in a wireless LAN signal.

FIG. 19 is a conceptual diagram illustrating a first exemplary embodiment of a frame structure indicating whether ACK is required in a wireless LAN signal.

As shown in FIG. 19, an L-SIG field of a frame may include a 4-bit subfield indicating a frame rate, a 12-bit subfield indicating the length of the frame, and a signal tail subfield having 6 bits having zero values.

A broadcast frame and a multicast frame among frames may not require ACK for the frame. In addition, a unicast frame among the frames may require ACK for the frame. At least some fields of the frame may include information indicating whether ACK for the frame is required.

For example, the frame may indicate whether ACK for the frame is required by using a reserved bit of the L-SIG field. When the frame is a broadcast frame or a multicast frame, the reserved bit of the L-SIG field may be set to 1. On the other hand, when the frame is a unicast frame, the reserved bit of the L-SIG field may be set to 0.

Figure 20:
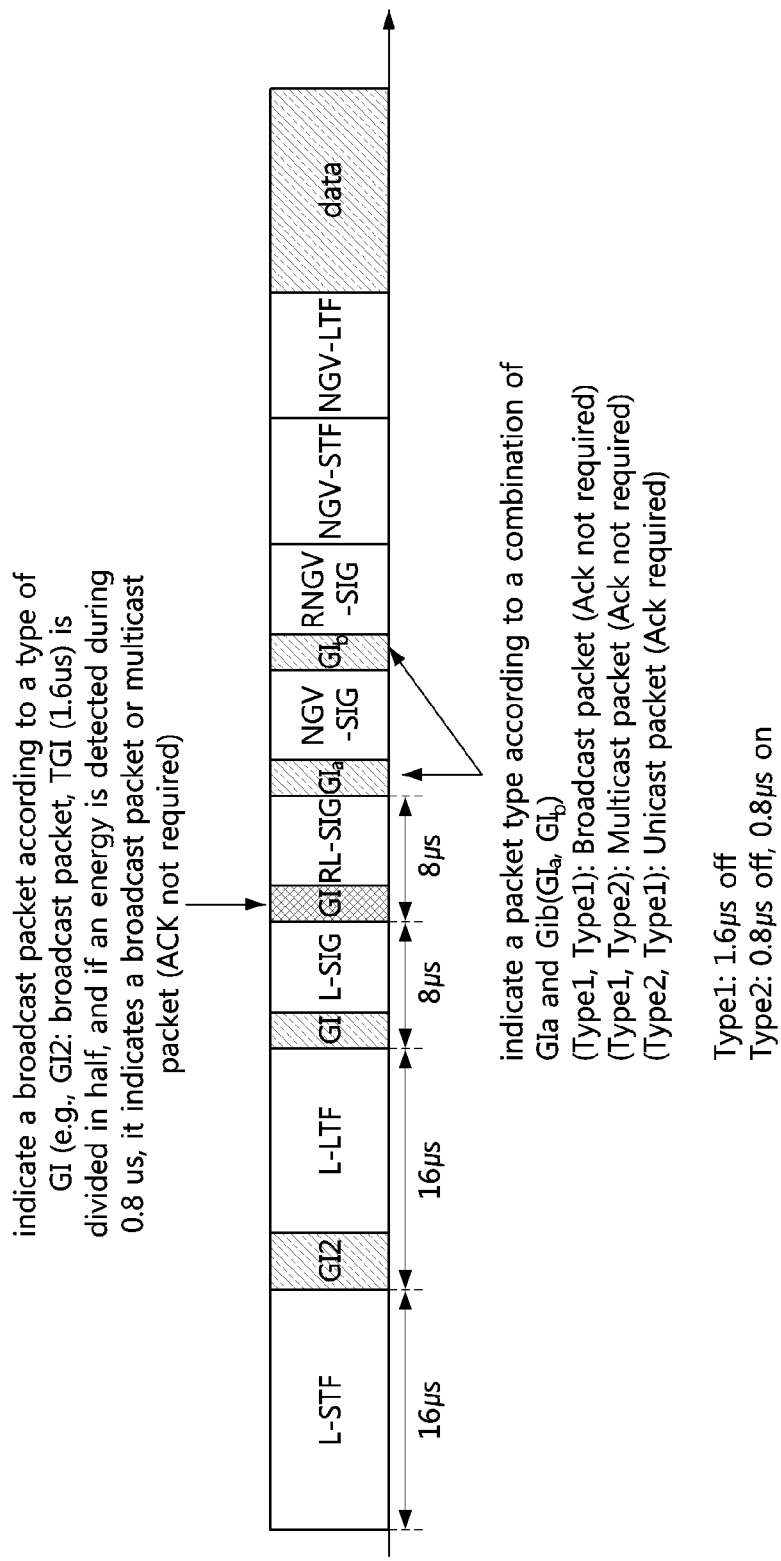
FIG. 20 is a conceptual diagram illustrating a second exemplary embodiment of a frame structure indicating whether ACK is required in a wireless LAN signal.

FIG. 20 is a conceptual diagram illustrating a second exemplary embodiment of a frame structure indicating whether ACK is required in a wireless LAN signal.

As shown in FIG. 20, a broadcast frame and a multicast frame among frames may not require ACK for the frame. In addition, a unicast frame among the frames may require ACK for the frame. At least some fields of the frame may include information indicating whether ACK for the frame is required.

According to an exemplary embodiment of the present disclosure, a communication node may indicate that ACK for the frame is not required by transmitting a frame including an L-SIG and a RL-SIG field including a separate field value. Alternatively, the communication node may indicate that ACK for the frame is not required by further transmitting an energy through at least a part of the GI field.

According to another exemplary embodiment of the present disclosure, the frame may indicate whether to require ACK for the frame through a combination of the GI at the front part of the NGV-SIG field and the GI at the front part of the RNGV-SIG field. The frame may indicate whether to require ACK for the frame through a combination of at least some fields as shown in Table 4. The type 1 of Table 4 may mean turning off the entire 1.6 us of the GI, and the type 2 may mean turning off a part of the GI for 0.8 μs and turning on the remaining part thereof for 0.8 μs.

TABLE 4

| NGV-SIG | RNGV-SIG | Frame type | Whether ACK is required |
|---------|----------|------------|-------------------------|
| Type 1  | Type 2   | Broadcast  | Not required            |
| Type 1  | Type 2   | Multicast  | Not required            |
| Type 2  | Type 1   | Unicast    | Required                |

Figure 21:
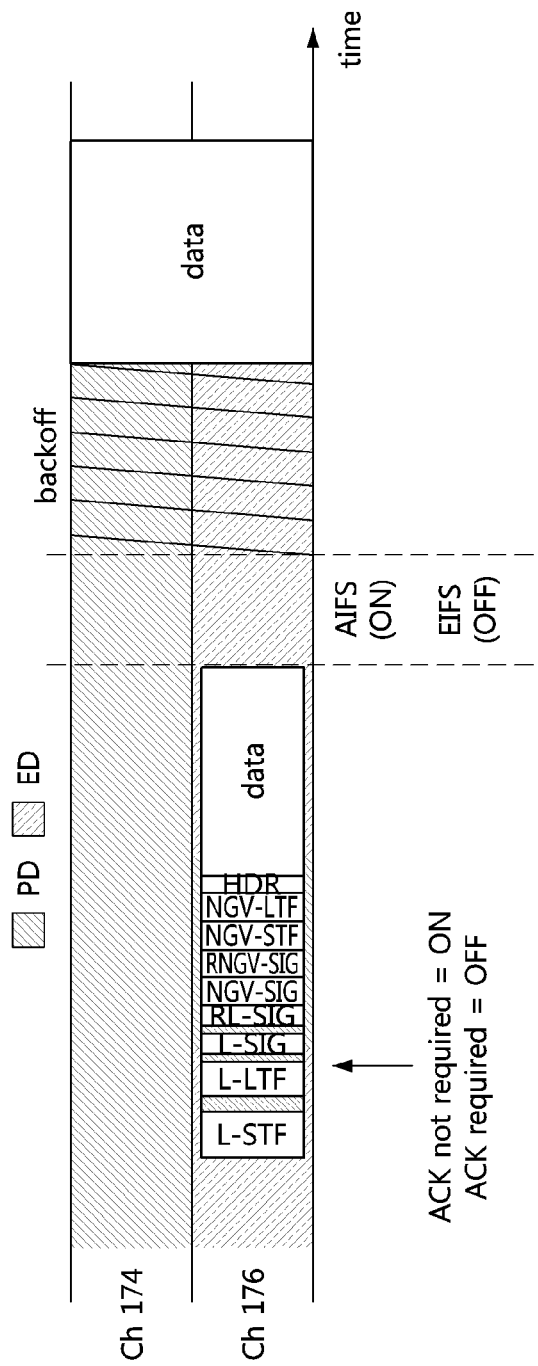
FIG. 21 is a conceptual diagram illustrating an exemplary embodiment of a frame transmission operation according to whether to require ACK for a frame.

FIG. 21 is a conceptual diagram illustrating an exemplary embodiment of a frame transmission operation according to whether to require ACK for a frame.

As shown in FIG. 21, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may monitor whether channels (e.g., primary channel and/or secondary channel) are busy before transmitting a frame. The communication node may monitor a channel state of the primary channel by performing at least one of the PD operation, the ED operation, or the NAV value identifying operation, and may monitor a channel state of the secondary channel by performing the ED operation. As a result of monitoring the channels (e.g., primary channel and/or the secondary channel), if the channels (e.g., primary channel and secondary channel) are occupied by another communication node, the communication node may wait until the busy state of the channels ends.

The communication node may identify whether the channels (e.g., primary channel and/or secondary channel) are busy during a preset time period. The preset time period may be determined according to whether or not ACK for the frame is required. For example, according to the exemplary embodiment of FIG. 21, when the frame does not require ACK therefor, the communication node may determine whether the channels (e.g., primary channel and secondary channel) are busy during the preset AIFS time period. On the other hand, when the frame requires ACK therefor, the communication node may determine whether the channels (e.g., primary channel and secondary channel) are busy during a preset EIFS time period that is longer than the AIFS time period.

If the channels (e.g., primary channel and secondary channels) are not busy during the preset time period (e.g., AIFS and/or EIFS), the communication node may perform a random backoff operation on the channels.

For example, the communication node may perform the random backoff operation on the primary channel and the secondary channel. According to another exemplary embodiment, the communication node may generate a random backoff count value, and may perform channel sensing operations on the primary channel and the secondary channel during a period corresponding to the generated random backoff count value. The communication node performing the random backoff operation may decrease the random backoff count value only when both the primary channel and the secondary channel are idle. When the communication node completes the random backoff operation on the primary channel and the secondary channel (i.e., when the random backoff count value becomes zero), the communication node may transmit a frame through the primary channel and the secondary channel.

Figure 22:
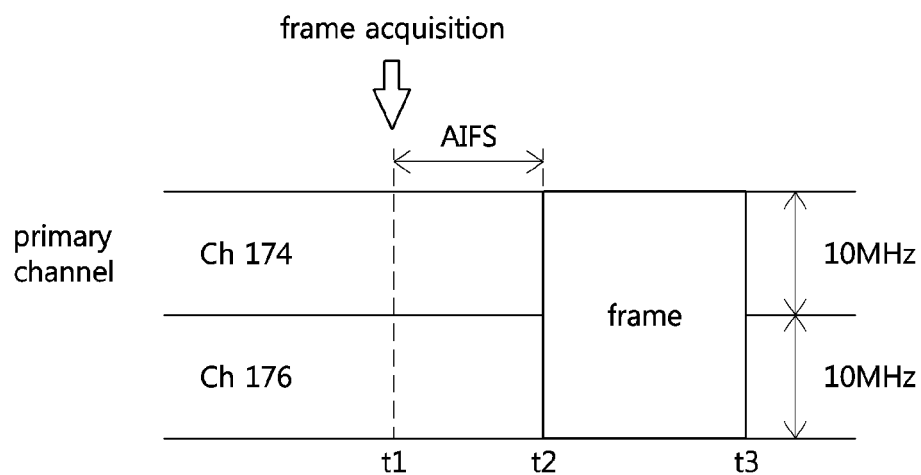
FIG. 22 is a conceptual diagram illustrating an exemplary embodiment of a frame transmission operation according to an access class (AC) of a frame.

FIG. 22 is a conceptual diagram illustrating an exemplary embodiment of a frame transmission operation according to an access class (AC) of a frame.

As shown in FIG. 22, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may identify whether the channels (e.g., primary channel and/or secondary channel) are busy during a preset AIFS time period (i.e., t1 to t2). If the channels (e.g., primary channel and/or secondary channel) are idle, the communication node may identify whether the channels (e.g., primary channel and/or secondary channel) are busy during an AIFS time period having a different length (i.e., t1 to t2) according to an access class (AC) that is a payload type of the frame. The AIFS time period may be set according to an AC of a data unit included in the frame, as described in FIG. 4 and related contents.

Alternatively, the communication node may configure a separate time period (e.g., xIFS, etc.) for transmitting a frame of NGV communication instead of the preset AIFS time period, wait during the separate time period, and then transmit the frame (i.e., t2 to t3). The shorter the length of the xIFS time period, the higher a priority of the frame, and the longer the length of the xIFS time period, the lower the priority of the frame. If the primary channel and the secondary channel are idle during the AIFS or xIFS time period, the communication node may transmit the frame through the primary channel and the secondary channel.

Figure 23:
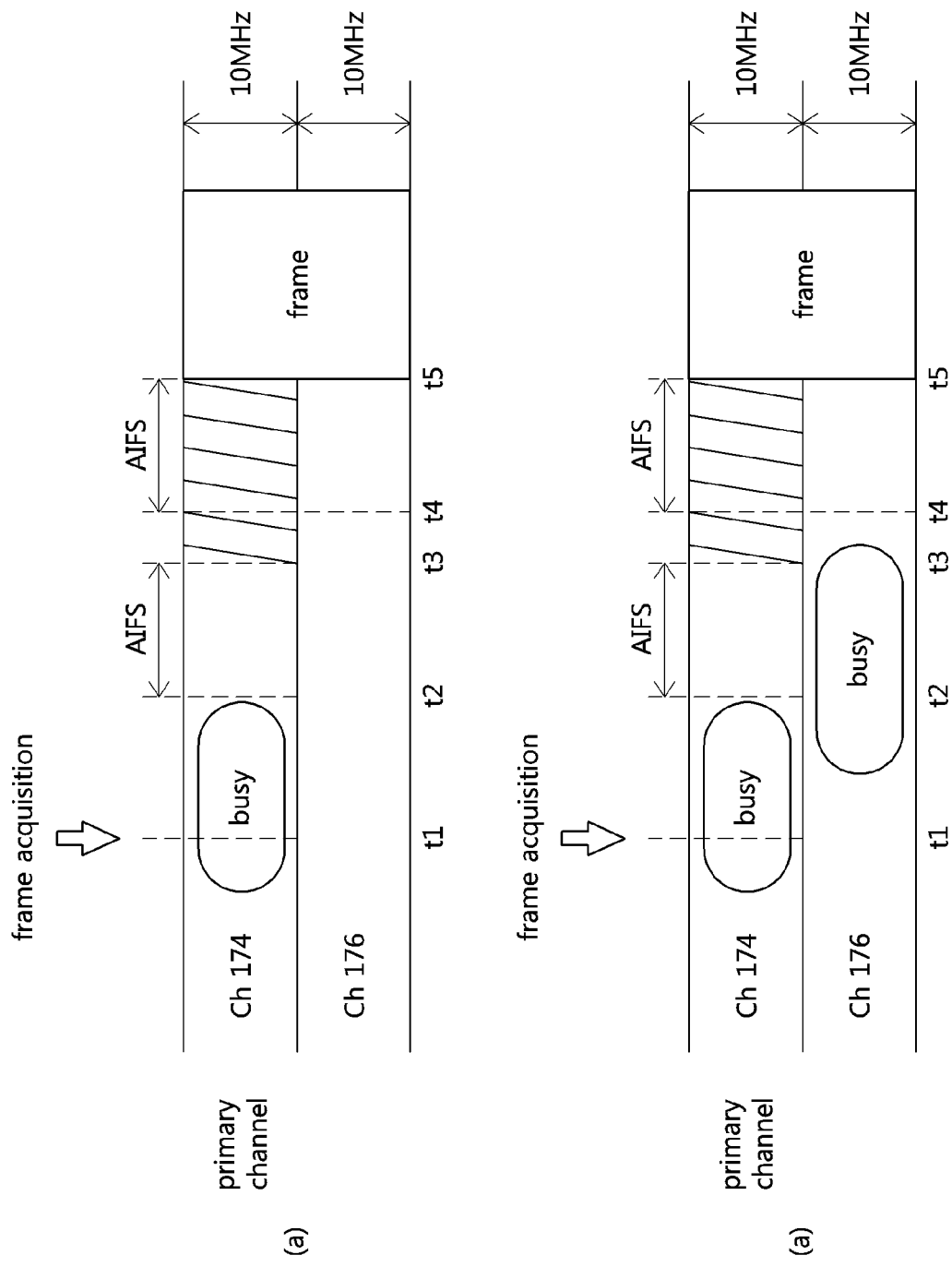
FIG. 23 is a conceptual diagram illustrating a first exemplary embodiment of a frame transmission operation through a 20 MHz channel as a result of channel monitoring and random backoff operation.

FIG. 23 is a conceptual diagram illustrating a first exemplary embodiment of a frame transmission operation through a 20 MHz channel as a result of channel monitoring and random backoff operation.

As shown in FIG. 23, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may monitor whether the channels (e.g., primary channel and/or secondary channel) are busy before transmitting a frame (i.e., t1). As a result of the channel monitoring, if the primary channel is occupied by another communication node, the communication node may wait until the busy state of the primary channel ends (i.e., t1 to t2).

When the primary channel is switched from the busy state to the idle state (i.e., t2), the communication node may identify whether the channels are busy by monitoring the primary channel during a preset AIFS time period (i.e., t2 to t3). As shown in (a) of FIG. 23, the channels (e.g., primary channel and secondary channel) may be idle during the AIFS time period (i.e., t2 to t3). Also, as shown in (b) of FIG. 23, the primary channel may be idle, and the secondary channel may be busy during the AIFS time period (i.e., t2 to t3). In addition, the communication node may identify whether the primary channel is busy by monitoring the primary channel during the preset AIFS time period. Accordingly, regardless of the occupancy state of the secondary channel, the communication node may continue the channel access operation.

As a result of the channel monitoring, if the primary channel is not busy during the preset AIFS time period (i.e., t2 to t3), the communication node may perform a random backoff operation on the primary channel (i.e., t3 to t5). In addition, the communication node may perform a channel monitoring operation on the secondary channel during a preset time period (i.e., t4 to t5). The length of the preset time period may be an AIFS, and an ending time of the AIFS may be the same as a completion time of the random backoff operation on the primary channel. When the communication node completes the random backoff operation on the primary channel (i.e., t3 to t5) and the secondary channel is idle during the AIFS time period (i.e., t4 to t5), the communication node may transmit a frame through the primary channel and the secondary channel.

Figure 24:
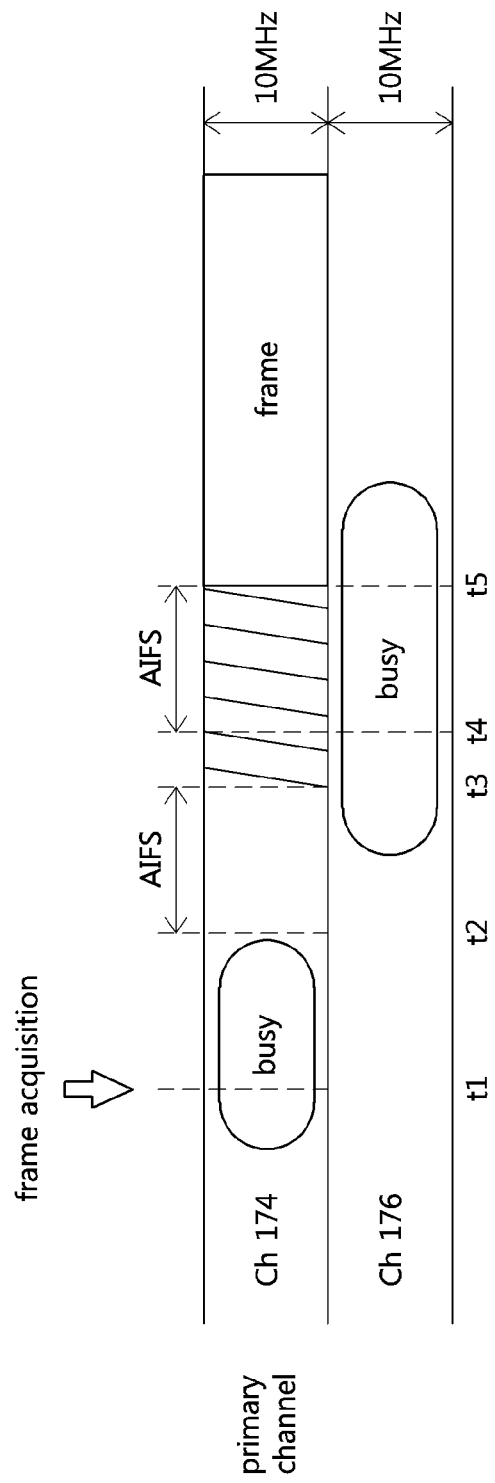
FIG. 24 is a conceptual diagram illustrating a first exemplary embodiment of a frame transmission operation through a 10 MHz primary channel as a result of channel monitoring and random backoff operation.

FIG. 24 is a conceptual diagram illustrating a first exemplary embodiment of a frame transmission operation through a 10 MHz primary channel as a result of channel monitoring and random backoff operation.

As shown in FIG. 24, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may monitor the channels (e.g., primary channel and/or secondary channel) before transmitting a frame (i.e., t1). According to the exemplary embodiment of FIG. 24, if the primary channel is occupied by another communication node, the communication node may wait until the busy state of the primary channel ends (i.e., t1 to t2).

When the primary channel is switched from the busy state to the idle state (i.e., t2), the communication node may identify whether the channels (e.g., primary channel and/or secondary channel) are busy by monitoring the channels during a preset AIFS time period (i.e., t2 to t3). According to the exemplary embodiment of FIG. 24, the communication node may determine whether the primary channel is busy during the preset AIFS time period (i.e., t2 to t3). Accordingly, despite the secondary channel being busy during the AIFS time period, the communication node may proceed with the channel access operation.

As a result of the channel monitoring, if the primary channel is not busy during the preset AIFS time period (i.e., t2 to t3), the communication node may perform a random backoff operation on the primary channel (i.e., t3 to t5). In addition, the communication node may perform a channel monitoring operation on the secondary channel during a preset time period (i.e., t4 to t5). The length of the preset time period may be an AIFS, and an ending time of the AIFS may be the same as a completion time of the random backoff operation on the primary channel. When the communication node completes the random backoff operation on the primary channel (i.e., t3 to t5) and the secondary channel is idle during the AIFS time period (i.e., t4 to t5), the communication node may transmit a frame through the primary channel.

Figure 25:
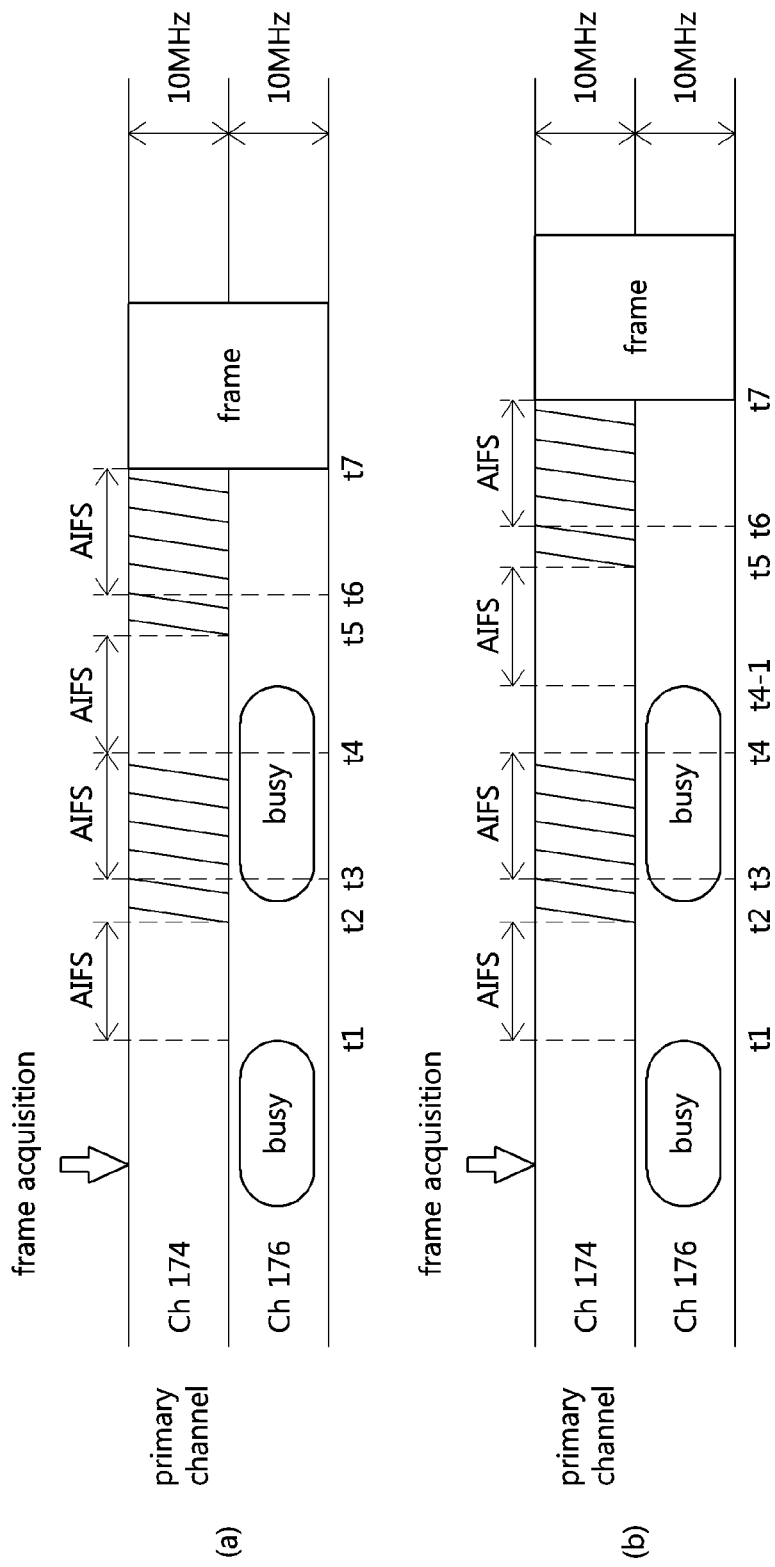
FIG. 25 is a conceptual diagram illustrating a second exemplary embodiment of a frame transmission operation through a 20 MHz channel as a result of channel monitoring and random backoff operation.

FIG. 25 is a conceptual diagram illustrating a second exemplary embodiment of a frame transmission operation through a 20 MHz channel as a result of channel monitoring and random backoff operation.

As shown in FIG. 25, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may identify whether the channels (e.g., primary channel and/or secondary channel) are busy by monitoring the channels before transmitting a frame (i.e., t1). If at least one (e.g., secondary channel) of the channels (e.g., primary channel and/or secondary channel) is occupied by another communication node, the communication node may wait until the busy state of the secondary channel ends (i.e., t1).

When the secondary channel is switched from the busy state to the idle state (i.e., t1), the communication node may identify whether the channels (e.g., primary channel and/or secondary channel) are busy during a preset AIFS time period. According to the exemplary embodiments of (a) and (b) of FIG. 25, the communication node may determine whether the primary channel is busy during the preset AIFS time period (i.e., t1 to t2).

If the primary channel is not busy during the preset AIFS time period, the communication node may perform a random backoff operation on the primary channel (i.e., t2 to t4). In addition, the communication node may perform a channel monitoring operation on the secondary channel during a preset time period (i.e., t3 to t4). The length of the preset time period may be an AIFS, and an ending time of the AIFS may be the same as a completion time of the random backoff operation on the primary channel. The communication node may complete the backoff operation on the primary channel, and if the secondary channel is idle during the AIFS time period, the communication node may not transmit a frame through the primary channel although the communication node acquires a frame transmission opportunity through the primary channel as a result of the backoff operation.

The communication node having completed the random backoff operation on the primary channel may perform the channel access operation again for frame transmission through a 20 MHz channel. That is, it is possible to determine whether the primary channel is busy by monitoring the primary channel during a preset AIFS time period. According to the exemplary embodiment of (a) of FIG. 25, the communication node may monitor the primary channel during the preset AIFS time period from a completion time of the random backoff operation on the primary channel (i.e., t4 to t5). Alternatively, according to the exemplary embodiment of (b) of FIG. 25, the communication node may determine whether the primary channel is busy by monitoring the primary channel during a preset AIFS time period from a starting time (i.e., t4-1) of the idle state of the secondary channel (i.e., t4-1 to t5).

If the channels (e.g., primary channel and/or secondary channel) are not busy during the preset AIFS time period, the communication node may perform a random backoff operation on the primary channel (i.e., t5 to t7). In addition, the communication node may perform a channel monitoring operation on the secondary channel during a preset time period (i.e., t6 to t7). The length of the preset time period may be an AIFS, and an ending time of the AIFS may be the same as a completion time of the random backoff operation on the primary channel. The communication node may complete the random backoff operation on the primary channel (i.e., t5 to t7), and if the secondary channel is idle during the AIFS time period (i.e., t6 to t7), the communication node may transmit a frame through the primary channel and the secondary channel.

Figure 26:
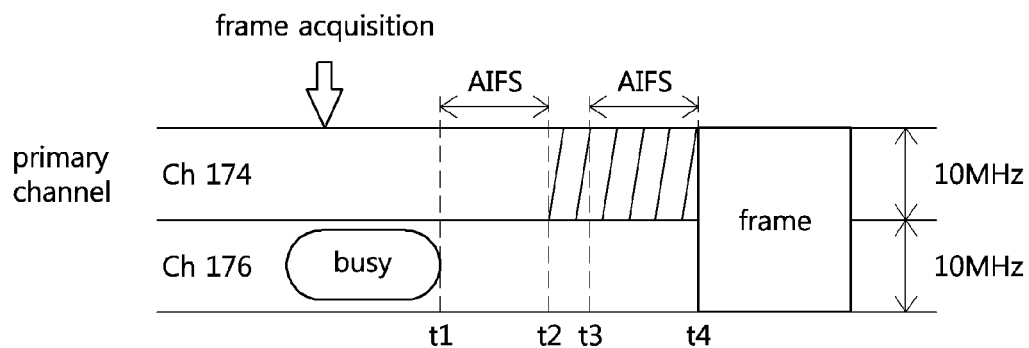
FIG. 26 is a conceptual diagram illustrating a third exemplary embodiment of a frame transmission operation through a 20 MHz channel as a result of channel monitoring and random backoff operation.

FIG. 26 is a conceptual diagram illustrating a third exemplary embodiment of a frame transmission operation through a 20 MHz channel as a result of channel monitoring and random backoff operation.

As shown in FIG. 26, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may monitor the channels (e.g., primary channel and/or secondary channel) before transmitting a frame. According to the exemplary embodiment of FIG. 26, if the secondary channel is occupied by another communication node, the communication node may wait until the busy state of the secondary channel ends (i.e., t1).

When the secondary channel is switched from the busy state to the idle state (i.e., t1), the communication node may identify whether the channels (e.g., primary channel and/or secondary channel) are busy by monitoring the channels during a preset AIFS time period. According to the exemplary embodiment of FIG. 26, the communication node may determine whether the primary channel and the secondary channel are busy during the preset AIFS time period (i.e., t1 to t2).

As a result of the channel monitoring, if the channels (e.g., primary channel and secondary channel) are not busy during the preset AIFS time period (i.e., t1 to t2), the communication node may perform a random backoff operation on the primary channel (i.e., t2 to t4). In addition, the communication node may perform a channel monitoring operation on the secondary channel during a preset time period (i.e., t3 to t4). The length of the preset time period may be an AIFS, and an ending time of the AIFS may be the same as a completion time of the random backoff operation on the primary channel. The communication node may complete the random backoff operation on the primary channel, and if the secondary channel is idle during the AIFS period, the communication node may transmit a frame through the primary channel and the secondary channel.

Figure 27:
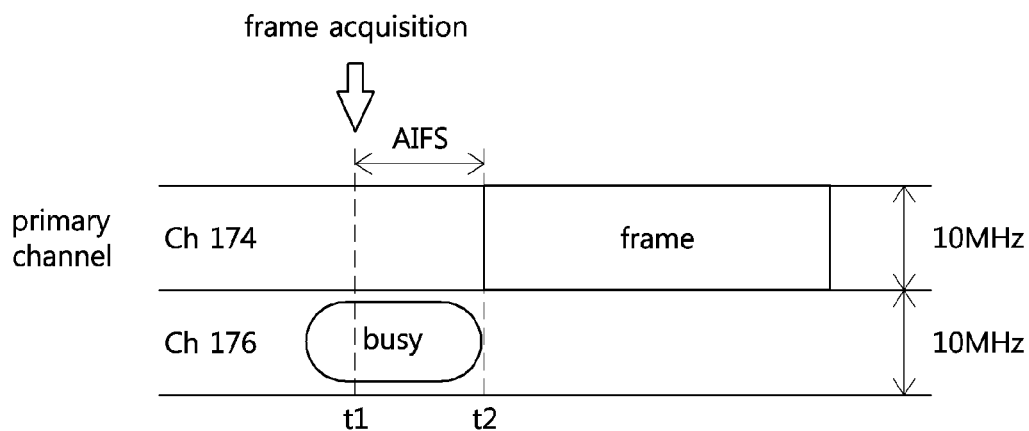
FIG. 27 is a conceptual diagram illustrating a first exemplary embodiment of a frame transmission operation through a primary channel among channels of a 20 MHz band based on a channel monitoring result.

FIG. 27 is a conceptual diagram illustrating a first exemplary embodiment of a frame transmission operation through a primary channel among channels of a 20 MHz band based on a channel monitoring result.

As shown in FIG. 27, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may identify whether the channels (e.g., primary channel and/or secondary channel) are busy by monitoring the channels during a preset AIFS time period before transmitting a frame (i.e., t1 to t2). According to the exemplary embodiment of FIG. 27, the communication node may determine whether the primary channel and the secondary channel are busy during the preset AIFS time period (i.e., t1 to t2).

As a result of the channel monitoring, if the primary channel is not busy and the secondary channel is busy during the preset AIFS time period, the communication node may perform fallback transmission of a frame through the primary channel without performing a separate random backoff operation.

Figure 28:
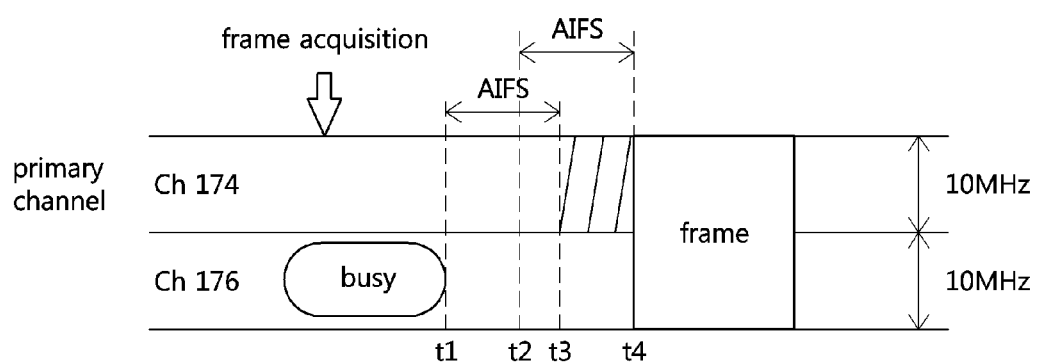
FIG. 28 is a conceptual diagram illustrating a fourth exemplary embodiment of a frame transmission operation through a 20 MHz channel as a result of channel monitoring and random backoff operation.

FIG. 28 is a conceptual diagram illustrating a fourth exemplary embodiment of a frame transmission operation through a 20 MHz channel as a result of channel monitoring and random backoff operation.

As shown in FIG. 28, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may monitor the channels (e.g., primary channel and/or secondary channel) before transmitting a frame. According to the exemplary embodiment of FIG. 28, if the secondary channel is occupied by another communication node, the communication node may wait until the busy state of the secondary channel ends (i.e., t1).

When the secondary channel is switched from the busy state to the idle state (i.e., t1), the communication node may identify whether the channels (e.g., primary channel and/or secondary channel) are busy by monitoring the channels during a preset AIFS time period. According to the exemplary embodiment of FIG. 28, the communication node may determine whether the primary channel and the secondary channel are busy during the preset AIFS time period (i.e., t1 to t2).

As a result of the channel monitoring, if the channels (e.g., primary channel and secondary channel) are not busy during the preset AIFS time period (i.e., t1 to t3), the communication node may perform a random backoff operation on the primary channel (i.e., t3 to t4). In addition, the communication node may perform a channel monitoring operation on the secondary channel during a preset time period (i.e., t2 to t4). The length of the preset time period may be an AIFS, and an ending time of the AIFS may be the same as a completion time of the random backoff operation on the primary channel. When a backoff timer is shorter than the AIFS time period, the AIFS periods may overlap each other (i.e., t2 to t3). The communication node may monitor whether the primary channel and the secondary channel are idle by monitoring the primary channel and the secondary channel during the AIFS time period, despite the overlap of the AIFS time periods. The communication node may complete the random backoff operation on the primary channel (i.e., t3 to t4), and if the secondary channel is idle during the AIFS period (i.e., t2 to t4), the communication node may transmit a frame through the primary channel and the secondary channel.

Figure 29:
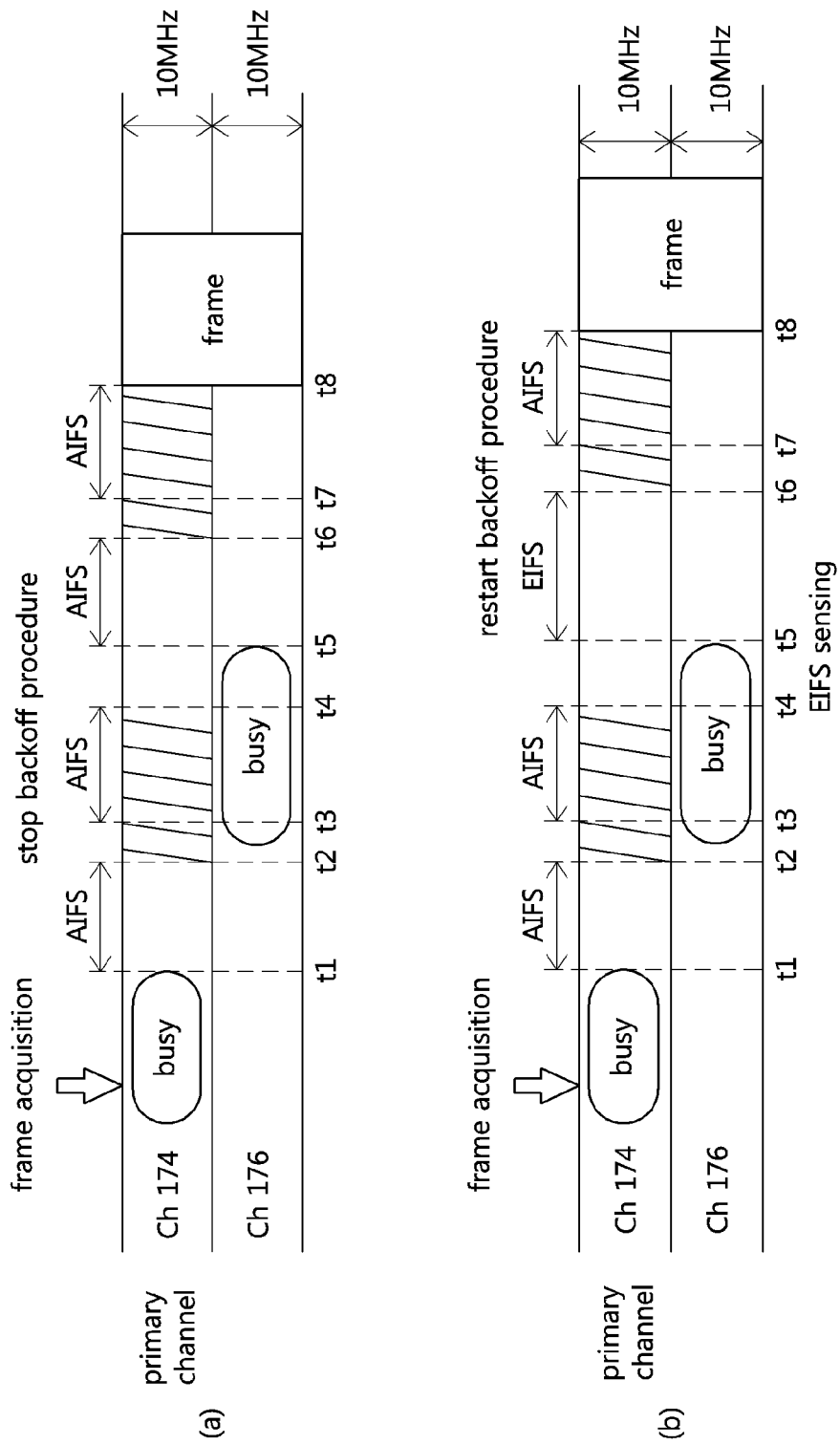
FIG. 29 is a conceptual diagram illustrating a fifth exemplary embodiment of a frame transmission operation through a 20 MHz channel as a result of channel monitoring and random backoff operation.

FIG. 29 is a conceptual diagram illustrating a fifth exemplary embodiment of a frame transmission operation through a 20 MHz channel as a result of channel monitoring and random backoff operation.

As shown in FIG. 29, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may identify whether channels (e.g., primary channel and/or secondary channel) are busy by monitoring the channels before transmitting a frame. The communication node may monitor a channel state of the primary channel by performing at least one of the PD operation, the ED operation, or the NAV value identifying operation, and may monitor a channel state of the secondary channel by performing the ED operation. If at least one channel (e.g., primary channel) of the channels (e.g., primary channel and/or secondary channel) is occupied by another communication node, the communication node may wait until the busy state of the at least one channel ends. According to the embodiment of FIG. 29, if the primary channel is occupied by another communication node, the communication node may wait until the busy state of the primary channel ends (i.e., t1).

When the primary channel is switched from the busy state to the idle state (i.e., t1), the communication node may identify whether the channels (e.g., primary channel and/or secondary channel) are busy during a preset time period (i.e., t1 to t2). Specifically, the communication node may identify whether the channels (e.g., primary channel and secondary channel) are busy (i.e., t1 to t2) by monitoring the channels until a later time (i.e., t2) among a time after a lapse of an AIFS time period from the time at which the primary channel is switched from the busy state to the idle state until and a time after a lapse of a preset EIFS time period from the time at which the secondary channel is switched from the busy state to the idle state (i.e., t1 to t2).

According to the exemplary embodiment of FIG. 29, the communication node may determine whether the channels (e.g., primary channel and secondary channel) are busy a preset AIFS time period (i.e., t1 to t2).

If the channels (e.g., primary channel and secondary channel) are not busy during the preset AIFS time period (i.e., t1 to t2), the communication node may perform a random backoff operation on the primary channel (i.e., t2 to t4). In addition, the communication node may perform a channel monitoring operation on the secondary channel during a preset time period (i.e., t3 to t4). The length of the preset time period may be an AIFS, and an ending time of the AIFS may be the same as a completion time of the random backoff operation on the primary channel. The communication node may complete the random backoff operation on the primary channel (i.e., t2 to t4), and if the secondary channel is busy during the AIFS time period (i.e., t3 to t4), the communication node may not transmit a frame although the communication node acquires a frame transmission opportunity through the primary channel as a result of the backoff operation.

The communication node having completed the random backoff operation on the primary channel may perform a channel access operation for frame transmission through a 20 MHz channel again after the idle state of the secondary channel starts. That is, according to the exemplary embodiment of (a) of FIG. 29, the communication node may identify whether the primary channel and the secondary channel are busy by monitoring the primary channel and the secondary channel during a preset AIFS time period from the time at which the idle state of the secondary channel starts (i.e., t5 to t6). According to the exemplary embodiment of (b) of FIG. 29, the communication node may determine whether the primary channel is busy by monitoring the primary channel during a preset EIFS time period from the time at which the idle state of the secondary channel starts (i.e., t5 to t6).

If the channels (e.g., primary channel and secondary channel) are not busy during the preset IFS time period (i.e., t5 to t6), the communication node may perform a random backoff operation on the primary channel (i.e., t6 to t8). In addition, the communication node may monitor the secondary channel during an AIFS time period (i.e., t7 to t8) before a completion time of the random backoff on the primary channel. The communication node may complete the random backoff operation on the primary channel (i.e., t6 to t8), and if the secondary channel is idle during the AIFS period (i.e., t7 to t8), the communication node may transmit a frame through the primary channel and the secondary channel.

Figure 30:
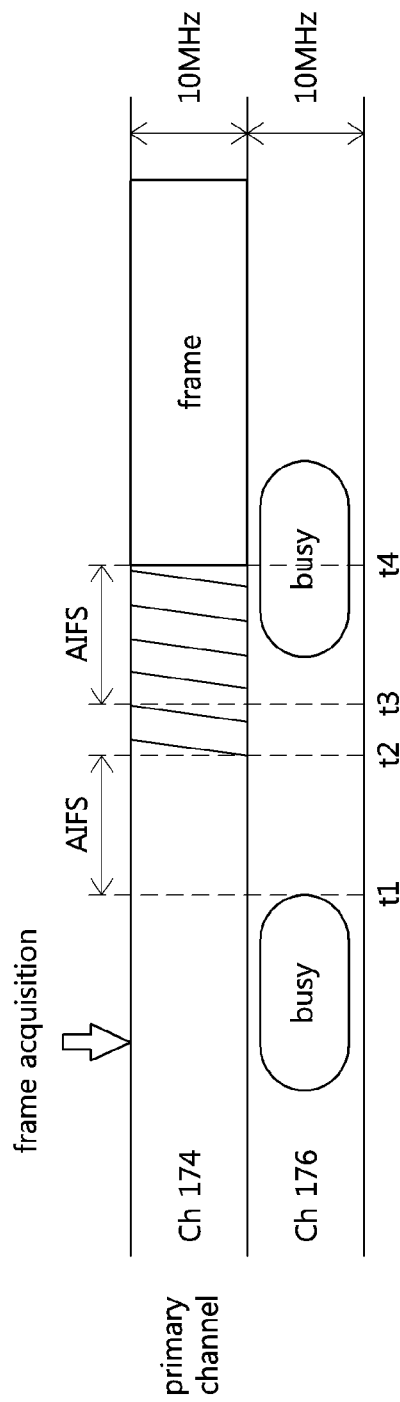
FIG. 30 is a conceptual diagram illustrating a second exemplary embodiment of a frame transmission operation through a 10 MHz primary channel as a result of channel monitoring and random backoff operation.

FIG. 30 is a conceptual diagram illustrating a second exemplary embodiment of a frame transmission operation through a 10 MHz primary channel as a result of channel monitoring and random backoff operation.

As shown in FIG. 30, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may identify whether the channels (e.g., primary channel and/or secondary channel) are busy by monitoring the channels before transmitting a frame. If at least one channel (e.g., secondary channel) of the channels (e.g., primary channel and/or secondary channel) is occupied by another communication node, the communication node may wait until the busy state of the secondary channel ends.

When the secondary channel is switched from the busy state to the idle state, the communication node may identify whether the channels (e.g., primary channel and/or secondary channel) are busy during a preset AIFS time period. According to the exemplary embodiment of FIG. 30, the communication node may determine whether the channels (e.g., primary channel and secondary channel) are busy during the preset AIFS time period (i.e., t1 to t2).

If the channels (e.g., primary channel and secondary channel) are not busy during the preset AIFS time period, the communication node may perform a random backoff operation on the primary channel (i.e., t2 to t4). In addition, the communication node may perform a channel monitoring operation on the secondary channel during a preset time period (i.e., t3 to t4). The length of the preset time period may be an AIFS, and an ending time of the AIFS may be the same as a completion time of the random backoff operation on the primary channel. The communication node may complete the random backoff operation on the primary channel (i.e., t2 to t4), and if the secondary channel is busy during the AIFS time period (i.e., t3 to t4), the communication node may perform fallback transmission of a frame through the primary channel.

Figure 31:
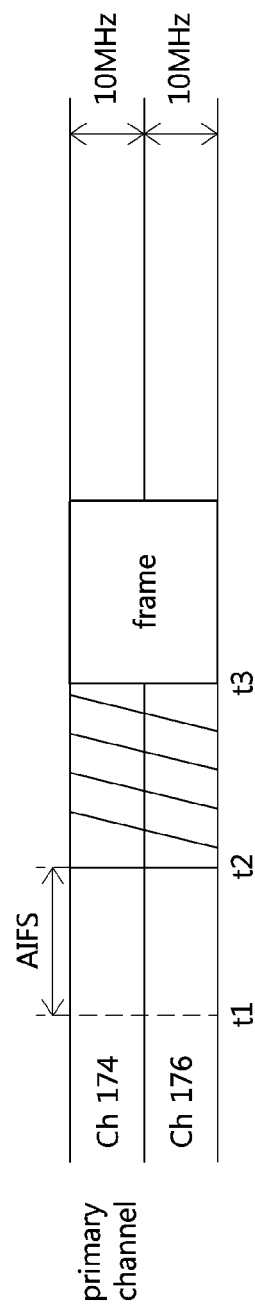
FIG. 31 is a conceptual diagram illustrating a first exemplary embodiment of a frame transmission operation through a 20 MHz channel as a result of channel monitoring and random backoff operation on a primary channel and a secondary channel.

FIG. 31 is a conceptual diagram illustrating a first exemplary embodiment of a frame transmission operation through a 20 MHz channel as a result of channel monitoring and random backoff operation on a primary channel and a secondary channel.

As shown in FIG. 31, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may identify whether the channels (e.g., primary channel and/or secondary channel) are busy during a preset AIFS time period before transmitting a frame (i.e., t1 to t2). According to the exemplary embodiment of FIG. 31, the communication node may determine whether the channels (e.g., primary channel and secondary channel) are busy during the preset AIFS time period (i.e., t1 to t2).

If channels (e.g., primary channel and secondary channel) are not busy during the preset AIFS time period (i.e., t1 to t2), the communication node may perform a random backoff operation on the channels (i.e., t2 to t3).

For example, the communication node may perform a random backoff operation on the primary channel and the secondary channel (i.e., t2 to t3). According to another exemplary embodiment, the communication node may perform a random backoff operation on the primary channel (i.e., t2 to t3). The communication node may generate one random backoff count value to be applied to the primary channel and the secondary channel, and may perform channel sensing operations on the primary channel and the secondary channel during a period corresponding to the generated random backoff count value. The sensing operations performed on the primary channel and the secondary channel may be according to different sensing schemes. A sensing scheme capable of identifying a transmission time of a frame may be applied to the primary channel, and a sensing scheme not capable of identifying a transmission time of a frame may be applied to the secondary channel. The communication node performing the random backoff operation may decrease the random backoff count value only when both the primary channel and the secondary channel are idle. When the communication node completes the random backoff operation on the channels (i.e., t2 to t3), the communication node may transmit a frame through the primary channel and the secondary channel.

According to another exemplary embodiment, the communication node may perform a channel access operation on the entire 20 MHz channel including two 10 MHz channels without performing a channel extension operation. The communication node may not configure a primary channel among 10 MHz channels. Before transmitting the frame, the communication node may identify whether the 20 MHz channel is busy during the preset AIFS time period (i.e., t1 to t2). According to the exemplary embodiment of FIG. 31, the communication node may determine whether the 20 MHz channel is busy during the preset AIFS time period (i.e., t1 to t2). If at least one of two 10 MHz channels included in the 20 MHz channel is busy, the communication node may consider that it detects that the 20 MHz channel is busy. If the 20 MHz channel is not busy during the preset AIFS time period (i.e., t1 to t2), the communication node may perform a random backoff operation on the 20 MHz channel (i.e., t2 to t3). The communication node may generate a random backoff count value, and may perform a channel sensing operation on the 20 MHz channel during a period corresponding to the generated random backoff count value. The communication node performing the random backoff operation may decrease the random backoff count value only when the entire 20 MHz channel is idle. When the communication node completes the random backoff operation on the 20 MHz channel (i.e., t2 to t3), the communication node may transmit a frame through the 20 MHz channel. That is, the communication node may not perform fallback transmission, which is transmission of a frame through only a 10 MHz channel.

Figure 32:
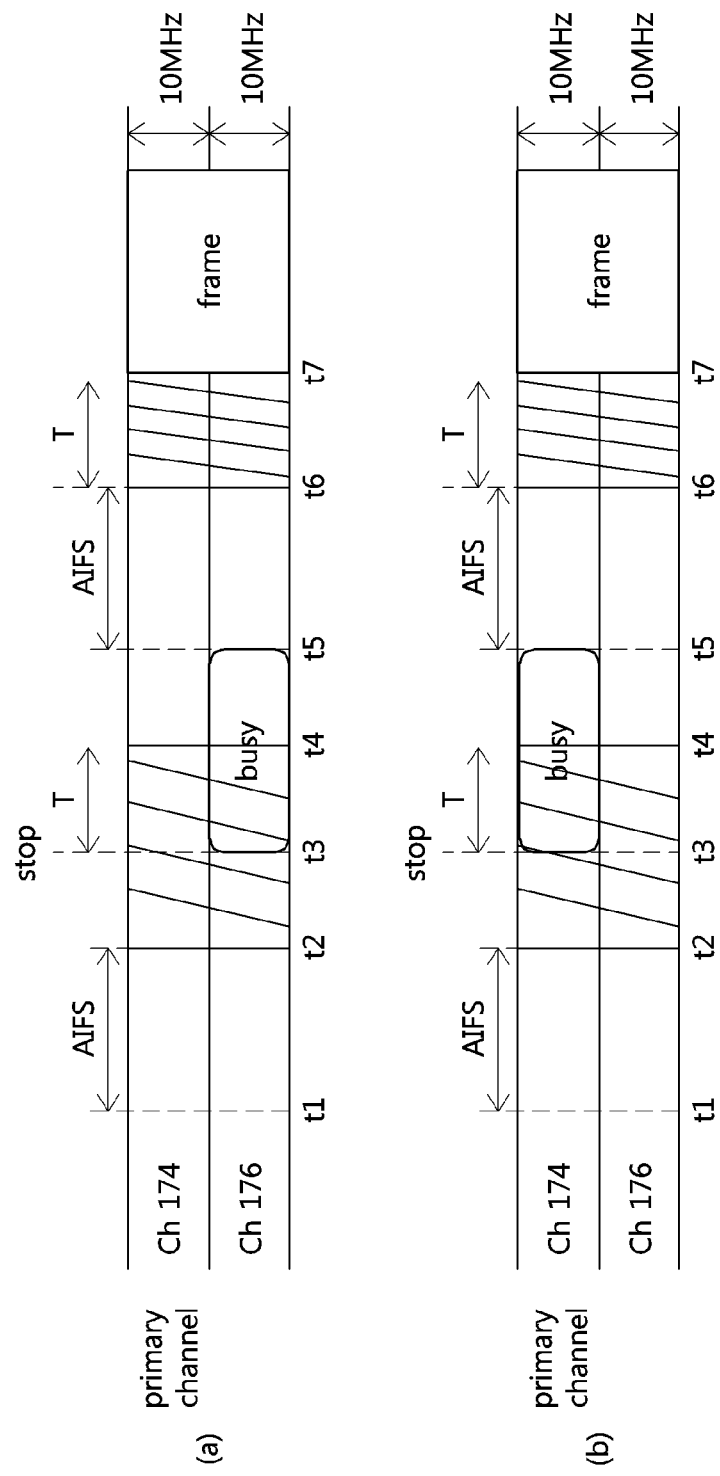
FIG. 32 is a conceptual diagram illustrating a second exemplary embodiment of a frame transmission operation through a 20 MHz channel as a result of channel monitoring and random backoff operation on a primary channel and a secondary channel.

FIG. 32 is a conceptual diagram illustrating a second exemplary embodiment of a frame transmission operation through a 20 MHz channel as a result of channel monitoring and random backoff operation on a primary channel and a secondary channel.

As shown in FIG. 32, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may identify whether the channels (e.g., primary channel and/or secondary channel) are busy during a preset AIFS time period before transmitting a frame (i.e., t1 to t2). According to the exemplary embodiment of FIG. 32, the communication node may determine whether the channels (e.g., primary channel and secondary channel) are busy during the preset AIFS time period (i.e., t1 to t2).

If the channels (e.g., primary channel and secondary channel) are not busy during the preset AIFS time period (i.e., t1 to t2), the communication node may perform a random backoff operation on the channels (i.e., t2 to t4). For example, the communication node may perform a random backoff operation on the primary channel and the secondary channel (i.e., t2 to t3). According to another exemplary embodiment, the communication node may perform a random backoff operation on the primary channel (i.e., t2 to t3). The communication node may generate a random backoff count value, and may perform channel sensing operations on the secondary channel during a period corresponding to the generated random backoff count value. The communication node performing the random backoff operation may decrease the random backoff count value only when both the primary channel and the secondary are idle.

If at least one (e.g., secondary channel) of the channels is busy (i.e., t3 to t5) while the communication node performs the random backoff operation (i.e., t2 to t4), the communication node may stop counting the backoff counter by freezing the backoff counter. In addition, the communication node may store the remaining backoff count value at a time t3 when the counting of the backoff counter value is stopped.

The communication node that has stopped the backoff counter may determine whether the channels are busy by monitoring the channels (e.g., primary channel and secondary channel) during a preset time period (i.e., t5 to t6). According to the exemplary embodiment of (a) of FIG. 32, the communication node may determine whether the channels are busy by monitoring the channels during a preset AIFS time period from a starting time of the idle state of the secondary channel (i.e., t5 to t6). According to the exemplary embodiment of (b) of FIG. 32, the communication node may determine whether the channels are busy by monitoring the channels during a preset AIFS time period from a starting time of the idle state of the primary channel (i.e., t5 to t6).

If the channels (e.g., primary channel and/or secondary channel) are not busy for a preset time period (e.g., AIFS) (i.e., t5 to t6), the communication node may perform the backoff operation on the channels by resuming the backoff counting (i.e., t6 to t7). The communication node may perform the backoff operation on the channels based on the backoff count value at the time when the counting of the random backoff counter value was stopped (i.e., t6 to t7). When the communication node completes the backoff operation on the channels, the communication node may transmit a frame through the primary channel and the secondary channel.

Figure 33:
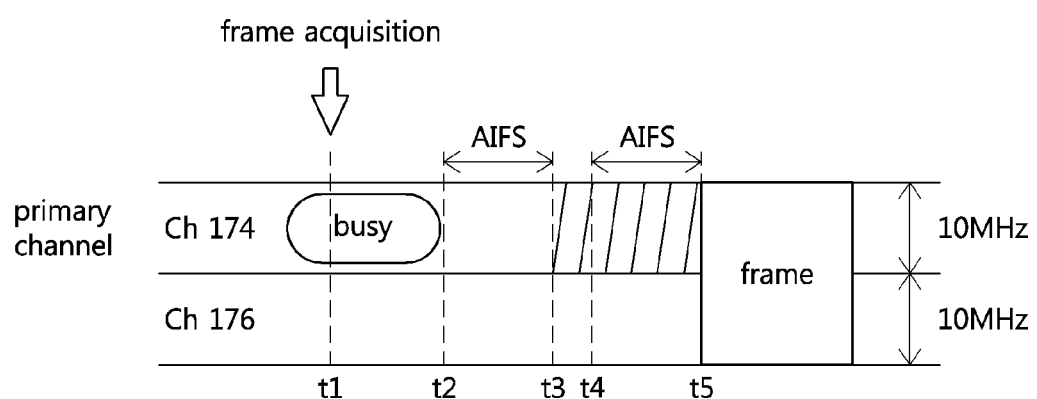
FIG. 33 is a conceptual diagram illustrating a sixth exemplary embodiment of a frame transmission operation through a 20 MHz channel as a result of channel monitoring and random backoff operation.

FIG. 33 is a conceptual diagram illustrating a sixth exemplary embodiment of a frame transmission operation through a 20 MHz channel as a result of channel monitoring and random backoff operation.

As shown in FIG. 33, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may monitor whether channels (e.g., primary channel and/or secondary channel) are busy before transmitting a frame (i.e., t1). The communication node may monitor a channel state of the primary channel by performing at least one of the PD operation, the ED operation, or the NAV value identifying operation, and may monitor a channel state of the secondary channel by performing the ED operation. As a result of monitoring the channels (e.g., primary channel and/or the secondary channel), if the primary channel is occupied by another communication node, the communication node may wait until the busy state of the primary channel ends.

When the primary channel is switched from the busy state to the idle state, the communication node may identify whether the channels (e.g., primary channel and secondary channel) are busy by monitoring the channels during a preset AIFS time period (i.e., t2 to t3). Specifically, the communication node may identify whether the channels (e.g., primary channel and secondary channel) are busy by monitoring the channels during a preset AIFS time period (i.e., t2 to t3). If the primary channel is occupied by another communication node during the AIFS time period (i.e., t2 to t3), the communication node may identify whether the channels (e.g., primary channel and secondary channel) are busy by monitoring the channels during the AIFS time period from the time when the busy state of the primary channel ends.

As a result of the channel monitoring, if the channels (e.g., primary channel and secondary channel) are not busy during the preset AIFS time period (i.e., t2 to t3), the communication node may perform a random backoff operation on the primary channel (i.e., t3 to t5). In addition, the communication node may perform a channel monitoring operation on the secondary channel during a preset time period (i.e., t4 to t5). The length of the preset time period may be an AIFS, and an ending time of the AIFS may be the same as a completion time of the random backoff operation on the primary channel. The communication node may complete the random backoff operation on the primary channel (i.e., t3 to t5), and if the secondary channel is idle during the AIFS period (i.e., t4 to t5), the communication node may transmit a frame through the primary channel and the secondary channel.

Figure 34:
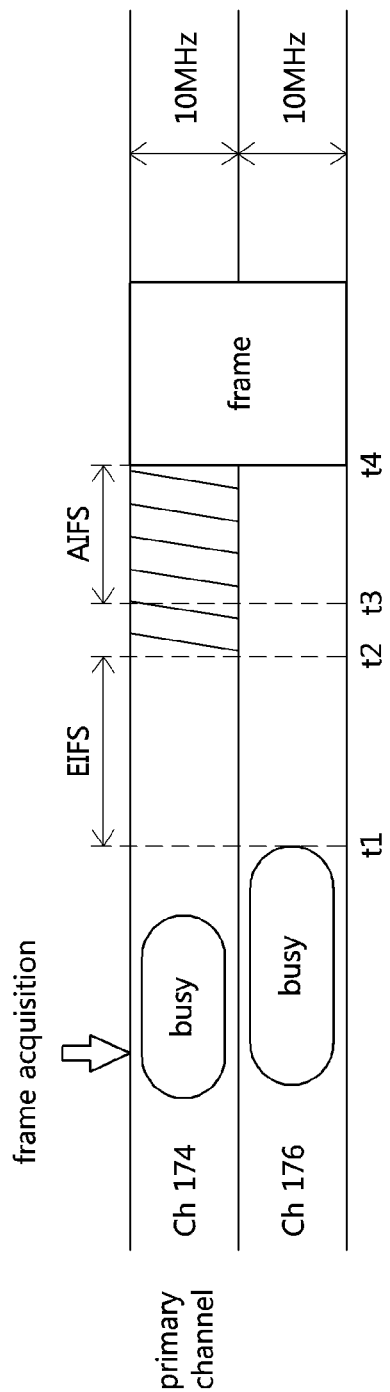
FIG. 34 is a conceptual diagram illustrating a seventh exemplary embodiment of a frame transmission operation through a 20 MHz channel as a result of channel monitoring and random backoff operation.

FIG. 34 is a conceptual diagram illustrating a seventh exemplary embodiment of a frame transmission operation through a 20 MHz channel as a result of channel monitoring and random backoff operation.

As shown in FIG. 34, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may monitor whether channels (e.g., primary channel and/or secondary channel) are busy before transmitting a frame. The communication node may monitor a channel state of the primary channel by performing at least one of the PD operation, the ED operation, or the NAV value identifying operation, and may monitor a channel state of the secondary channel by performing the ED operation. As a result of monitoring the channels (e.g., primary channel and/or the secondary channel), if the channels (e.g., primary channel and secondary channel) are occupied by another communication node, the communication node may wait until the busy state of the channels ends.

When the channels are switched from the busy state to the idle state, the communication node may identify whether the channels (e.g., primary channel and/or secondary channel) are idle by monitoring the channels during a preset time period (i.e., t1 to t2). Specifically, the communication node may identify whether the channels are busy by monitoring the channels until a later time t2 among a time after a lapse of an AIFS time from the time at which the primary channel is switched from the busy state to the idle state and a time after a lapse of a preset EIFS time from the time at which the secondary channel is switched from the busy state to the idle state (i.e., t1 to t2).

As a result of the channel monitoring, if the channels (e.g., primary channel and secondary channel) are not busy during the preset AIFS time period (i.e., t1 to t2), or if the primary channel is not busy during the AIFS time period from the time at which the primary channel is switched to the idle state, and the secondary channel is not busy during the preset EIFS time period from the time at which the secondary channel is switched to the idle state (i.e., t1 to t2), the communication node may perform a random backoff operation on the primary channel (i.e., t2 to t4). In addition, the communication node may perform a channel monitoring operation on the secondary channel during a preset time period (i.e., t3 to t4). The length of the preset time period may be an AIFS, and an ending time of the AIFS may be the same as a completion time of the random backoff operation on the primary channel. The communication node may complete the random backoff operation on the primary channel, and if the secondary channel is idle during the AIFS time period, the communication node may transmit a frame through the primary channel and the secondary channel.

Figure 35:
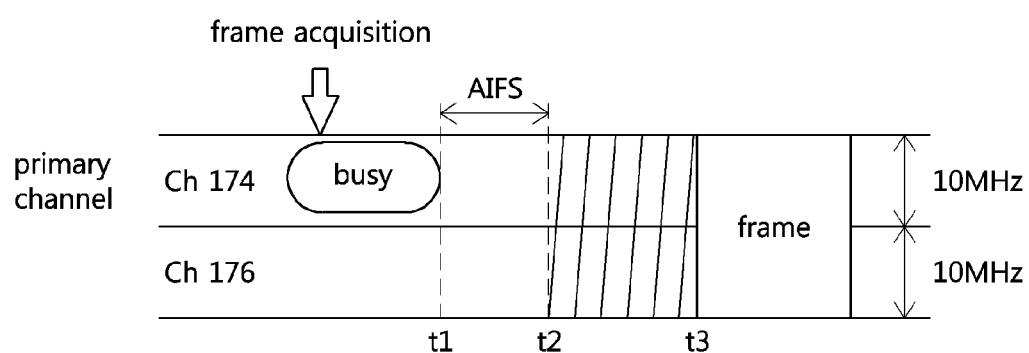
FIG. 35 is a conceptual diagram illustrating a third exemplary embodiment of a frame transmission operation through a 20 MHz channel as a result of channel monitoring and random backoff operation on a primary channel and a secondary channel.

FIG. 35 is a conceptual diagram illustrating a third exemplary embodiment of a frame transmission operation through a 20 MHz channel as a result of channel monitoring and random backoff operation on a primary channel and a secondary channel.

As shown in FIG. 35, the communication node may monitor channels (e.g., primary channel and/or secondary channel) before transmitting a frame. In this case, the communication node may monitor a channel state of the primary channel by performing at least one of the PD operation, the ED operation, or the NAV value identifying operation, and may monitor a channel state of the secondary channel by performing the ED operation. According to the exemplary embodiment of FIG. 35, if the primary channel is occupied by another communication node, the communication node may wait until the busy state of the primary channel ends.

When the primary channel is switched from the busy state to the idle state, the communication node may identify whether the channels (e.g., primary channel and/or secondary channel) are busy by monitoring the channels during a preset AIFS time period (i.e., t1 to t2). According to the exemplary embodiment of FIG. 35, the communication node may determine whether the channels (e.g., primary channel and secondary channel) are busy during a preset AIFS time period (i.e., t1 to t2). In this case, if the primary channel or secondary channel is busy during the preset AIFS time period, the communication node may identify whether the channels (e.g., primary channel and secondary channel) are busy by monitoring the channels until a later time among a time after a lapse of an AIFS time from the time at which the primary channel is switched from the busy state to the idle state and a time after a lapse of an EIFS time from the time at which the secondary channel is switched from the busy state to the idle state.

As a result of the channel monitoring, if the channels (e.g., primary channel and secondary channel) are not busy during the preset AIFS time period (i.e., t1 to t2), or if the primary channel is not busy during the AIFS time period from the time when the primary channel is switched to the idle state, and the secondary channel is not busy during the EIFS time period from the time when the secondary channel is switched to the idle state, the communication node may perform a random backoff operation on the channels (i.e., t2 to t3). The communication may identify the channel state through channel sensing for each backoff count, and if the channel is in the idle state, the communication node may decrease the backoff count value. When the communication node completes the random backoff operation on the channels (e.g., primary channel and secondary channel), the communication node may transmit a frame through the primary channel and the secondary channel.

Figure 36:
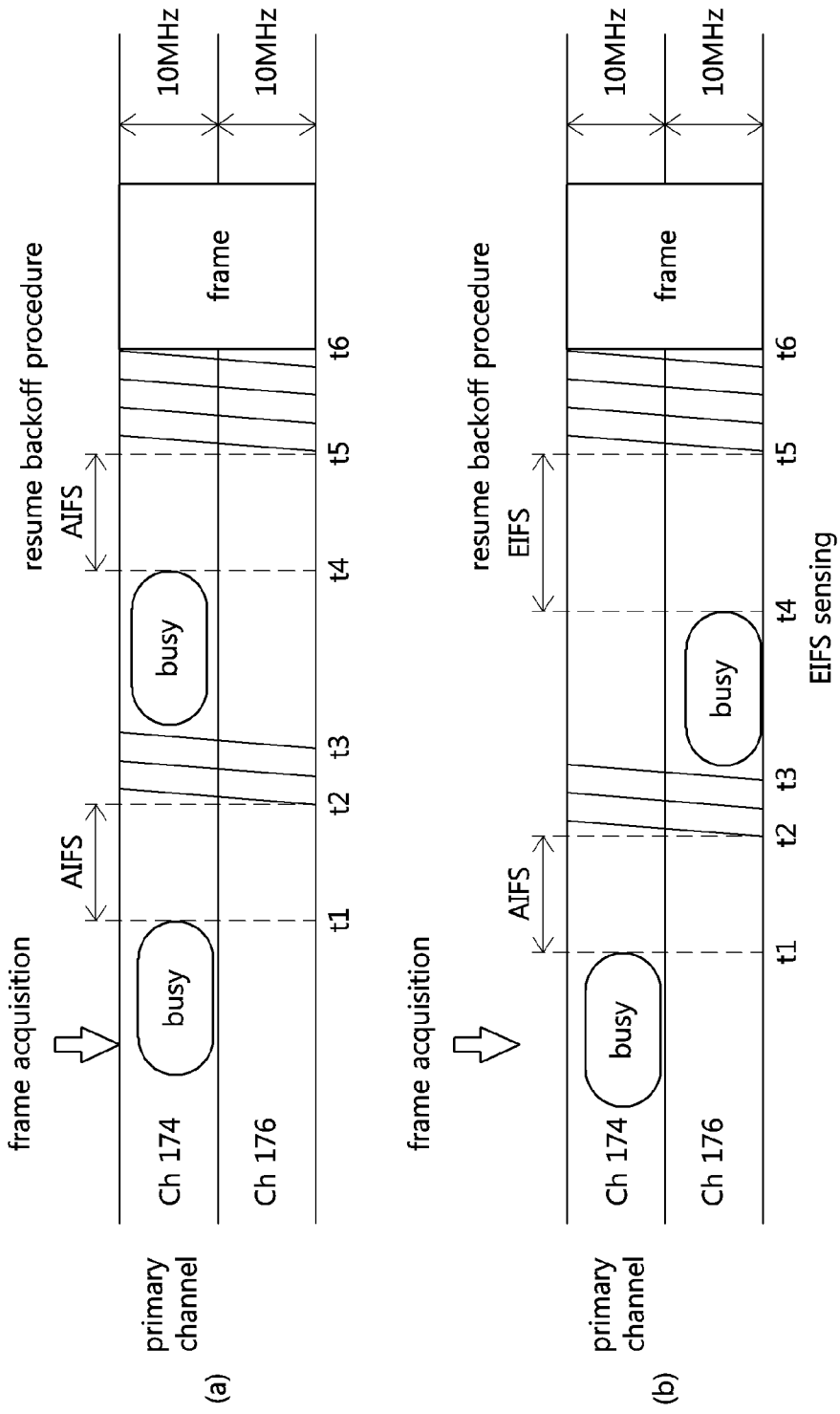
FIG. 36 is a conceptual diagram illustrating a fourth exemplary embodiment of a frame transmission operation through a 20 MHz channel as a result of channel monitoring and random backoff operation on a primary channel and a secondary channel.

FIG. 36 is a conceptual diagram illustrating a fourth exemplary embodiment of a frame transmission operation through a 20 MHz channel as a result of channel monitoring and random backoff operation on a primary channel and a secondary channel.

As shown in FIG. 36, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel.

The communication node may monitor whether channels (e.g., primary channel and/or secondary channel) are busy before transmitting a frame. The communication node may monitor a channel state of the primary channel by performing at least one of the PD operation, the ED operation, or the NAV value identifying operation, and may monitor a channel state of the secondary channel by performing the ED operation. As a result of monitoring the channels (e.g., primary channel and/or the secondary channel), if the channels (e.g., primary channel and secondary channel) are occupied by another communication node, the communication node may wait until the busy state of the channels ends. According to the exemplary embodiment of FIG. 36, if the primary channel is occupied by another communication node, the communication node may wait until the busy state of the primary channel ends.

When the primary channel is switched from the busy state to the idle state, the communication node may identify whether the channels (e.g., primary channel and/or secondary channel) are busy during a preset AIFS time period (i.e., t1 to t2). According to the exemplary embodiments of (a) and (b) of FIG. 36, the communication node may determine whether the primary channel is busy during the preset AIFS time period (i.e., t1 to t2). If the primary channel or secondary channel is busy during the preset AIFS time period, the communication node may identify whether the channels (e.g., primary channel and secondary channel) are busy by monitoring the channels until a later time among a time after a lapse of an AIFS time period from the time at which the primary cannel is switched to the idle state and a time after a lapse of an EIFS time period from the time at which the secondary channel is switched to the idle state.

If the channels (e.g., primary channel and secondary channel) are not busy during the preset AIFS time period (t1 to t2), or if the primary channel is not busy during the AIFS time period from the time when the primary channel is switched to the idle state and the secondary channel is not busy during the EIFS time period from the time when the secondary channel is switched to the idle state, the communication node may perform a random backoff operation on the channels (i.e., t2 to t3). For example, the communication node may perform a random backoff operation on the primary channel and the secondary channel (i.e. t2 to t3). According to another exemplary embodiment, the communication node may perform a random backoff operation on the primary channel (i.e., t2 to t3). The communication node may generate a random backoff count value, and may perform a channel sensing operation on the secondary channel during a period corresponding to the generated random backoff count value. The communication node performing the random backoff operation may decrease the random backoff count value only when both the primary channel and the secondary channel are idle.

If at least one of the channels is busy (i.e., t3 to t4) while the communication node performs the random backoff operation, the communication node may freeze the backoff counter to stop counting the backoff counter value. According to the exemplary embodiment of (a) of FIG. 36, the primary channel may be busy during the random backoff operation (i.e., t3 to t4), and according to the exemplary embodiment of (b) of FIG. 36, the secondary channel may be busy during the random backoff operation (i.e., t3 to t4). In addition, the communication node may store the remaining backoff count value at the time when the counting of the backoff counter value is stopped.

The communication node having frozen the backoff counter may determine whether the channels (e.g., primary channel and secondary channel) are busy by monitoring the channels during a preset IFS time period (i.e., t4 to t5). According to the exemplary embodiment of (a) of FIG. 36, the communication node may determine whether the channels are busy by monitoring the channels during a preset AIFS time period from a starting time of the idle state of the primary channel (i.e., t4 to t5). In addition, according to the exemplary embodiment of (b) of FIG. 36, the communication node may determine whether the channels are busy by monitoring the channels during a preset EIFS time period from a starting time of the idle state of the secondary channel (i.e., t4 to t5).

If the channels (e.g., primary and/or secondary channel) are not busy during the preset AIFS time period (or EIFS time period) (i.e., t4 to t5), the communication node may perform the backoff operation by resuming the backoff counter on the channels (i.e., t5 to t6). The communication node may perform the backoff operation on the channels based on the backoff count value at the time when the counting of the random backoff counter value was stopped (i.e., t5 to t6). For example, the communication node may perform the random backoff operation on the primary channel and the secondary channel (i.e., t5 to t6). According to another exemplary embodiment, the communication node may perform a random backoff operation on the primary channel (i.e., t5 to t6). The communication node may generate a random backoff count value, and may perform a channel sensing operation on the secondary channel during a period corresponding to the generated random backoff count value. The communication node performing the random backoff operation may decrease the random backoff count value only when both the primary channel and the secondary channel are idle. When the communication node completes the backoff operation on the channels, the communication node may transmit a frame through the primary channel and the secondary channel.

Meanwhile, the communication node may configure the primary channel as a fixed band or randomly configure the primary channel when transmitting a frame using 20 MHz bandwidth. Alternatively, in order to increase channel efficiency or improve fairness for the secondary channel, the communication node may configure the primary channel based on a measured channel occupancy ratio. The communication node may measure a channel occupancy ratio of each of the channels of 20 MHz bandwidth according to a preconfigured scheme. For example, the communication node may calculate the channel occupancy ratio by measuring an energy of the channel N times during a preset measurement time period, and dividing the number of times of detecting an energy equal to or greater than a preset level by the number of measurements. Alternatively, a channel load parameter received from an upper layer through a Service Access Point (SAP) may be utilized. For example, as described above, channel load information measured in the upper layer or received from another communication node may be delivered to the LLC layer through the LSAP as a channel load parameter of a DL-UNITDATAX.request primitive, and the LLC layer may deliver it to the MAC layer by adding the channel load parameter to a MA-UNITDATA.request primitive of the MAC SAP.

Figure 37:
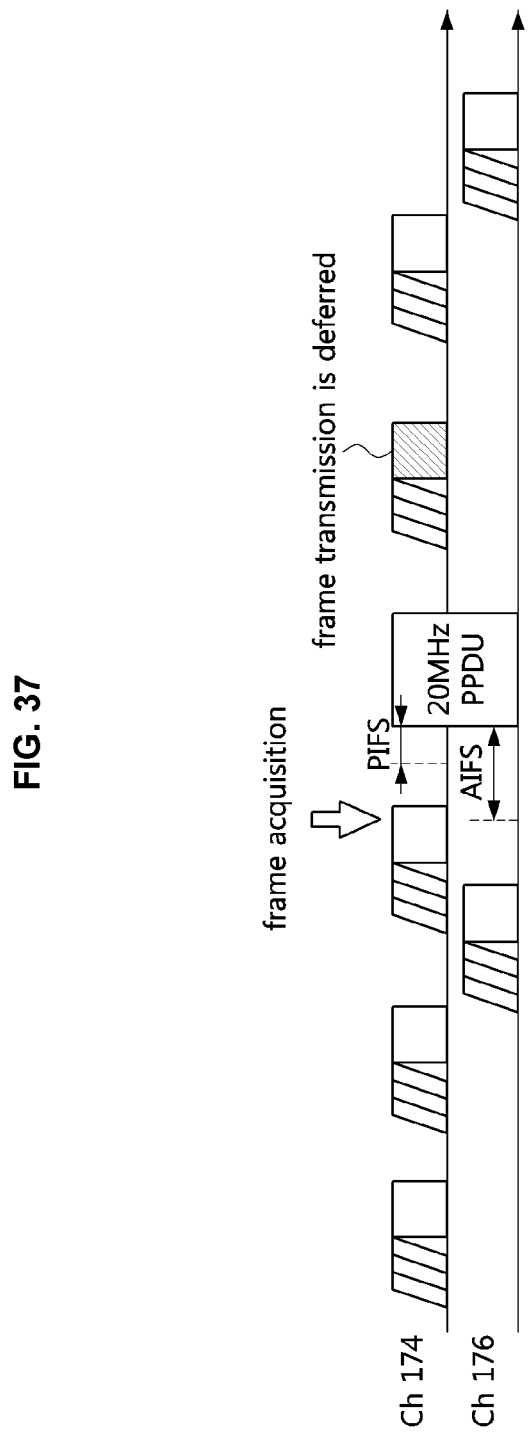
FIG. 37 is a conceptual diagram illustrating a first exemplary embodiment of a result of configuring a primary channel in a communication node based on a channel occupancy ratio in a V2X communication system.

FIG. 37 is a conceptual diagram illustrating a first exemplary embodiment of a result of configuring a primary channel in a communication node based on a channel occupancy ratio in a V2X communication system.

As shown in FIG. 37, a communication node may transmit a frame through two channels (e.g., channel 174 and channel 176). One (e.g., channel 174) of the two channels for frame transmission may be a primary channel, and the other channel (e.g., channel 176) may be a secondary channel for extension of the primary channel. In addition, the communication node may perform a carrier sensing operation, which is at least one of the PD operation, ED operation, or NAV value identifying operation on the primary channel, and may identify whether the secondary channel is busy through the ED sensing.

According to an exemplary embodiment of the channel bandwidth extension method, a communication node transmitting a frame through a channel having 20 MHz bandwidth may configure a channel having a low channel occupancy ratio among two channels as a primary channel. For example, when a channel occupancy ratio of the channel 174 is higher than that of the channel 176, the communication node may configure the channel 176 having a relatively low channel occupancy ratio among the channels as a primary channel.

The communication node may perform access to the 176 channel configured as the primary channel. Even when a secondary channel is occupied by another communication node, the communication node may perform access to the primary channel and transmit a signal through the primary channel having 10 MHz bandwidth. Accordingly, the communication node may quickly perform the channel access. In addition, since the communication node may utilize the relatively less congested channel among the channels, the communication node may transmit a signal through the relatively less congested channel. Therefore, the communication node may use the channels efficiently.

The communication node may perform an EDCA procedure to access the primary channel. For example, the communication node may perform channel sensing during an AIFS time period, and if the channel is not occupied by another communication node during the channel sensing period (e.g., AIFS), it may access the primary channel. If a frame is transmitted immediately before the channel sensing operation, or if the channel is determined to be occupied by another communication node as a result of the channel sensing during the AIFS time period, the communication node may additionally perform a random backoff operation after a lapse of the AIFS from the time when the busy state of the channel ends, and then may access the primary channel. In addition, the communication node may identify whether the secondary channel is busy by monitoring the secondary channel. For example, the communication node may monitor the secondary channel during a preset time period (e.g., PIFS, DIFS, AIFS, etc.) before a completion time of the channel access to the primary channel. If the secondary channel is not occupied by another communication node, the communication node may transmit a frame through the primary channel and the secondary channel. On the other hand, as a result of the channel sensing, if the secondary channel is occupied by another communication node, the communication node may transmit a signal through the primary channel having 10 MHz bandwidth.

Figure 38:
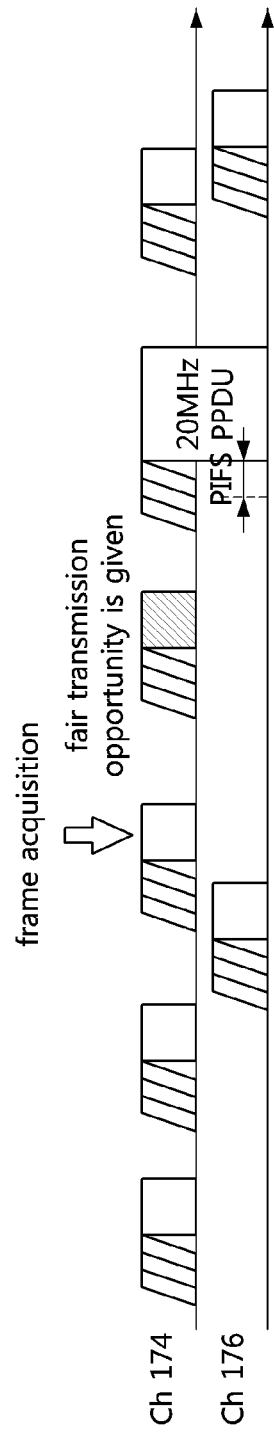
FIG. 38 is a conceptual diagram illustrating a second exemplary embodiment of a result of configuring a primary channel in a communication node based on a channel occupancy ratio in a V2X communication system.

FIG. 38 is a conceptual diagram illustrating a second exemplary embodiment of a result of configuring a primary channel in a communication node based on a channel occupancy ratio in a V2X communication system.

As shown in FIG. 38, each of communication nodes of the V2X communication system may transmit a signal through a radio resource having 20 MHz bandwidth. Specifically, the communication node may transmit the signal through two channels (e.g., channels 174 and 176) each having 10 MHz bandwidth. A communication node transmitting a signal by extending a bandwidth may configure a channel having a high channel occupancy ratio as a primary channel in order to adjust fairness with other communication nodes transmitting a signal through a secondary channel. For example, if a channel occupancy ratio of the channel 174 is higher than that of the channel 176, the communication node may configure the channel 174 as the primary channel.

The communication node may perform an EDCA procedure to access the primary channel. For example, the communication node may perform channel sensing for an AIFS time period, and if the channel is not occupied by another communication node during the channel sensing period (e.g., AIFS), it may access the primary channel. If a frame is transmitted immediately before the channel sensing operation, or if the channel is determined to be occupied by another communication node as a result of the channel sensing during the AIFS time period, the communication node may additionally perform a random backoff operation after a lapse of an AIFS from the time when the busy state of the channel ends, and then may access the primary channel. In addition, the communication node may identify whether the secondary channel is busy by monitoring the secondary channel. For example, the communication node may monitor the secondary channel during a preset time period (e.g., PIFS, DIFS, AIFS, etc.) before a completion time of the channel access to the primary channel. If the secondary channel is not occupied by another communication node during the preset time period, the communication node may transmit a frame through the primary channel and the secondary channel. On the other hand, as a result of the channel sensing, if the secondary channel is occupied by another communication node, the communication node may transmit a signal through the primary channel having 10 MHz bandwidth.

Unlike the exemplary embodiment in FIG. 37, the communication node according to the exemplary embodiment of FIG. 38 may perform a contention procedure for frame transmission with other communication nodes in a channel having a relatively high channel occupancy ratio. Accordingly, according to the exemplary embodiment of FIG. 38, the communication nodes may fairly acquire a channel access opportunity by performing the fair contention procedure.

Figure 39:
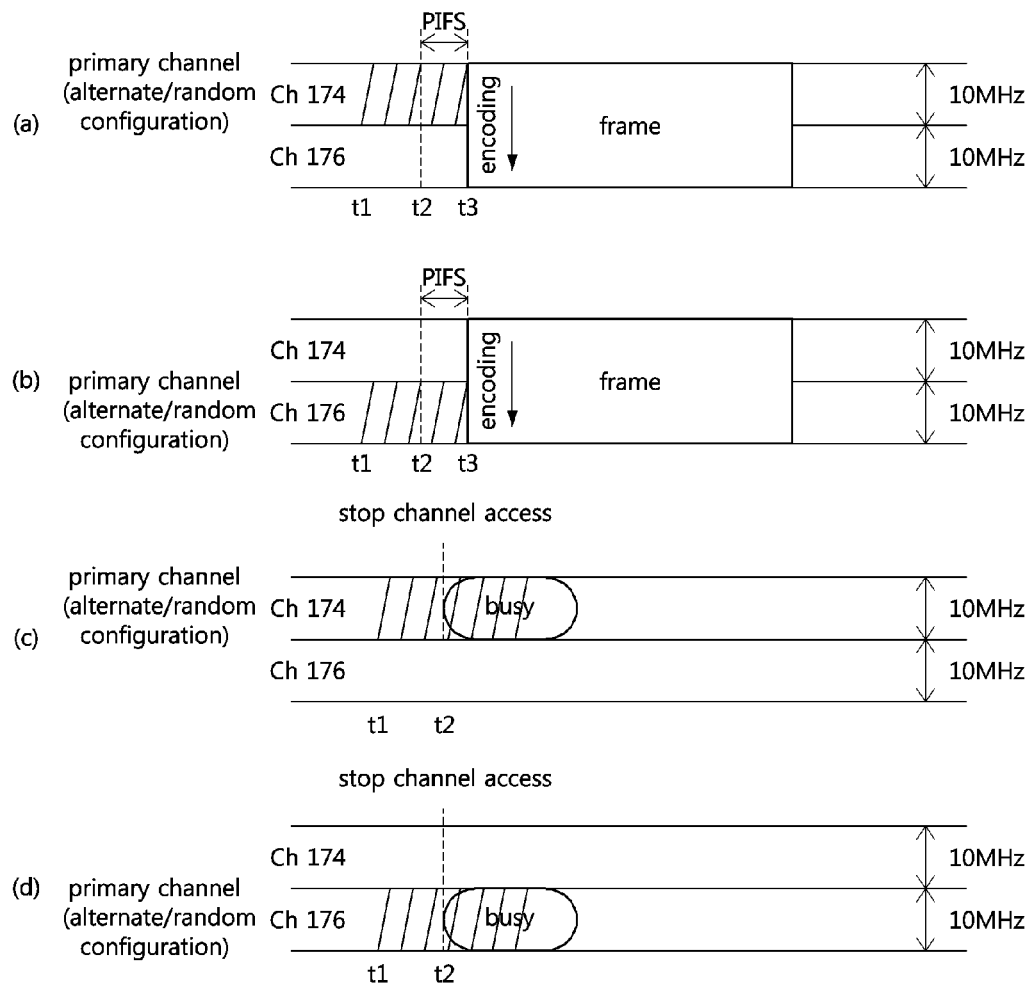
FIG. 39 is a conceptual diagram illustrating a first exemplary embodiment of an operation of a communication node for transmitting a signal in a 20 MHz bandwidth in a V2X communication system.

FIG. 39 is a conceptual diagram illustrating a first exemplary embodiment of an operation of a communication node for transmitting a signal in a 20 MHz bandwidth in a V2X communication system.

As shown in FIG. 39, a communication node may transmit a frame through two channels (e.g., channel 174 and channel 176). The communication node may configure one of the two channels as a channel for contention (hereinafter referred to as a 'contention channel') independently of configuration of primary and secondary channels. That is, the communication node may compete to acquire a frame transmission opportunity in one of the primary channel or the secondary channel.

According to the exemplary embodiment of FIG. 39, the communication node may select one of the two channels each having 10 MHz bandwidth as the contention channel. In addition, the communication node may perform a channel contention operation on the selected contention channel. The communication node may select the contention channel by alternately selecting the two channels. Alternatively, the communication node may probabilistically select one of the two channels as the contention channel.

The communication node may select one of the two channels as the contention channel with the same probability. For example, the communication node may generate a random number of either 0 or 1. If the random number is 0, the communication node may select a channel having a lower number (e.g., channel 174 in the exemplary embodiment) as the contention channel, and if the random number is 1, the communication node may select a channel having a higher number (e.g., channel 176 in the exemplary embodiment) as the contention channel.

Alternatively, the communication node may generate a random number of 0 to 9. If the random number is one of 0 to 4, the communication node may select a channel having a lower number (e.g., channel 174 in the exemplary embodiment) as the contention channel, and if the random number is one of 5 to 9, the communication node may select a channel having a higher number (e.g., channel 176 in the exemplary embodiment) as the contention channel.

The communication node may select one of the two channels as the contention channel with different probabilities. Specifically, the communication node may determine a contention channel selection probability of each of the two channels based on the channel occupancy ratio thereof. The communication node may set a probability p for a channel with a higher channel occupancy ratio among the two channels. The probability p may be classified into several levels according to the channel occupancy ratio of the corresponding channel. The communication node may calculate the channel occupancy ratio based on information on a channel state observed for a predetermined time. Alternatively, the Wireless Access in Vehicular Environments Short Message Protocol (WSMP) layer of the communication node may calculate each channel occupancy ratio based on the channel state of the contention channel.

For example, when the channel state is classified into three states including congested, lightly congested, and non-congested states according to the channel occupancy ratio, the contention channel selection probability of the channel may be set differently according to a degree of congestion. For example, when a congestion degree of a specific channel is the congested state, the contention channel selection probability of the specific channel may be set to 1/6, when the congestion degree of the specific channel is the lightly congested state, the contention channel selection probability of the specific channel may be set to 2/6, and when the congestion degree of the specific channel is the non-congested state, the contention channel selection probability of the specific channel may be set to 3/6. When the contention channel selection probability value of the specific channel is set to p, the communication node may set a contention channel selection probability of the other channel to 1−p. That is, when a state of one channel is the congested state, a contention channel selection probability of the other channel may be 5/6.

In addition, the communication node may generate a random number value between 0 and 1, and may select the contention channel based on the random number value. For example, if the channel 176 has a higher usage rate than the channel 174 and the channel 176 is in the congested state, the communication node obtaining a random number value less than 1/6 may select the channel 176 as the contention channel. In addition, the communication node obtaining a random number value equal to or greater than 1/6 may select the channel 174 as the contention channel. If a state of one channel is the non-congested state, the channel selection probability of each of the two channels may be equal to each other.

The communication node may determine a channel occupancy ratio of the primary channel by referring to a primary channel state in the WSMP layer that is the upper layer, or determine the channel occupancy ratio of the primary channel based on a result of channel state observation during a preset time period.

The communication node may compete to acquire a frame transmission opportunity on the contention channel. For example, the communication node may perform a random backoff operation on the contention channel (i.e., t1 to t3). In addition, the communication node may monitor a channel to be extended and monitor a channel occupancy state of the channel during a preset time period (e.g., PIFS, etc.) (i.e., t2 to t3).

The communication node may determine whether to transmit a frame based on a result of the random backoff operation on the contention channel. For example, the communication node may complete the random backoff operation on the contention channel, and if the extended channel is idle during a PIFS period, the communication node may transmit a frame through a 20 MHz channel. In the present disclosure, when a frame is transmitted through a 20 MHz channel, data of the frame may be mapped from a radio resource indicated by a low channel number.

On the other hand, if the communication node detects the busy state of the contention channel during the random backoff operation, the communication node may stop the access procedure to the contention channel.

Figure 40:
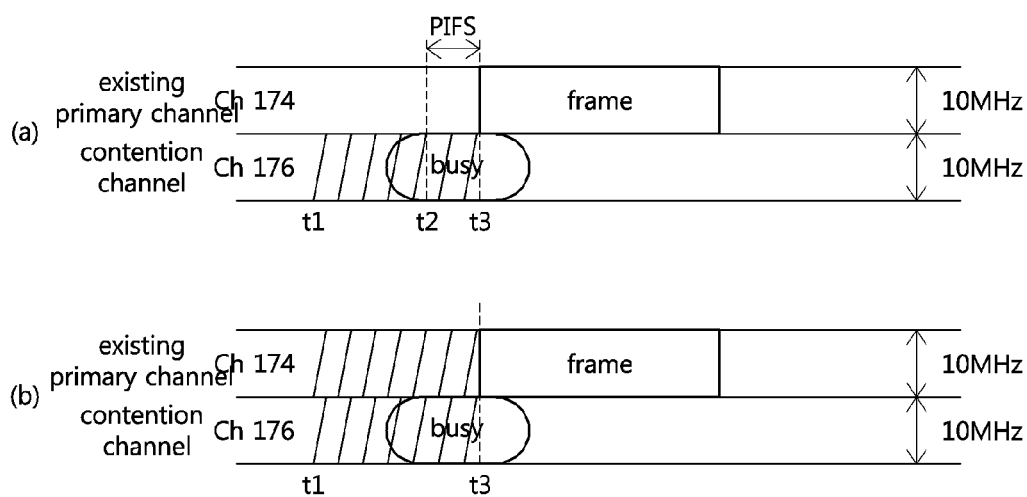
FIG. 40 is a conceptual diagram illustrating a second exemplary embodiment of an operation of a communication node for transmitting a signal in a 20 MHz bandwidth in a V2X communication system.

FIG. 40 is a conceptual diagram illustrating a second exemplary embodiment of an operation of a communication node for transmitting a signal in a 20 MHz bandwidth in a V2X communication system.

As shown in FIG. 40, a communication node may transmit a frame through two channels (e.g., channel 174 and channel 176). One of the two channels for frame transmission may be a primary channel, and the other channel may be a secondary channel capable of replacing the primary channel. The primary channel among the two channels may be defined according to the existing specification or according to a service type of the frame to be transmitted. The primary channel defined in the existing specification may be referred to as an 'existing primary channel'. In addition, the communication node may determine the contention channel for performing channel access based on a channel occupancy state of each of the channels (e.g., primary channel and secondary channel). For example, the communication node may configure the channel 176, which is a separate channel from the existing primary channel, as the primary channel based on the occupancy state of each of the channels. The channel 176 newly configured by the communication node may be referred to as a contention channel.

According to the exemplary embodiment of FIG. 40, the communication node may compete to acquire a frame transmission opportunity on the contention channel. For example, the communication node may perform a random backoff operation on the contention channel (i.e., t1 to t3). In addition, the communication node may perform a frame transmission operation on the existing primary channel if the contention channel is busy while performing the contention to acquire a frame transmission opportunity on the contention channel. For example, referring to (a) of FIG. 40, the communication node may perform a random backoff operation on the contention channel, and if the contention channel is busy while performing the random backoff operation, the communication may monitor a channel occupancy state of the existing primary channel during a preset time period (e.g., PIFS, etc.) before the time at which the random backoff ends on the contention channel (i.e., t2 to t3). In addition, referring to (b) of FIG. 40, the communication node may monitor the channel occupancy state of the existing primary channel for the entire random backoff period to be performed on the contention channel (i.e., t1 to t3).

The communication node may determine a channel through which to transmit the frame based on a result of the random backoff operation on the contention channel. For example, according to the exemplary embodiments of (a) and (b) of FIG. 40, if the contention channel is occupied by another communication node during the backoff procedure on the contention channel, the communication node may transmit the frame through the existing primary channel when the existing primary channel is idle during a preset time period (e.g., PIFS, etc.) before a completion time of the random backoff to be performed on the contention channel or during the entire period of the random backoff to be performed on the contention channel.

In the present disclosure, the method of transmitting a frame using a plurality of channels may be applicable even when the plurality of channels are not contiguous. Alternatively, the multi-channel access method of the present disclosure may be applicable even when a plurality of channels are selected and used from the channels in the 2.4 GHz band, the channels in the 5 GHz band, and the channels in the 6 GHz band. According to the mobile communication technology, a channel access may also be expressed as a link. That is, the channel access methods for using multiple channels, according to the present disclosure, may be applied to a channel access method for using multiple links.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a communication node in a wireless communication network, the operation method comprising:
performing a first monitoring operation on each of a first channel and a second channel;
in response to determining that at least one of the first channel or the second channel is in a busy state as a result of the first monitoring operation, performing a random backoff operation by performing a second monitoring operation on each of the first channel and the second channel during a first period after the busy state ends and performing an operation of counting a random backoff counter for the first channel and the second channel when determining that both the first channel and the second channel are in idle states as a result of the second monitoring operation; and
in response to determining that both the first channel and the second channel are in the idle states as a result of the random backoff operation, transmitting a first frame in the first channel and the second channel,
wherein when a length of time during which the at least one of the first channel or the second channel is determined as being in the busy state is identifiable, the first period corresponds to a first waiting time, and when the length of time is not identifiable, the first period corresponds to a second waiting time longer than the first waiting time.

2. The operation method according to claim 1, wherein the first channel is a primary channel having a 10 MHz bandwidth, and the second channel is a secondary channel having a 10 MHz bandwidth for extension of the first channel, the second channel being contiguous with the first channel.

3. The operation method according to claim 2, wherein the first frame is a 20 MHz physical layer protocol data unit (PPDU).

4. The operation method according to claim 1, wherein in the performing of the first monitoring operation, the first channel is determined to be in the busy state when a packet is decoded in the first channel, and the second channel is determined to be in the busy state when an energy equal to or greater than a preset threshold is detected.

5. The operation method according to claim 4, wherein when the first channel is determined to be in the busy state as the result of the first monitoring operation, the first period is determined based on an arbitration interframe space (AIFS).

6. The operation method according to claim 4, wherein when the second channel is determined to be in the busy state as the result of the first monitoring operation, the first period is determined based on an extended interframe space (EIFS).

7. The operation method according to claim 1, wherein the operation of counting the random backoff counter for the first channel and the second channel comprises:
performing a third monitoring operation on each of the first channel and the second channel;
in response to determining that at least one channel of the first channel and the second channel is in the busy state as a result of the third monitoring operation, freezing the operation of counting the random backoff counter; and
in response to determining that both of the first channel and the second channel are in the idle states during a second period from a time at which the busy state of the at least one channel is released, resuming the operation of counting the random backoff counter.

8. The operation method according to claim 7, wherein in the performing of the third monitoring operation, the first channel is determined to be in the busy state when a packet is decoded in the first channel, and the second channel is determined to be in the busy state when an energy equal to or greater than a preset threshold is detected.

9. The operation method according to claim 8, wherein when the first channel is determined to be in the busy state as the result of the third monitoring operation, the second period is determined based on an arbitration interframe space (AIFS).

10. The operation method according to claim 8, wherein when the second channel is determined to be in the busy state as the result of the third monitoring operation, the second period is determined based on an extended interframe space (EIFS).

11. A communication node in a wireless communication network, the communication node comprising:
a processor; and
a memory storing at least one instruction executable by the processor,
wherein when executed by the processor, the at least one instruction causes the communication node to:
perform a first monitoring operation on each of a first channel and a second channel;
in response to determining that at least one of the first channel or the second channel is in a busy state as a result of the first monitoring operation, perform a random backoff operation by performing a second monitoring operation on each of the first channel and the second channel during a first period after the busy state ends and performing an operation of counting a random backoff counter for the first channel and the second channel when determining that both the first channel and the second channel are in idle states as a result of the second monitoring operation; and
transmit a first frame in the first channel and the second channel, in response to determining that both of the first channel and the second channel are in the idle states as a result of the random backoff operation,
wherein when a length of time during which the at least one of the first channel or the second channel is determined as being in the busy state is identifiable, the first period corresponds to a first waiting time, and when the length of time is not identifiable, the first period corresponds to a second waiting time longer than the first waiting time.

12. The communication node according to claim 11, wherein the first channel is a primary channel having a 10 MHz bandwidth, and the second channel is a secondary channel having a 10 MHz bandwidth for extension of the first channel, the second channel being contiguous with the first channel.

13. The communication node according to claim 12, wherein the first frame is a 20 MHz physical layer protocol data unit (PPDU).

14. The communication node according to claim 11, wherein in the performing of the first monitoring operation, the first channel is determined to be in the busy state when a packet is decoded in the first channel, and the second channel is determined to be in the busy state when an energy equal to or greater than a preset threshold is detected.

15. The communication node according to claim 14, wherein when the first channel is determined to be in the busy state as the result of the first monitoring operation, the first period is determined based on an arbitration interframe space (AIFS).

16. The communication node according to claim 14, wherein when the second channel is determined to be in the busy state as the result of the first monitoring operation, the first period is determined based on an extended interframe space (EIFS).

17. The communication node according to claim 11, wherein in the operation of counting the random backoff counter for the first channel and the second channel, the at least one instruction further causes the communication node to:
perform a third monitoring operation on each of the first channel and the second channel;
freeze the operation of counting the random backoff counter, in response to determining that at least one channel of the first channel and the second channel is in the busy state as a result of the third monitoring operation; and
resume the operation of counting the random backoff counter, in response to determining that both of the first channel and the second channel are in the idle states during a second period from a time at which the busy state of the at least one channel is released.

18. The communication node according to claim 17, wherein in the performing of the third monitoring operation, the first channel is determined to be in the busy state when a packet is decoded in the first channel, and the second channel is determined to be in the busy state when an energy equal to or greater than a preset threshold is detected.

* * * * *